United States Patent
Zhao et al.

(10) Patent No.: US 11,669,987 B2
(45) Date of Patent: *Jun. 6, 2023

(54) OBSTACLE AVOIDANCE DURING TARGET TRACKING

(71) Applicant: SZ DJI TECHNOLOGY CO., LTD., Shenzhen (CN)

(72) Inventors: Cong Zhao, Shenzhen (CN); Shaojie Shen, Shenzhen (CN); Jie Qian, Shenzhen (CN); Xuyang Feng, Shenzhen (CN); Minjian Pang, Shenzhen (CN); Junfeng Yu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 171 days.

This patent is subject to a terminal disclaimer.

(21) Appl. No.: 17/173,051

(22) Filed: Feb. 10, 2021

(65) Prior Publication Data

US 2021/0256723 A1 Aug. 19, 2021

Related U.S. Application Data

(63) Continuation of application No. 16/114,968, filed on Aug. 28, 2018, now Pat. No. 10,929,999, which is a (Continued)

(51) Int. Cl.
*G06T 7/593* (2017.01)
*G06T 7/70* (2017.01)
(Continued)

(52) U.S. Cl.
CPC ............. *G06T 7/593* (2017.01); *G06T 7/20* (2013.01); *G06T 7/70* (2017.01); *B64C 39/024* (2013.01); *G06T 2207/30261* (2013.01)

(58) Field of Classification Search
None
See application file for complete search history.

(56) References Cited

U.S. PATENT DOCUMENTS

| 6,044,321 A | 3/2000 | Nakamura et al. |
| 10,929,999 B2 * | 2/2021 | Zhao ............... G05D 1/106 |

(Continued)

FOREIGN PATENT DOCUMENTS

| CN | 101419667 A | 4/2009 |
| CN | 103335658 A | 10/2013 |

(Continued)

OTHER PUBLICATIONS

The World Intellectual Property Organization (WIPO) International Search Report and Written Opinion for PCT/CN2016/074821 dated Dec. 8, 2017 7 pages.

(Continued)

*Primary Examiner* — Leon Flores
(74) *Attorney, Agent, or Firm* — Anova Law Group, PLLC

(57) ABSTRACT

A method for controlling a movable object includes obtaining current location information of an obstacle while the movable object tracks a target, determining whether the obstacle is located in a reactive region relative to the movable object based on the current location information of the obstacle, and, in response to determining that the obstacle is not located in the reactive region, selecting an optimized set of candidate movement characteristics having an optimized route optimization score from multiple sets of candidate movement characteristics, and adjusting one or more movement characteristics of the movable object based on the optimized set of candidate movement characteristics such that a distance between the movable object and the obstacle is maintained at or beyond a predefined distance. Each set of candidate movement characteristics among the (Continued)

multiple sets of candidate movement characteristics corresponds to a route optimization score.

20 Claims, 44 Drawing Sheets

Related U.S. Application Data continuation of application No. PCT/CN2016/074821, filed on Feb. 29, 2016.

(51) Int. Cl.
  G06T 7/20   (2017.01)
  B64C 39/02  (2023.01)

(56) References Cited

U.S. PATENT DOCUMENTS

| | | |
|---|---|---|
| 2009/0093960 A1 | 4/2009 | Puhalla et al. |
| 2010/0256909 A1 | 10/2010 | Duggan et al. |
| 2011/0002507 A1 | 1/2011 | Kuoch et al. |
| 2013/0329945 A1 | 12/2013 | Yang et al. |
| 2017/0177937 A1 | 6/2017 | Harmsen et al. |

FOREIGN PATENT DOCUMENTS

| | | |
|---|---|---|
| CN | 103543751 A | 1/2014 |
| CN | 103576692 A | 2/2014 |
| CN | 104504724 A | 4/2015 |
| CN | 104933228 A | 9/2015 |
| CN | 105204520 A | 12/2015 |
| CN | 105303595 A | 2/2016 |

OTHER PUBLICATIONS

Shuide Chen, "Autonomous Mobile Robot Environment Exploration and Navigation in Dynamic Indoor Environment" Feb. 15, 2007 Full-text Database of China's Outstanding Doctoral and Master's Dissolutions.

Lipeng Zhang et al., "Control method for multi-UAVs cooperative obstacle avoidance," Journal of Central South University (Science and Technology), Jan. 26, 2016, vol. 47 No.1, pp. 120-128, China.

Prevost C.G. et al., "Receding Horizon Model-Based Predictive Control for Dynamic Target Tracking; a Comparative Study," Guidance, Navigation and Control Conference, Aug. 10-13, 2009, Chicago, Illinois.

* cited by examiner

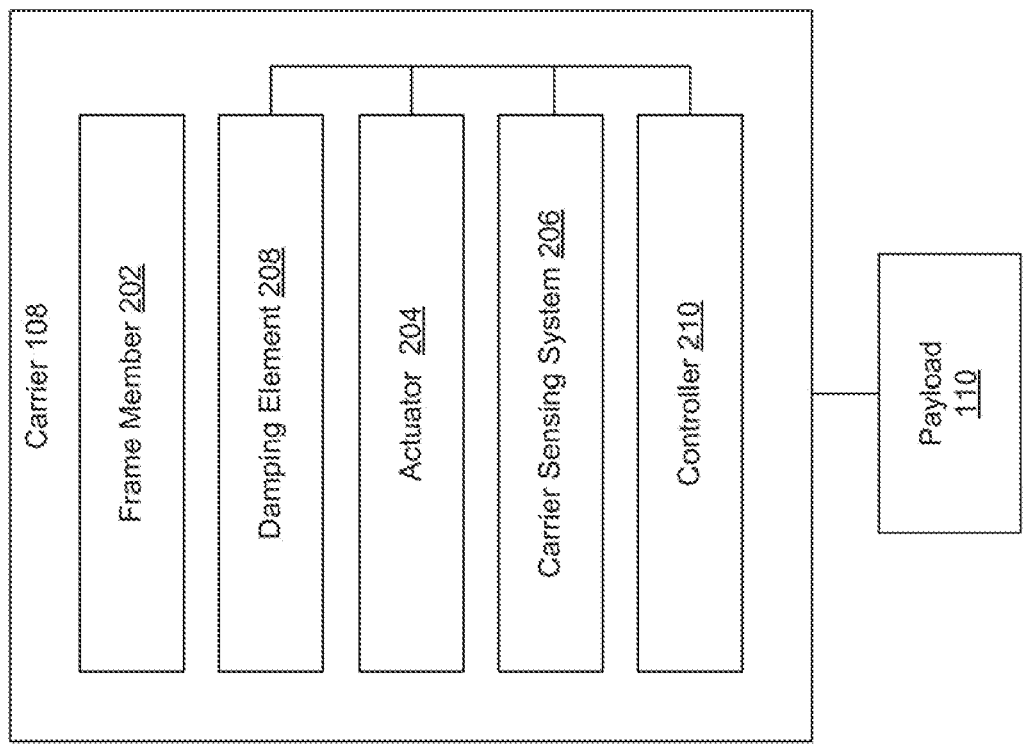
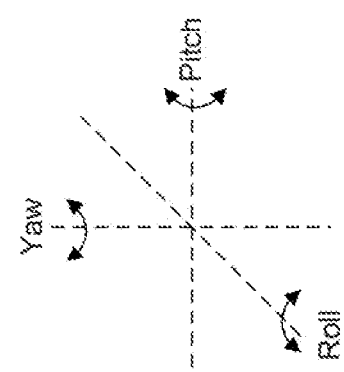
Figure 2B

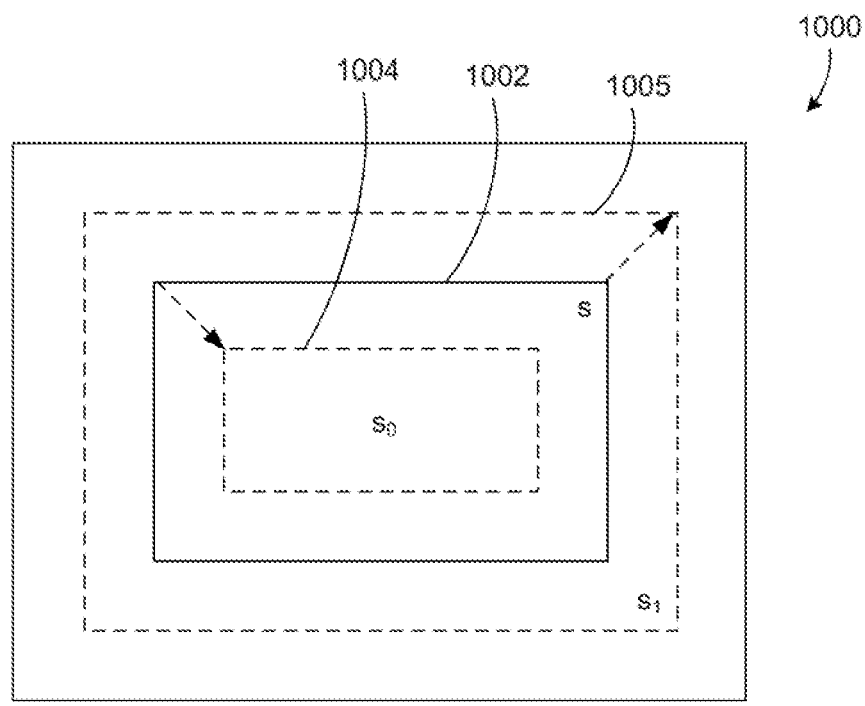
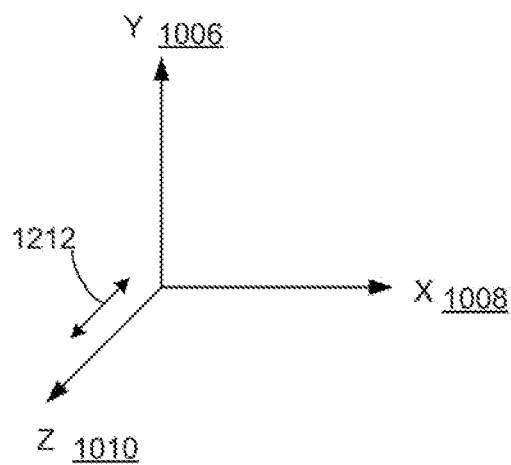
Figure 10

2300

2302
Obtain current location information of an obstacle while a movable object tracks a target

2304
Determine, based on the current location information of the obstacle, whether a location of the obstacle corresponds to a reactive region relative to the movable object

2306
In response to determining that the location of the obstacle corresponds to the reactive region, adjust one or more movement characteristics of the movable object in a reactive manner such that collision of the movable object with the obstacle is avoided

2308
In response to determining that the location of the obstacle does not correspond to the reactive region, adjust one or more movement characteristics of the movable object in a proactive manner such that a distance between the movable object and the obstacle exceeds a first predefined distance

2310
The current location information of the obstacle includes information obtained using one or more depth maps

2312
A respective depth map is obtained using at least one sensor of the movable object

2314
The at least one sensor of the movable object includes a pair of sensors for stereoscopic depth mapping

2316
The current location information of the obstacle includes information obtained using at least one sensor of the movable object

---

2318
The current location information of the obstacle includes a position of the obstacle

---

2320
The current location information of the obstacle includes one or more movement characteristics of the obstacle

---

2322
The current location information of the obstacle is transmitted from a computing device to the movable object

---

2324
The current location information of the obstacle is received by the movable object from a computing device

---

2326
The reactive region is defined at least in part based on a determined distance from the movable object; and the determined distance is based on one or more current movement characteristics of the movable object

2328
The determined distance is further based on one or more current movement characteristics of the obstacle

2330
In response to determining that the location of the obstacle does not correspond to the reactive region: select multiple sets of candidate movement characteristics based on the one or more movement characteristics of the movable object; obtain a route optimization score for each set of candidate movement characteristics of the multiple sets of candidate movement characteristics; select the candidate movement characteristics that have a highest route optimization score; and adjust the one or more movement characteristics of the movable object based on the selected candidate movement characteristics

2332
Predict, for a set of candidate movement characteristics, a time at which the movable object will collide with the obstacle; and determine a route optimization score for the set of candidate movement characteristics based on a difference between a current time and the predicted time at which the movable object will collide with the obstacle

2334
The predicted amount of time before the movable object will collide with the obstacle is determined using one or more movement characteristics of the obstacle

2336
The route optimization score for a set of candidate movement characteristics depends, at least in part, upon one or more differences between the set of candidate movement characteristics and the set of current movement characteristics of the movable object

2338
Predict, for a set of candidate movement characteristics, a distance between the movable object and the target at a predetermined future time; and wherein the route optimization score for a set of candidate movement characteristics depends, at least in part, upon the predicted distance between the movable object and the target at the predetermined future time

2330
In response to determining that the location of the obstacle does not correspond to the reactive region: select multiple sets of candidate movement characteristics based on the one or more movement characteristics of the movable object; obtain a route optimization score for each set of candidate movement characteristics of the multiple sets of candidate movement characteristics in accordance with the first set of rules;
select the candidate movement characteristics that have a highest route optimization score; and adjust the one or more movement characteristics of the movable object based on the selected candidate movement characteristics

2340
A respective set of candidate movement characteristics includes a first movement characteristic in a first direction that is perpendicular to movement of the movable object and a second movement characteristic in a second direction that is perpendicular to movement of the movable object

2342
A respective set of candidate movement characteristics includes a y-axis movement characteristic and a z-axis movement characteristic

2344
A respective set of candidate movement characteristics includes a movement characteristic in a direction of movement of the movable object and an angular velocity

2346
A respective set of candidate movement characteristics includes an x-axis movement characteristic and an angular velocity

2348
Determine a size of the obstacle; determine whether the size of the obstacle meets first obstacle size criteria, wherein: in response to determining that the size of the obstacle meets first obstacle size criteria, the multiple sets of candidate movement characteristics include movement of the movable object along a y-axis and a z-axis relative to the movable object, and in response to determining that the size of the obstacle does not meet first obstacle size criteria, a respective set of candidate movement characteristics of the multiple sets of candidate movement characteristics include: movement of the movable object along an x-axis relative to the movable object and angular velocity of the movable object

2350
In response to determining that the location of the obstacle corresponds to the reactive region, adjusting the one or more movement characteristics includes: determining, determining, based on the current location information of the obstacle, whether the location of the obstacle corresponds to the first sub-region of the reactive region relative to the movable object; and in response to determining that the location of the obstacle corresponds to the first sub-region of the reactive region relative to the movable object, reducing an acceleration of the movable object

2352
In response to determining that the location of the obstacle corresponds to the reactive region, adjusting the one or more movement characteristics includes: determining, based on the current location information of the obstacle, whether the location of the obstacle corresponds to a second sub-region of the reactive region relative to the movable object; and in response to determining that the location of the obstacle corresponds to the second sub-region of the reactive region relative to the movable object, reducing a velocity of the movable object

2354
An area of the second sub-region of the reactive region relative to the movable object is smaller than an area of the first sub-region of the reactive region relative to the movable object

2356
In response to determining that the location of the obstacle corresponds to the reactive region, adjusting the one or more movement characteristics includes: determining, based on the current location information of the obstacle, whether the location of the obstacle corresponds to a third sub-region of the reactive region relative to the movable object; and, in response to determining that the location of the obstacle corresponds to the third sub-region of the reactive region relative to the movable object, reversing a direction of movement of the movable object

2358
An area of the third sub-region of the reactive region relative to the movable object is smaller than the area of the second sub-region of the reactive region relative to the movable object

> 2360
> In response to determining that the location of the obstacle corresponds to the reactive region, transmit adjusted target tracking information to a control unit
>
>> 2362
>> The adjusted target tracking information includes information about the obstacle

2402
Obtain current location information of an obstacle while a movable object tracks a target

2404
Determine, based on the current location information of the obstacle, whether a location of the obstacle corresponds to a reactive region relative to the movable object

2406
In response to determining that the location of the obstacle corresponds to the reactive region: adjust one or more movement characteristics of the movable object; update target tracking information based on a distance between the obstacle and the movable object; and send the adjusted target tracking information to a control unit, wherein the control unit is configured to update a displayed user interface in accordance with the adjusted target tracking information

2410
The distance between the obstacle and the movable object is determined based on the current location information of the obstacle

2412
The distance between the obstacle and the movable object is determined based on output of one or more sensors of the movable object.

2414
Adjusting the one or more movement characteristics of the movable object includes adjusting the one or more movement characteristics of the movable object based on: the distance between the obstacle and the movable object; and one or more current movement characteristics of the movable object

2416
Adjusting the one or more movement characteristics of the movable object includes: determining one or more movement characteristics of the obstacle; and wherein the one or more movement characteristics of the movable object are adjusted using the one or more movement characteristics of the obstacle.

2414
Adjusting the one or more movement characteristics of the movable object includes adjusting the one or more movement characteristics of the movable object based on: the distance between the obstacle and the movable object; and one or more current movement characteristics of the movable object

2416
Adjusting the one or more movement characteristics of the movable object further includes: determining one or more movement characteristics of the obstacle; and wherein the one or more movement characteristics of the movable object are adjusted based on motion of the obstacle

2418
The motion of the obstacle is determined based on the current location information of the obstacle

2420
The motion of the obstacle is determined based on based on output of one or more sensors of the movable object

2422
Adjusting the one or more movement characteristics of the movable object further includes: when the distance between the obstacle and the movable object meets first distance criteria, applying a first movement adjustment to movement of the movable object; and when the distance between the obstacle and the movable object meets second distance criteria, apply a second movement adjustment to movement of the movable object

2424
The first distance criteria are met when the distance between the obstacle and the moving object exceeds a first distance and wherein the second distance criteria are met when the distance between the obstacle and the moving object exceeds a second distance that is smaller than the first distance.

2426
The first distance criteria are met when the location of the obstacle corresponds to a first sub-region of the reactive region relative to the movable object; and the second distance criteria are met when the location of the obstacle corresponds to a second sub-region of the reactive region relative to the movable object.

2414
Adjusting the one or more movement characteristics of the movable object includes adjusting the one or more movement characteristics of the movable object based on: the distance between the obstacle and the movable object; and one or more current movement characteristics of the movable object

2422
Adjusting the one or more movement characteristics of the movable object further includes: when the distance between the obstacle and the movable object meets first distance criteria, applying a first movement adjustment to movement of the movable object; and when the distance between the obstacle and the movable object meets second distance criteria, apply a second movement adjustment to movement of the movable object

2428
Applying the first movement adjustment includes reducing an acceleration of the movable object and applying the second movement adjustment includes reducing a velocity of the movable object

2424
The first distance criteria are met when the distance between the obstacle and the moving object is a first distance and wherein the second distance criteria are met when the distance between the obstacle and the moving object is a second distance that is smaller than the first distance

2430
Adjusting the one or more movement characteristics of the movable object includes: when the distance between the obstacle and the movable object meets third distance criteria, applying a third movement adjustment to movement of the movable object, wherein the third distance criteria are met when the distance between the obstacle and the moving object is a third distance that is smaller than the second distance

2432
Applying the third movement adjustment includes reversing motion of the movable object

2434
Applying the third movement adjustment includes ceasing motion of the movable object

2414
Adjusting the one or more movement characteristics of the movable object includes adjusting the one or more movement characteristics of the movable object based on: the distance between the obstacle and the movable object; and one or more current movement characteristics of the movable object

2422
Adjusting the one or more movement characteristics of the movable object further includes: when the distance between the obstacle and the movable object meets first distance criteria, applying a first movement adjustment to movement of the movable object; and when the distance between the obstacle and the movable object meets second distance criteria, apply a second movement adjustment to movement of the movable object

2426
The first distance criteria are met when the location of the obstacle corresponds to a first sub-region of the reactive region relative to the movable object; and the second distance criteria are met when the location of the obstacle corresponds to a second sub-region of the reactive region relative to the movable object

2436
Adjusting the one or more movement characteristics of the movable object includes: when the distance between the obstacle and the movable object meets third distance criteria, applying a third movement adjustment to movement of the movable object, wherein the third distance criteria are met when the location of the obstacle corresponds to a third sub-region of the reactive region relative to the movable object

2438
Adjusting the one or more movement characteristics of the movable object further includes: when the distance between the obstacle and the movable object meets third distance criteria, determining whether a velocity of the movable object meets velocity criteria; in response to determining that the velocity of the movable object meets velocity criteria, ceasing motion of the movable object; and, in response to determining that the velocity of the movable object does not meet velocity criteria, reversing at least one motion parameter of the movable object

2440
The velocity criteria are met when the velocity of the movable object exceeds a threshold velocity.

2468
The current location information of the obstacle includes information obtained using one or more depth maps

---

2470
The current location information of the obstacle includes information obtained using at least one sensor of the movable object

---

2472
The reactive region is defined at least in part based on a determined distance from the movable object; and the determined distance is based on one or more current movement characteristics of the movable object 2474
The determined distance is further based on one or more current movement characteristics of the obstacle

2502
Obtain current location information of an obstacle while a movable object tracks a target

2504
Generate a plurality of sets of candidate movement characteristics for the movable object based on: the current location information of the obstacle and a set of current movement characteristics of the movable object

2506
Select, from the plurality of sets of candidate movement characteristics for the movable object, a set of movement characteristics for the movable object

2508
Adjust one or more movement characteristics of the movable object based on the selected set of movement characteristics for the movable object

2510
After adjusting the one or more movement characteristics of the movable object based on the selected set of movement characteristics for the movable object, repeat the obtaining, generating, selecting, and adjusting operations.

2512
Assign a route optimization score to each set of candidate movement characteristics of the plurality of sets of candidate movement characteristics; determine a set of movement characteristics for the movable object that has a highest route optimization score; and wherein selecting the set of movement characteristics for the movable object includes selecting the set of candidate movement characteristics for the movable object that has the highest route optimization score

2514
After adjusting the one or more movement characteristics of the movable object based on the selected set of movement characteristics for the movable object, repeat the obtaining, generating, assigning, determining, selecting, and adjusting operations.

2516
Predict, for a set of candidate movement characteristics, a time at which the movable object will collide with the obstacle; and determine a route optimization score to assign to the set of candidate movement characteristics based at least in part on a difference between a current time and the predicted time at which the movable object will collide with the obstacle.

2518
Determine, for a set of candidate movement characteristics, whether the movable object will collide with the obstacle; in response to determining that the movable object will collide with the obstacle: predict, for the set of candidate movement characteristics, a time at which the movable object will collide with the obstacle, and determine a route optimization score to assign to the set of candidate movement characteristics based at least in part on a difference between a current time and the predicted time at which the movable object will collide with the obstacle; and in response to determining that the movable object will not collide with the obstacle, determine a route optimization score to assign to the set of candidate movement characteristics based at least in part on a default value corresponding to a determination that the movable object will not collide with the obstacle.

2512
Assign a route optimization score to each set of candidate movement characteristics of the plurality of sets of candidate movement characteristics; determine a set of movement characteristics for the movable object that has a highest route optimization score; and wherein selecting the set of movement characteristics for the movable object includes selecting the set of candidate movement characteristics for the movable object that has the highest route optimization score

2518
Determine, for a set of candidate movement characteristics, whether the movable object will collide with the obstacle; in response to determining that the movable object will collide with the obstacle: predict, for the set of candidate movement characteristics, a time at which the movable object will collide with the obstacle, and determine a route optimization score to assign to the set of candidate movement characteristics based at least in part on a difference between a current time and the predicted time at which the movable object will collide with the obstacle; and in response to determining that the movable object will not collide with the obstacle, determine a route optimization score to assign to the set of candidate movement characteristics based at least in part on a default value corresponding to a determination that the movable object will not collide with the obstacle.

2520
The predicted amount of time before the movable object will collide with the obstacle is determined using one or more current movement characteristics of the obstacle.

2522
The current location information of the obstacle includes the one or more current movement characteristics of the obstacle.

2524
The one or more current movement characteristics of the obstacle are determined using one or more sensors of the movable object.

2512
Assign a route optimization score to each set of candidate movement characteristics of the plurality of sets of candidate movement characteristics; determine a set of movement characteristics for the movable object that has a highest route optimization score; and wherein selecting the set of movement characteristics for the movable object includes selecting the set of candidate movement characteristics for the movable object that has the highest route optimization score

2526
Determine a route optimization score to assign to a respective set of candidate movement characteristics based at least in part on differences between the set of candidate movement characteristics and the set of current movement characteristics of the movable object

2528
Predict, for a set of candidate movement characteristics, a distance between the movable object and the target at a predetermined future time; and determine a route optimization score to assign to the set of candidate movement characteristics based at least in part on the predicted distance between the movable object and the target at the predetermined future time

2530
Predicting the distance between the movable object and the target at a predetermined future time includes obtaining at least one current movement characteristic of the target, and predicting the distance using the obtained at least one current movement characteristic of the target

2512
Assign a route optimization score to each set of candidate movement characteristics of the plurality of sets of candidate movement characteristics; determine a set of movement characteristics for the movable object that has a highest route optimization score; and wherein selecting the set of movement characteristics for the movable object includes selecting the set of candidate movement characteristics for the movable object that has the highest route optimization score

2532
Assign a route optimization score to each set of candidate movement characteristics of the plurality of sets of candidate movement characteristics; determine a set of movement characteristics for the movable object that has a highest route optimization score; determine whether the set of movement characteristics for the movable object that has the highest route optimization score complies with constraint criteria; in response to determining that the set of candidate movement characteristics complies with the constraint criteria, select the set of movement characteristics for the movable object that has the highest route optimization score; and in response to determining that the set of candidate movement characteristics does not comply with the constraint criteria, select an alternative set of movement characteristics for the movable object

2534
The constraint criteria include a maximum linear velocity of the movable object

2536
The constraint criteria include a maximum angular velocity of the movable object

2538
The plurality of sets of candidate movement characteristics are generated subject to constraint criteria

2540
The constraint criteria include a maximum linear velocity of the movable object

2542
The constraint criteria include a include a maximum angular velocity of the movable object

2544
A respective set of candidate movement characteristics includes a y-axis movement characteristic and a z-axis movement characteristic

2546
The y-axis movement characteristic and the z-axis movement characteristic are determined in a frame of reference of the movable object

2548
The respective set of candidate movement characteristics includes a y-axis velocity and a z-axis velocity

2550
The plurality of sets of candidate movement characteristics include:
a respective set of candidate movement characteristics including a negative y-axis velocity value and a negative z-axis velocity value;
a set of candidate movement characteristics including a negative y-axis velocity value and a positive z-axis velocity value;
a set of candidate movement characteristics including a positive y-axis velocity value and a negative z-axis velocity value; and
a set of candidate movement characteristics including a positive y-axis velocity value and a positive z-axis velocity value

2552
A respective set of candidate movement characteristics includes an x-axis movement characteristic and an angular velocity

2554
The x-axis movement characteristic and the angular velocity are determined in a frame of reference of the movable object

2556
The x-axis movement characteristic is a velocity

2558
The plurality of sets of candidate movement characteristics include:
a set of candidate movement characteristics including a negative x-axis velocity value and a negative angular velocity value;
a set of candidate movement characteristics including a negative x-axis velocity value and a positive angular velocity value;
a set of candidate movement characteristics including a positive x-axis velocity value and a negative angular velocity value; and
a set of candidate movement characteristics including a positive x-axis velocity value and a positive angular velocity value

2560
Determine a size of the obstacle; determine whether the size of the obstacle meets first obstacle size criteria, wherein: in response to determining that the size of the obstacle meets first obstacle size criteria, the multiple sets of candidate movement characteristics include movement of the movable object along a y-axis and a z-axis relative to the movable object, and in response to determining that the size of the obstacle does not meet first obstacle size criteria, a respective set of candidate movement characteristics of the multiple sets of candidate movement characteristics include: movement of the movable object along an x-axis relative to the movable object, and angular velocity of the movable object.

Figure 25G

OBSTACLE AVOIDANCE DURING TARGET TRACKING

CROSS-REFERENCE TO RELATED APPLICATIONS

This application is a continuation of application Ser. No. 16/114,968, filed on Aug. 28, 2018, which is a continuation of International Application No. PCT/CN2016/074821, filed on Feb. 29, 2016, the entire contents of both of which are incorporated herein by reference.

TECHNICAL FIELD

The disclosed embodiments relate generally to target tracking and more particularly, but not exclusively, to obstacle avoidance during tracking.

BACKGROUND

Movable objects such as unmanned aerial vehicles (UAVs) can be used for performing surveillance, reconnaissance, and exploration tasks for military and civilian applications. A movable object may carry a payload configured to perform a specific function, such as capturing images of the surrounding environment or tracking a specific target. For example, a movable object may track an object moving along the ground or through the air. Movement control information for controlling a movable object is typically received by the movable object from a remote device and/or determined by the movable object.

When an obstacle is detected between a movable object and a target, additional movement control information may be generated for the movable object to avoid the obstacle while tracking the target simultaneously.

SUMMARY

There is a need for systems and methods for obstacle avoidance during target tracking. Such systems and methods optionally complement or replace conventional methods for obstacle avoidance.

In accordance with some embodiments, a method for controlling a movable object includes obtaining current location information of an obstacle while the movable object tracks a target. The method determines, based on the current location information of the obstacle, whether a location of the obstacle corresponds to a reactive region relative to the movable object. In response to determining that the location of the obstacle corresponds to the reactive region, one or more movement characteristics of the movable object are adjusted in a reactive manner such that collision of the movable object with the obstacle is avoided. In response to determining that the location of the obstacle does not correspond to the reactive region, one or more movement characteristics of the movable object are adjusted in a proactive manner such that a distance between the movable object and the obstacle exceeds a first predefined distance.

In accordance with some embodiments, a system for controlling a movable object comprises one or more processors; memory; and one or more programs, wherein the one or more programs are stored in the memory and configured to be executed by the one or more processors, the one or more programs including instructions for: obtaining current location information of an obstacle while the movable object tracks a target; determining, based on the current location information of the obstacle, whether a location of the obstacle corresponds to a reactive region relative to the movable object; in response to determining that the location of the obstacle corresponds to the reactive region, adjusting one or more movement characteristics of the movable object in a reactive manner such that collision of the movable object with the obstacle is avoided; and, in response to determining that the location of the obstacle does not correspond to the reactive region, adjusting one or more movement characteristics of the movable object in a proactive manner such that a distance between the movable object and the obstacle exceeds a first predefined distance.

In accordance with some embodiments, a non-transitory computer readable storage medium stores one or more programs, the one or more programs comprising instructions, which when executed by a movable object, cause the movable object to: obtain current location information of an obstacle while the movable object tracks a target; determine, based on the current location information of the obstacle, whether a location of the obstacle corresponds to a reactive region relative to the movable object; in response to determining that the location of the obstacle corresponds to the reactive region, adjust one or more movement characteristics of the movable object in a reactive manner such that collision of the movable object with the obstacle is avoided; and, in response to determining that the location of the obstacle does not correspond to the reactive region, adjust one or more movement characteristics of the movable object in a proactive manner such that a distance between the movable object and the obstacle exceeds a first predefined distance.

In accordance with some embodiments, an unmanned aerial vehicle (UAV) comprises: a propulsion system and one or more sensors. The UAV is configured to: obtain, using the one or more sensors, current location information of an obstacle while the UAV tracks a target; determine, based on the current location information of the obstacle, whether a location of the obstacle corresponds to a reactive region relative to the UAV; in response to determining that the location of the obstacle corresponds to the reactive region, adjust one or more movement characteristics of the UAV in a reactive manner such that collision of the UAV with the obstacle is avoided; and, in response to determining that the location of the obstacle does not correspond to the reactive region, adjust one or more movement characteristics of the UAV in a proactive manner such that a distance between the UAV and the obstacle exceeds a first predefined distance.

In accordance with some embodiments, a method for controlling a movable object, the method comprises: obtaining current location information of an obstacle while the movable object tracks a target; determining, based on the current location information of the obstacle, whether a location of the obstacle corresponds to a reactive region relative to the movable object; in response to determining that the location of the obstacle corresponds to the reactive region: adjusting one or more movement characteristics of the movable object; updating targeting information based on a distance between the obstacle and the movable object; and sending the updated targeting information to a control unit, wherein the control unit is configured to update a displayed user interface in accordance with the updated targeting information.

In accordance with some embodiments, a system for controlling a movable object, the system comprises one or more processors, memory; and one or more programs, wherein the one or more programs are stored in the memory and configured to be executed by the one or more processors, the one or more programs including instructions for:

obtaining current location information of an obstacle while the movable object tracks a target; determining, based on the current location information of the obstacle, whether a location of the obstacle corresponds to a reactive region relative to the movable object; in response to determining that the location of the obstacle corresponds to the reactive region, adjusting one or more movement characteristics of the movable object; updating targeting information based on a distance between the obstacle and the movable object; and sending the updated targeting information to a control unit, wherein the control unit is configured to update a displayed user interface in accordance with the updated targeting information.

In accordance with some embodiments, a non-transitory computer readable storage medium stores one or more programs, the one or more programs comprising instructions, which when executed by a movable object, cause the movable object to: obtain current location information of an obstacle while the movable object tracks a target; determine, based on the current location information of the obstacle, whether a location of the obstacle corresponds to a reactive region relative to the movable object; in response to determining that the location of the obstacle corresponds to the reactive region, adjust one or more movement characteristics of the movable object; update targeting information based on a distance between the obstacle and the movable object; and send the updated targeting information to a control unit, wherein the control unit is configured to update a displayed user interface in accordance with the updated targeting information.

In accordance with some embodiments, an unmanned aerial vehicle (UAV) comprises a propulsion system and one or more sensors. The UAV is configured to: obtain, using the one or more sensors, current location information of an obstacle while the movable object tracks a target; determine, based on the current location information of the obstacle, whether a location of the obstacle corresponds to a reactive region relative to the movable object; in response to determining that the location of the obstacle corresponds to the reactive region, adjust one or more movement characteristics of the movable object; update targeting information based on a distance between the obstacle and the movable object; and send the updated targeting information to a control unit, wherein the control unit is configured to update a displayed user interface in accordance with the updated targeting information.

In accordance with some embodiments, a method for controlling a movable object, comprises obtaining current location information of an obstacle while the movable object tracks a target; generating a plurality of sets of candidate movement characteristics for the movable object based on the current location information of the obstacle and a set of current movement characteristics of the movable object; selecting, from the plurality of sets of candidate movement characteristics for the movable object, a set of movement characteristics for the movable object; and adjusting one or more movement characteristics of the movable object based on the selected set of movement characteristics for the movable object.

In accordance with some embodiments, a system for controlling a movable object, the system comprises one or more processors; memory; and one or more programs, wherein the one or more programs are stored in the memory and configured to be executed by the one or more processors, the one or more programs including instructions for: obtaining current location information of an obstacle while the movable object tracks a target; generating a plurality of sets of candidate movement characteristics for the movable object based on the current location information of the obstacle and a set of current movement characteristics of the movable object; selecting, from the plurality of sets of candidate movement characteristics for the movable object, a set of movement characteristics for the movable object; and adjusting one or more movement characteristics of the movable object based on the selected set of movement characteristics for the movable object.

In accordance with some embodiments, a non-transitory computer readable storage medium stores one or more programs, the one or more programs comprising instructions, which when executed by a movable object, cause the movable object to: obtain current location information of an obstacle while the movable object tracks a target; generate a plurality of sets of candidate movement characteristics for the movable object based on the current location information of the obstacle and a set of current movement characteristics of the movable object; select, from the plurality of sets of candidate movement characteristics for the movable object, a set of movement characteristics for the movable object; and adjust one or more movement characteristics of the movable object based on the selected set of movement characteristics for the movable object.

In accordance with some embodiments, an unmanned aerial vehicle (UAV) comprises a propulsion system and one or more sensors. The UAV is configured to: obtain, using the one or more sensors, current location information of an obstacle while the movable object tracks a target; generate a plurality of sets of candidate movement characteristics for the movable object based on the current location information of the obstacle and a set of current movement characteristics of the movable object; select, from the plurality of sets of candidate movement characteristics for the movable object, a set of movement characteristics for the movable object; and adjust one or more movement characteristics of the movable object based on the selected set of movement characteristics for the movable object.

BRIEF DESCRIPTION OF THE DRAWINGS

FIG. 2B illustrates an exemplary carrier of a movable object, in accordance with some embodiments.

FIG. 10 illustrates an exemplary tracking method for maintaining an expected size of a target, in accordance with some embodiments.

FIGS. 23A-23F are a flow diagram illustrating a method for controlling a movable object, in accordance with some embodiments.

FIGS. 24A-24G are a flow diagram illustrating a method for controlling a movable object, in accordance with some embodiments.

FIGS. 25A-25G are a flow diagram illustrating a method for controlling a movable object, in accordance with some embodiments.

DETAILED DESCRIPTION

Figure 1:
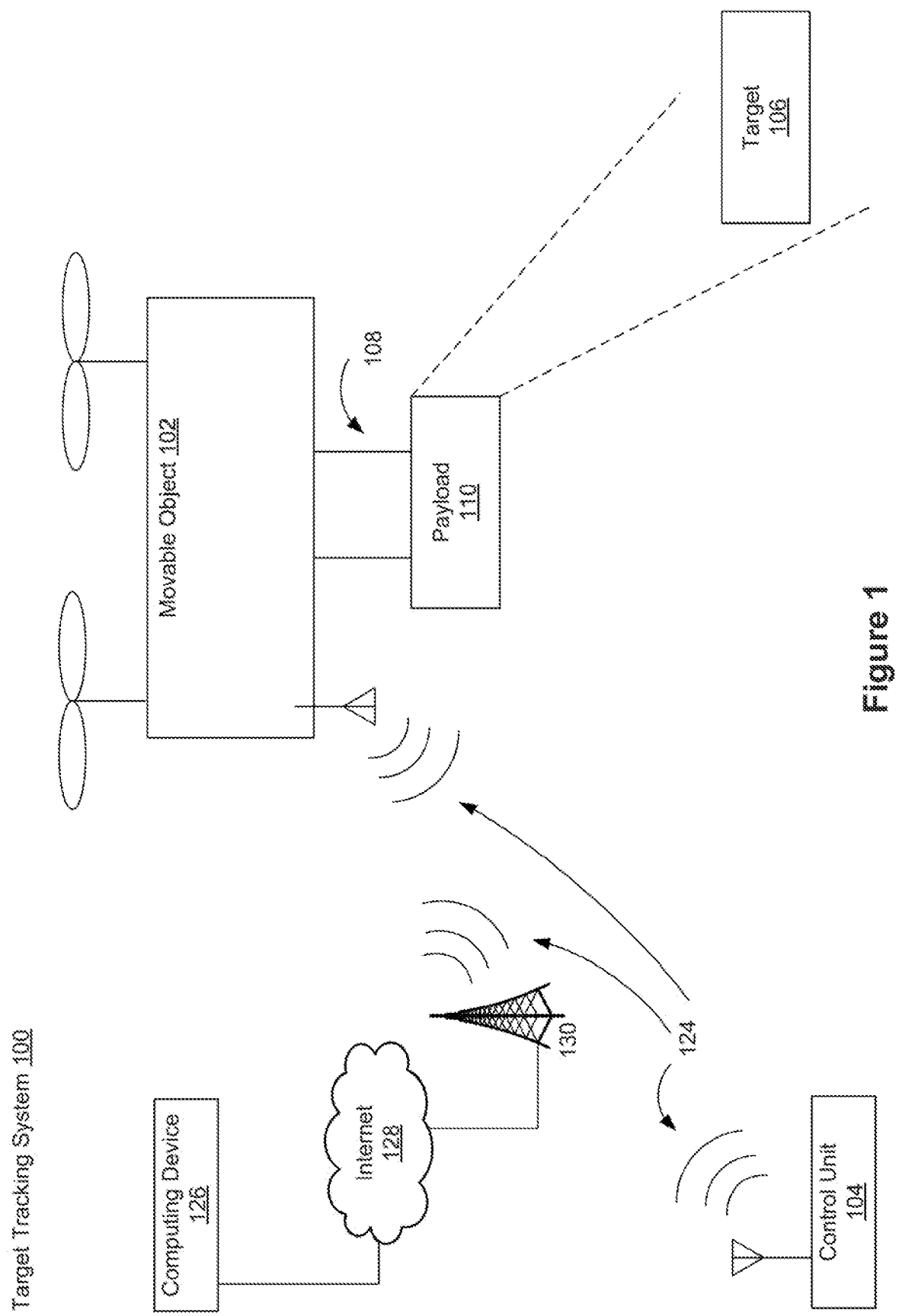
FIG. 1 illustrates a target tracking system, in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. It will be apparent to those skilled in the art that other types of movable objects may be substituted for UAVs as described below in accordance with embodiments of the disclosure.

The present disclosure provides describes techniques related to target tracking by UAVs. In some embodiments, a UAV is configured to receive target information from a remote control unit, such as a user-operated device. The target information is related to a target to be tracked by an imaging device coupled to the UAV. The target information is used by the UAV to cause the imaging device to automatically track the target, e.g., to maintain a predetermined position and/or size of the target within one or more images captured by the imaging device. In some embodiments, tracking of the target is performed while the UAV is controlled by communications from a control unit, such as communications including user commands and/or predetermined navigation paths. In some embodiments, the control unit is configured to display images from the imaging device as well as allowing user input related to the target information.

In some embodiments, a user selects a target from an image displayed on a user interface of the control unit. For example, the image is displayed and the input is received via a touchscreen of the control unit. In some embodiments, when the target information is configured, the control unit and/or UAV manage operations associated with target tracking. Managing target tracking operations includes, e.g., adjusting motion of the UAV, adjusting the carrier and/or adjusting the imaging device. For example, the attitude, position, velocity, zoom, and/or other aspects of the UAV and/or imaging device are automatically adjusted to ensure that the target is maintained at a designated position and/or size within the images captured by the imaging device. In some embodiments, images captured during the tracking process (e.g., videos or pictures) are streamed to the control unit in real time or substantially real time for display, playback, storage, and/or other purposes. In this manner, a user is enabled to manage target tracking (e.g., by selecting a target for tracking) without the burden of managing operations involved in piloting the UAV to maintain a view of the target.

In accordance with various embodiments described herein, a UAV avoids obstacles detected while the UAV tracks a target. When an obstacle is detected, a distance between the UAV and the obstacle is determined. If the obstacle does not pose an immediate threat to the safety of the UAV (e.g., still far from the UAV), movement characteristics of the UAV are adjusted in a proactive manner to maintain a predetermined distance between the obstacle and the UAV. Proactive adjustment of movement characteristics may include selecting a set of potential motion adjustment options and determining route optimization scores for each option. Movement of the UAV is adjusted in accordance with the adjustment option that has the highest route optimization score or at least a route optimization score above a predefined threshold. If the obstacle may cause an immediate threat to the safety of the UAV (e.g., very close to the UAV), movement characteristics of the UAV are adjusted in a reactive manner to avoid collision of the UAV with the obstacle ranging from reducing acceleration or velocity of the UAV to reversing the motion of the UAV, depending on how close the UAV is to the obstacle.

FIG. 1 illustrates a target tracking system 100, in accordance with various embodiments of the present disclosure. Target tracking system 100 includes a movable object 102 and a control unit 104. In some embodiments, target tracking system 100 is used to track target 106.

In some embodiments, target 106 includes natural and/or man-made objects such geographical landscapes (e.g., mountains, vegetation, valleys, lakes, and/or rivers), buildings, and/or vehicles (e.g., aircrafts, ships, cars, trucks, buses, vans, and/or motorcycles). In some embodiments, the target 106 includes live subjects such as people and/or animals. In some embodiments, target 106 is moving, e.g., moving relative to a reference frame (such as the Earth and/or movable object 102). In some embodiments, target 106 is static. In some embodiments, target 106 includes an active target system that transmits information about target 106, such as the target's GPS location, to movable object 102, control unit 104, and/or computing device 126. For example, information is transmitted to movable object 102 via wireless communication from a communication unit of the active target to communication system 120 of movable object 102. Active targets include, e.g., friendly vehicles, buildings, and/or troops. In some embodiments, target 106 includes a passive target (e.g., that does not transmit information about target 106). Passive targets include, e.g., neutral or hostile vehicles, buildings, and/or troops.

In some embodiments, movable object 102 is configured to communicate with control unit 104, e.g., via wireless communications 124. For example, movable object 102 receives control instructions from control unit 104 and/or sends data (e.g., data from movable object sensing system 122) to control unit 104.

Control instructions include, e.g., navigation instructions for controlling navigational parameters of movable object 102 such as position, orientation, attitude, and/or one or more movement characteristics of movable object 102, carrier 108, and/or payload 110. In some embodiments, control instructions include instructions directing movement of one or more of movement mechanisms 114. For example, control instructions are used to control flight of a UAV. In some embodiments, control instructions include information for controlling operations (e.g., movement) of carrier 108. For example, control instructions are used to control an actuation mechanism of carrier 108 so as to cause angular and/or linear movement of payload 110 relative to movable object 102. In some embodiments, control instructions are used to adjust one or more operational parameters for payload 110, such as instructions for capturing one or more images, capturing video, adjusting a zoom level, powering on or off, adjusting an imaging mode (e.g., capturing still images or capturing video), adjusting an image resolution, adjusting a focus, adjusting a viewing angle, adjusting a field of view, adjusting a depth of field, adjusting an exposure time, adjusting a shutter speed, adjusting a lens speed, adjusting an ISO, changing a lens and/or moving payload 110 (and/or a part of payload 110, such as imaging device 214). In some embodiments, the control instructions are used to control communication system 120, sensing system 122, and/or another component of movable object 102.

In some embodiments, control instructions from control unit 104 include target information, as described further below with regard to FIG. 7.

In some embodiments, movable object 102 is configured to communicate with computing device 126. For example, movable object 102 receives control instructions from computing device 126 and/or sends data (e.g., data from movable object sensing system 122) to computing device 126. In some embodiments, communications from computing device 126 to movable object 102 are transmitted from computing device 126 to cell tower 130 (e.g., via internet 128) and from cell tower 130 to movable object 102 (e.g., via RF signals). In some embodiments, a satellite is used in lieu of or in addition to cell tower 130.

In some embodiments, target tracking system includes additional control units 104 and/or computing devices 126 configured to communicate with movable object 102.

Figure 2A:
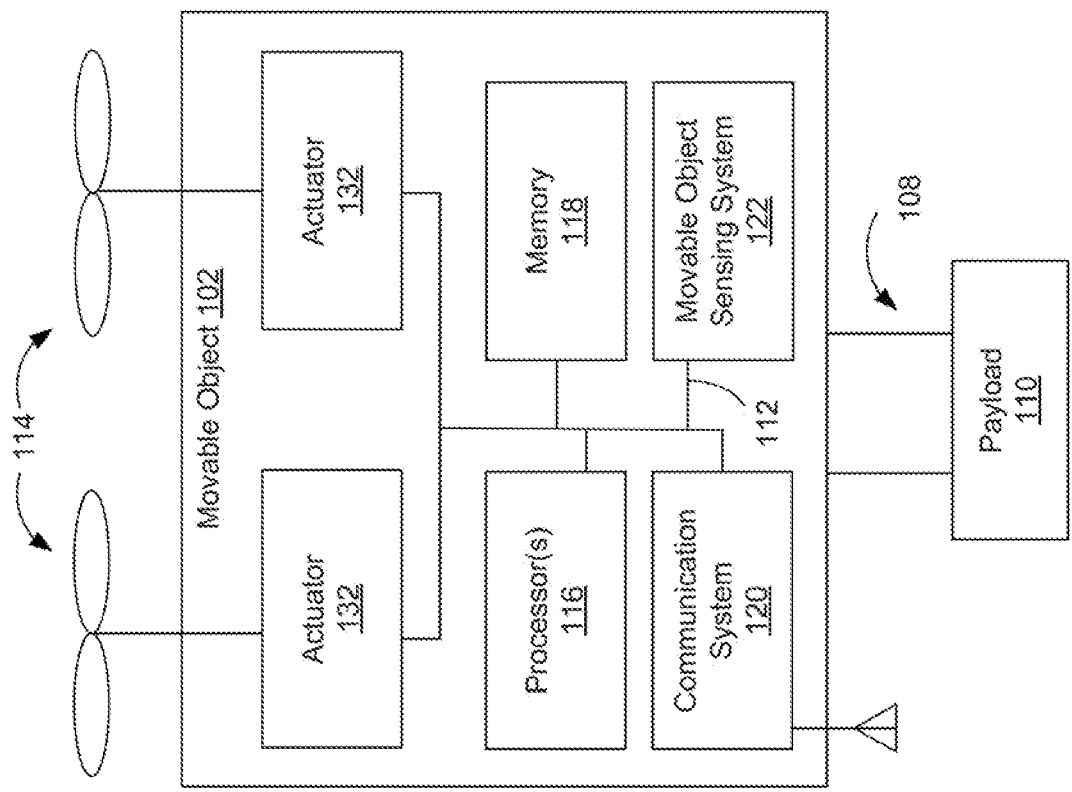
FIG. 2A illustrates an exemplary movable object in a target tracking system, in accordance with some embodiments.

FIG. 2A illustrates an exemplary movable object 102 in a target tracking system 100, in accordance with some embodiments. In some embodiments, one or more components of movable object, such as processor(s) 116, memory 118, communication system 120, and sensing system 122, are connected by data connections, such as a control bus 112. A control bus optionally includes circuitry (sometimes called a chipset) that interconnects and controls communications between system components.

Movable object 102 typically includes one or more processing units 116, memory 118, one or more network or other communications interfaces 120, sensing system 112, and one or more communication buses 112 for interconnecting these components. In some embodiments, movable object 102 is a UAV. Although movable object 102 is depicted as an aircraft, this depiction is not intended to be limiting, and any suitable type of movable object can be used.

In some embodiments, movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). Movement mechanisms 114 include one or more movement mechanism types such as rotors, propellers, blades, engines, motors, wheels, axles, magnets, nozzles, animals, and/or human beings. Movement mechanisms 114 are coupled to movable object 102 at, e.g., the top, bottom, front, back, and/or sides. In some embodiments movement mechanisms 114 of a single movable object 102 include multiple movement mechanisms each having the same type. In some embodiments, movement mechanisms 114 of a single movable object 102 include multiple movement mechanisms having different movement mechanism types. Movement mechanisms 114 are coupled to movable object 102 (or vice-versa) using any suitable means, such as support elements (e.g., drive shafts) or other actuating elements (e.g., actuators 132). For example, an actuator 132 receives control signals from processor(s) 116 (e.g., via control bus 112) that activates the actuator to cause movement of a movement mechanism 114. For example, processor(s) 116 include an electronic speed controller that provides control signals to actuators 134.

In some embodiments, the movement mechanisms 114 enable movable object 102 to take off vertically from a surface or land vertically on a surface without requiring any horizontal movement of movable object 102 (e.g., without traveling down a runway). In some embodiments, movement mechanisms 114 are operable to permit movable object 102 to hover in the air at a specified position and/or orientation. In some embodiments, one or more of the movement mechanisms 114 are controllable independently of one or more of the other movement mechanisms 114. For example, when movable object 102 is a quadcopter, each rotor of the quadcopter is controllable independently of the other rotors of the quadcopter. In some embodiments, multiple movement mechanisms 114 are configured for simultaneous movement.

In some embodiments, movement mechanisms 114 include multiple rotors that provide lift and/or thrust to movable object. The multiple rotors are actuated to provide, e.g., vertical takeoff, vertical landing, and hovering capabilities to movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of movable object 102 (e.g., with respect to up to three degrees of translation and/or up to three degrees of rotation).

In some embodiments, carrier 108 is coupled to movable object 102. A payload 110 is coupled to carrier 108. In some embodiments, carrier 108 includes one or more mechanisms that enable payload 110 to move relative to movable object 102, as described further with reference to FIG. 2B. In some embodiments, payload 110 is rigidly coupled to movable object 102 such that payload 110 remains substantially stationary relative to movable object 102. For example, carrier 108 is coupled to payload 110 such that payload is not movable relative to movable object 102. In some embodiments, payload 110 is coupled to movable object 102 without requiring carrier 108.

Communication system 120 enables communication with control unit 104 and/or computing device 126, e.g., via wireless signals 124. The communication system 120 includes, e.g., transmitters, receivers, and/or transceivers for wireless communication. In some embodiments, the communication is one-way communication, such that data is transmitted only from movable object 102 to control unit 104, or vice-versa. In some embodiments, communication is two-way communication, such that data is transmitted in both directions between movable object 102 and control unit 104.

In some embodiments, movable object 102 communicates with computing device 126. In some embodiments, movable object 102, control unit 104, and/or the remote device are connected to the Internet or other telecommunications network, e.g., such that data generated by movable object 102, control unit 104, and/or computing device 126 is transmitted to a server for data storage and/or data retrieval (e.g., for display by a website).

Figure 3:
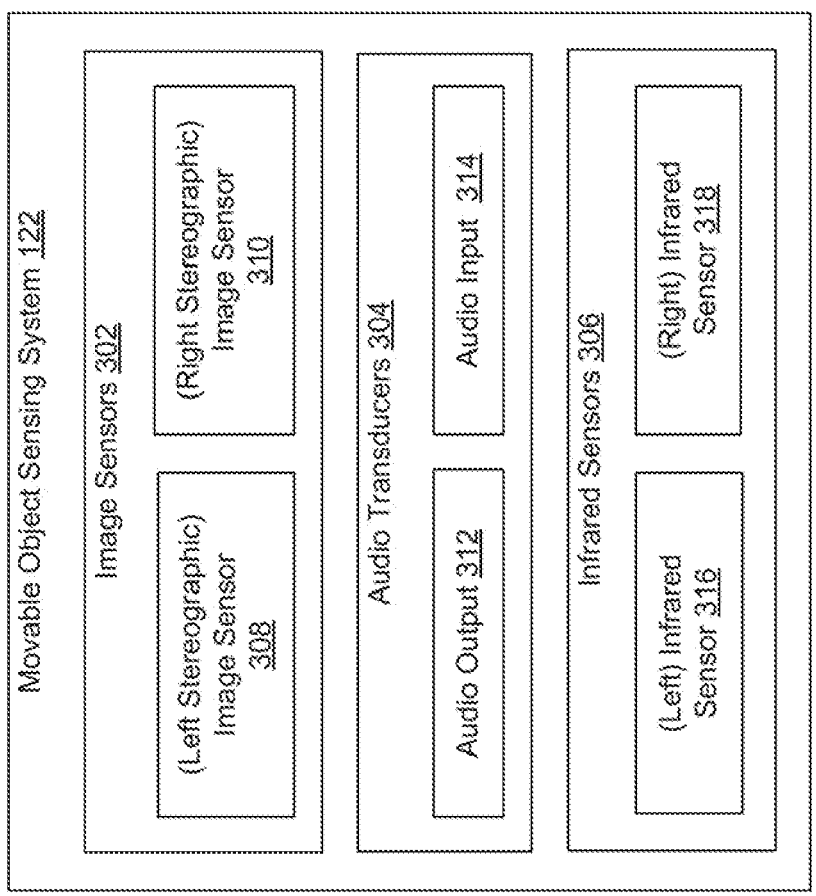
FIG. 3 illustrates an exemplary sensing system of a movable object, in accordance with some embodiments.

In some embodiments, sensing system 122 of movable object 102 includes one or more sensors, as described further with reference to FIG. 3. In some embodiments, movable object 102 and/or control unit 104 use sensing data generated by sensors of sensing system 122 to determine information such as a position of movable object 102, an orientation of movable object 102, movement characteristics of movable object 102 (e.g., angular velocity, angular acceleration, translational velocity, translational acceleration and/or direction of motion along one or more axes), proximity of movable object 102 to potential obstacles, weather conditions, locations of geographical features and/or locations of manmade structures.

FIG. 2B illustrates an exemplary carrier 108 in a target tracking system 100, in accordance with embodiments. In some embodiments, carrier 108 couples a payload 110 to a movable object 102.

In some embodiments, carrier 108 includes a frame assembly including one or more frame members 202. In some embodiments, frame member 202 is coupled with movable object 102 and payload 110. In some embodiments, frame member 202 supports payload 110.

In some embodiments, carrier 108 includes one or more mechanisms, such as one or more actuators 204, to cause movement of carrier 108 and/or payload 110. Actuator 204 is, e.g., a motor, such as a hydraulic, pneumatic, electric, thermal, magnetic, and/or mechanical motor. In some embodiments, actuator 204 causes movement of frame member 202. In some embodiments, actuator 204 rotates payload 110 about one or more axes, such as three axes: X axis ("pitch axis"), Z axis ("roll axis"), and Y axis ("yaw axis"), relative to movable object 102. In some embodiments, actuator 204 translates payload 110 along one or more axes relative to movable object 102.

In some embodiments, carrier 108 includes one or more carrier sensing system 206, e.g., for determining a state of carrier 108 or payload 110. Carrier sensing system 206 includes, e.g., motion sensors (e.g., accelerometers), rotation sensors (e.g., gyroscopes), potentiometers, and/or inertial sensors. In some embodiments, carrier sensing system 206 includes one or more sensors of movable object sensing system 122 as described below with regard to FIG. 3. Sensor data determined by carrier sensing system 206 includes, e.g., spatial disposition (e.g., position, orientation, or attitude) and/or movement information such as velocity (e.g., linear or angular velocity) and/or acceleration (e.g., linear or angular acceleration) of carrier 108 and/or payload 110. In some embodiments, sensing data and/or state information calculated from the sensing data are used as feedback data to control the movement of one or more components (e.g., frame member 202, actuator 204, and/or damping element 208) of carrier 108. Carrier sensor 206 is coupled to, e.g., frame member 202, actuator 204, damping element 208, and/or payload 110. In an embodiment, a carrier sensor 206 (e.g., a potentiometer) measures movement of actuator 204 (e.g., the relative positions of a motor rotor and a motor stator) and generates a position signal representative of the movement of the actuator 204 (e.g., a position signal representative of relative positions of the motor rotor and the motor stator). In some embodiments, data generated by a carrier sensor 206 is received by processor(s) 116 and/or memory 118 of movable object 102.

In some embodiments, the coupling of carrier 108 to movable object 102 includes one or more damping elements 208. Damping elements 208 are configured to reduce or eliminate movement of the load (e.g., payload 110 and/or carrier 108) caused by movement of movable object 102. Damping elements 208 include, e.g., active damping elements, passive damping elements, and/or hybrid damping elements having both active and passive damping characteristics. The motion damped by the damping elements 208 can include one or more of vibrations, oscillations, shaking, or impacts. Such motions may originate from motions of movable object that are transmitted to the load. For example, the motion may include vibrations caused by the operation of a propulsion system and/or other components of a movable object 101.

In some embodiments, a damping element 208 provides motion damping by isolating the load from the source of unwanted motion by dissipating or reducing the amount of motion transmitted to the load (e.g., vibration isolation). In some embodiments, damping element 208 reduces the magnitude (e.g., amplitude) of the motion that would otherwise be experienced by the load. In some embodiments the motion damping applied by a damping element 208 is used to stabilize the load, thereby improving the quality of images captured by the load (e.g., image capturing device), as well as reducing the computational complexity of image stitching steps required to generate a panoramic image based on the captured images.

Damping element 208 described herein can be formed from any suitable material or combination of materials, including solid, liquid, or gaseous materials. The materials used for the damping elements may be compressible and/or deformable. For example, the damping element 208 is made of, e.g. sponge, foam, rubber, gel, and the like. For example, damping element 208 includes rubber balls that are substantially spherical in shape. The damping element 208 is, e.g., substantially spherical, rectangular, and/or cylindrical. In some embodiments, damping element 208 includes piezoelectric materials or shape memory materials. In some embodiments, damping elements 208 include one or more mechanical elements, such as springs, pistons, hydraulics, pneumatics, dashpots, shock absorbers, isolators, and the like. In some embodiments, properties of the damping element 208 are selected so as to provide a predetermined amount of motion damping. In some instances, the damping element 208 has viscoelastic properties. The properties of damping element 208 are, e.g., isotropic or anisotropic. In some embodiments, damping element 208 provides motion damping equally along all directions of motion. In some embodiments, damping element 208 provides motion damping only along a subset of the directions of motion (e.g., along a single direction of motion). For example, the damping element 208 may provide damping primarily along the Y (yaw) axis. In this manner, the illustrated damping element 208 reduces vertical motions.

In some embodiments, carrier 108 includes controller 210. Controller 210 includes, e.g., one or more controllers and/or processors. In some embodiments, controller 210 receives instructions from processor(s) 116 of movable object 102. For example, controller 210 is connected to processor(s) 116 via control bus 112. In some embodiments, controller 210 controls movement of actuator 204, adjusts one or more parameters of carrier sensor 206, receives data from carrier sensor 206, and/or transmits data to processor 116.

Figure 2C:
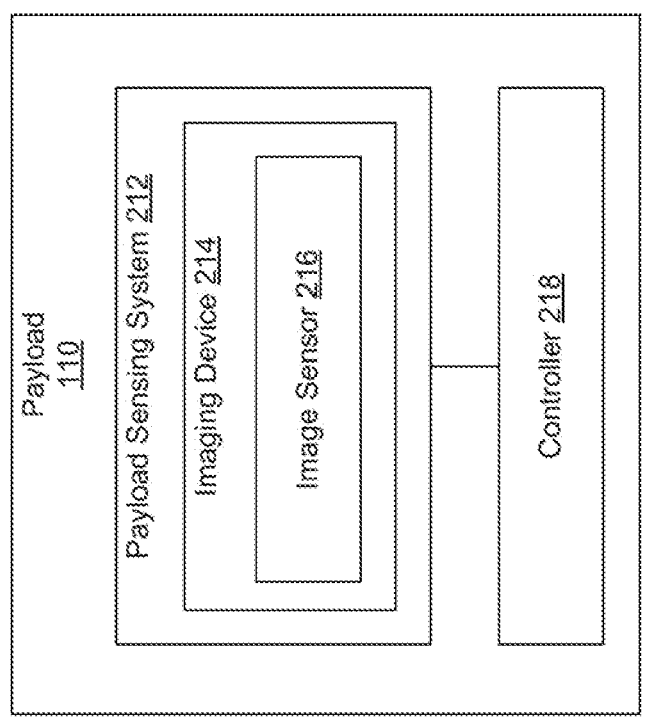
FIG. 2C illustrates an exemplary payload of a movable object, in accordance with some embodiments.

FIG. 2C illustrates an exemplary payload 110 in a target tracking system 100, in accordance with some embodiments. In some embodiments, payload 110 includes a payload sensing system 212 and a controller 218. In some embodiments, payload sensing system 212 includes an imaging device 214, such as a camera. In some embodiments, payload sensing system 212 includes one or more sensors of movable object sensing system 122 as described below with regard to FIG. 3.

Payload sensing system 212 generates static sensing data (e.g., a single image captured in response to a received instruction) and/or dynamic sensing data (e.g., a series of images captured at a periodic rate, such as a video). Imaging device 214 includes, e.g., an image sensor 216 to detect light (such as visible light, infrared light, and/or ultraviolet light. In some embodiments, imaging device 214 includes one or more optical devices (e.g., lenses) to focus or otherwise alter the light onto image sensor 216.

In some embodiments, image sensors 216 includes, e.g., semiconductor charge-coupled devices (CCD), active pixel sensors using complementary metal-oxide-semiconductor (CMOS) or N-type metal-oxide-semiconductor (NMOS, Live MOS) technologies, or any other types of sensors. Image sensor 216 and/or imaging device 214 capture, e.g., images and/or image streams (e.g., videos). Adjustable parameters of imaging device 214 include, e.g., width, height, aspect ratio, pixel count, resolution, quality, imaging mode, focus distance, depth of field, exposure time, shutter speed and/or lens configuration. In some embodiments, imaging device 214 is configured to capture high-definition or ultra-high-definition videos (e.g., 720p, 1080i, 1080p, 1440p, 2000p, 2160p, 2540p, 4000p, 4320p, and so on).

In some embodiments, payload 110 includes controller 218. Controller 218 includes, e.g., one or more controllers and/or processors. In some embodiments, controller 218 receives instructions from processor(s) 116 of movable object 102. For example, controller 218 is connected to processor(s) 116 via control bus 112. In some embodiments, controller 218 adjusts one or more parameters of one or more sensors of payload sensing system 212; receives data from one or more sensors of payload sensing system 212; and/or transmits data, such as image data from image sensor 216, to processor 116, memory 118, and/or control unit 104.

In some embodiments, data generated by one or more sensors of payload sensor system 212 is stored, e.g., by memory 118. In some embodiments, data generated by payload sensor system 212 are transmitted to control unit 104 (e.g., via communication system 120). For example, video is streamed from payload 110 (e.g., imaging device 214) to control unit 104. In this manner, control unit 104 displays, e.g., real-time (or slightly delayed) video received from imaging device 214.

In some embodiments, adjustment to the orientation, position, attitude, and/or one or more movement characteristics of movable object 102, carrier 108, and/or payload 110 is generated based at least in part on configurations (e.g., preset and/or user configured in system configuration 400) of movable object 102, carrier 108, and/or payload 110. For example, adjustment that involves rotation around two axes (e.g., yaw and pitch) is achieved solely by corresponding rotation of movable object around the two axes if payload 110 including imaging device 214 is rigidly coupled to movable object 102 (and hence not movable relative to movable object 102) and/or payload 110 is coupled to movable object 102 via a carrier 108 that does not permit relative movement between imaging device 214 and movable object 102. The same two-axis adjustment is achieved by, e.g., combining adjustment to both movable object 102 and carrier 108 if carrier 108 permits imaging device 214 to rotate around at least one axis relative to movable object 102. In this case, carrier 108 can be controlled to implement the rotation around one or two of the two axes required for the adjustment and movable object 120 can be controlled to implement the rotation around one or two of the two axes. For example, carrier 108 includes, e.g., a one-axis gimbal that allows imaging device 214 to rotate around one of the two axes required for adjustment while the rotation around the remaining axis is achieved by movable object 102. In some embodiments, the same two-axis adjustment is achieved by carrier 108 alone when carrier 108 permits imaging device 214 to rotate around two or more axes relative to movable object 102. For example, carrier 108 includes a two-axis or three-axis gimbal.

FIG. 3 illustrates an exemplary sensing system 122 of a movable object 102, in accordance with some embodiments. In some embodiments, one or more sensors of movable object sensing system 122 are mounted to the exterior, located within, or otherwise coupled to movable object 102. In some embodiments, one or more sensors of movable object sensing system are components of carrier sensing system 206 and/or payload sensing system 212. Where sensing operations are described as being performed by movable object sensing system 122 herein, it will be recognized that such operations are optionally performed by carrier sensing system 206 and/or payload sensing system 212.

Movable object sensing system 122 generates static sensing data (e.g., a single image captured in response to a received instruction) and/or dynamic sensing data (e.g., a series of images captured at a periodic rate, such as a video).

In some embodiments, movable object sensing system 122 includes one or more image sensors 302, such as image sensor 308 (e.g., a left stereographic image sensor) and/or image sensor 310 (e.g., a right stereographic image sensor). Image sensors 302 capture, e.g., images, image streams (e.g., videos), stereographic images, and/or stereographic image streams (e.g., stereographic videos). Image sensors 302 detect light, such as visible light, infrared light, and/or ultraviolet light. In some embodiments, movable object sensing system 122 includes one or more optical devices (e.g., lenses) to focus or otherwise alter the light onto one or more image sensors 302. In some embodiments, image sensors 302 include, e.g., semiconductor charge-coupled devices (CCD), active pixel sensors using complementary metal-oxide-semiconductor (CMOS) or N-type metal-oxide-semiconductor (NMOS, Live MOS) technologies, or any other types of sensors.

In some embodiments, movable object sensing system 122 includes one or more audio transducers 304. For example, an audio detection system includes audio output transducer 312 (e.g., a speaker), and audio input transducer 314 (e.g. a microphone, such as a parabolic microphone). In some embodiments, microphone and a speaker are used as components of a sonar system. In some embodiments, a sonar system is used to detect current location information of an obstacle (e.g., obstacle 1316 shown in FIG. 15).

In some embodiments, movable object sensing system 122 includes one or more infrared sensors 306. In some embodiments, a distance measurement system includes a pair of infrared sensors e.g., infrared sensor 316 (such as a left infrared sensor) and infrared sensor 318 (such as a right infrared sensor) or another sensor or sensor pair. The distance measurement system is used to, e.g., measure a distance to a target 106 and/or an obstacle 1316.

In some embodiments, a system to produce a depth map includes one or more sensors or sensor pairs of movable object sensing system 122 (such as left stereographic image sensor 308 and right stereographic image sensor 310; audio output transducer 312 and audio input transducer 314; and/or left infrared sensor 316 and right infrared sensor 318. In some embodiments, a pair of sensors in a stereo data system (e.g., a stereographic imaging system) simultaneously captures data from different positions. In some embodiments, a depth map is generated by a stereo data system using the simultaneously captured data. In some embodiments, a depth map is used for positioning and/or detection operations, such as detecting an obstacle 1316, detecting current location information of an obstacle 1316, detecting a target 106, and/or detecting current location information for a target 106.

In some embodiments, movable object sensing system 122 includes one or more global positioning system (GPS) sensors, motion sensors (e.g., accelerometers), rotation sensors (e.g., gyroscopes), inertial sensors, proximity sensors (e.g., infrared sensors) and/or weather sensors (e.g., pressure sensor, temperature sensor, moisture sensor, and/or wind sensor).

In some embodiments, sensing data generated by one or more sensors of movable object sensing system 122 and/or information determined using sensing data from one or more sensors of movable object sensing system 122 are transmitted to control unit 104 (e.g., via communication system 120). In some embodiments, data generated one or more sensors of movable object sensing system 122 and/or information determined using sensing data from one or more sensors of movable object sensing system 122 is stored by memory 118.

Figure 4:
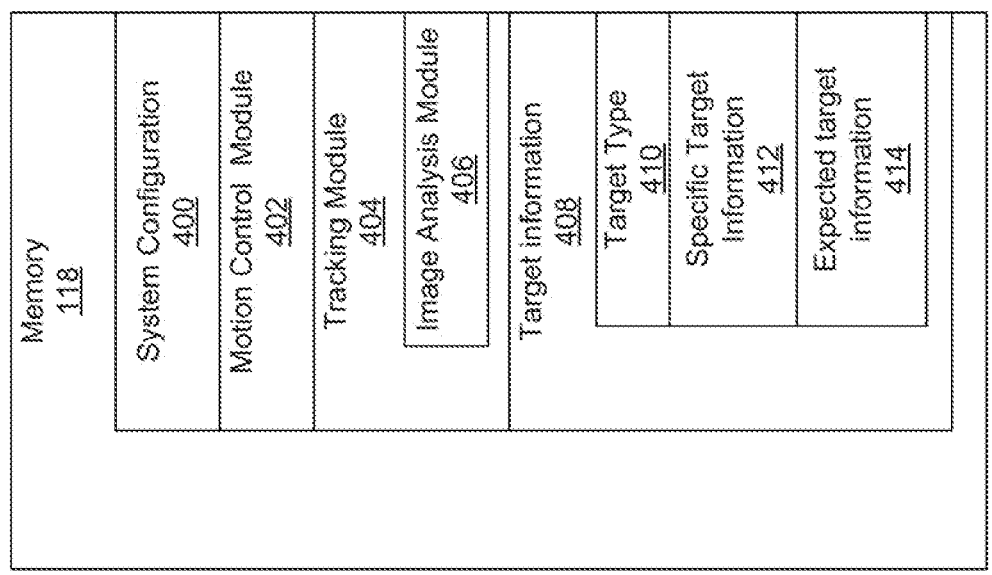
FIG. 4 is a block diagram illustrating an implementation of memory of a movable object, in accordance with some embodiments.

FIG. 4 is a block diagram illustrating an implementation of memory 118, in accordance with some embodiments. In some embodiments, one or more elements illustrated in FIG. 4 are located in control unit 104, computing device 126, and/or another device.

In some embodiments, memory 118 stores a system configuration 400. System configuration 400 includes one or more system settings (e.g., as configured by a manufacturer, administrator, and/or user). For example, a constraint on one or more of orientation, position, attitude, and/or one or more movement characteristics of movable object 102, carrier 108, and/or payload 110 is stored as a system setting of system configuration 400.

In some embodiments, memory 118 stores a motion control module 402. Motion control module stores, e.g., control instructions, such as control instructions received from control module 104 and/or computing device 126. Control instructions are used for, e.g., controlling operation of movement mechanisms 114, carrier 108, and/or payload 110.

In some embodiments, memory 118 stores a tracking module 404. In some embodiments, tracking module 404 generates tracking information for target 106 that is being tracked by movable object 102. In some embodiments, tracking information is generated based on images captured by imaging device 214 and/or output from image analysis module 406 (e.g., after pre-processing and/or processing operations have been performed on one or more images). Tracking information generated by tracking module 404 includes, for example, location, size, or other characteristics of target 106 within one or more images. In some embodiments, tracking information generated by tracking module 404 is transmitted to control unit 104 and/or computing device 126 (e.g., augmenting or otherwise combined with images and/or output from image analysis module 406). For example, tracking information is transmitted to control unit 104 in response to a request from control unit 104 and/or on a periodic basis.

In some embodiments, memory 118 includes an image analysis module 406. Image analysis module 406 performs processing operations on images, such as images captured by imaging device 214. In some embodiments, image analysis module performs pre-processing on raw image data, such as re-sampling to assure the correctness of the image coordinate system, noise reduction, contrast enhancement, and/or scale space representation. In some embodiments, processing operations performed on image data (including image data that has been pre-processed) include feature extraction, image segmentation, data verification, image recognition, image registration, and/or image matching. In some embodiments, output from image analysis module 406 after pre-processing and/or processing operations have been performed on one or more images is transmitted to control unit 104.

In some embodiments, memory 118 stores target information 408. In some embodiments, target information 408 is received by movable object 102 (e.g., via communication system 120) from control unit 104, computing device 126, target 106, and/or another movable object.

In some embodiments, target information 408 includes a time value and/or expiration time indicating a period of time during which the target 106 is to be tracked. In some embodiments, target information 408 includes a flag indicating whether a targeting information entry 408 includes specific target information 412 and/or target type information 410.

In some embodiments, target information 408 includes target type information 410 such as color, texture, pattern, size, shape, and/or dimension. Target type information 410 is, e.g., provided by a user to a user input device, such as a user input device of control unit 104. In some embodiments, the user may select a pre-existing target pattern or type (e.g., a black object or a round object with a radius greater or less than a certain value). In some embodiments, user input to provide target type information includes user selection of one or more targets 106 from within one or more images. In some embodiments, features or characteristics of the selected targets are extracted and/or generalized to produce target type information 410, which is used, e.g., to identify targets with features or characteristics indicated by target type information 410. In some embodiments, feature extraction is performed by control unit 104, processor(s) 116 of movable object 102, and/or computing device 126.

In some embodiments, target information 408 includes specific target information 412 for a specific target 106. Specific target information 412 includes, e.g., an image of target 106, an initial position (e.g., location coordinates, such as pixel coordinates within an image) of target 106, and/or a size of target 106 within one or more images (e.g., images captured by imaging device 214 of payload 110). A size of target 106 is stored, e.g., as a length (e.g., mm or other length unit), an area (e.g., mm² or other area unit), a number of pixels in a line (e.g., indicating a length, width, and/or diameter), a ratio of a length of a representation of the target in an image relative to a total image length (e.g., a percentage), a ratio of an area of a representation of the target in an image relative to a total image area (e.g., a percentage), a number of pixels indicating an area of target 106, and/or a corresponding distance of target 106 from movable object 102 (e.g., an area of target 106 changes based on a distance of target 106 from movable object 102).

In some embodiments, target information 408 includes expected target information 414. Expected target information 414 specifies one or more characteristics of target 106, such as a size parameter (e.g., area, diameter, length and/or width), position (e.g., relative to an image center and/or image boundary), and/or shape. In some embodiments, one or more characteristics of target 106 are determined from an image of target 106 (e.g., using image analysis techniques on images captured by imaging device 112). For example, one or more characteristics of target 106 are determined from an orientation and/or part or all of identified boundaries of target 106. In some embodiments, expected target information includes pixel coordinates and/or pixel counts to indicate, e.g., a size parameter, position, and/or shape of a target 106. In some embodiments, one or more characteristics of the expected target information 414 are to be maintained as movable object 102 tracks target 106 (e.g., the expected target information 414 are to be maintained as images of target 106 are captured by imaging device 214). Expected target information 414 is used, e.g., to adjust movable object 102, carrier 108, and/or imaging device 214, e.g., such that the specified characteristics of target 106 are substantially maintained. In some embodiments, expected target information 414 is determined based on one or more of target type 410 and/or specific target information 412. For example, a size of a target is determined from specific target information 412 (e.g., an image of a target 106) and a value representing an area of the target is stored as expected target information 414.

In some embodiments, target information 408 (including, e.g., target type information 410, information for a specific target 412, and/or expected target information 414) is generated based on user input, such as input received at user input device 506 of control unit 104. Additionally or alternatively, target information is generated based on data from sources other than control unit 104. For example, target type information may be based on stored previous images of target 106 (e.g., images captured by imaging device 214 and stored by memory 118), other data stored by memory 118, and/or data from data stores that are remote from control unit 104 and/or movable object 102. In some embodiments, targeting information is generated using a computer-generated image of target 106.

In some embodiments, target information 408 is used by movable object 102 to track target 106. For example, target information 408 is used by tracking module 404. In some embodiments, target information 408 is used by an image analysis module 406 to identify target 106. In some cases, target identification involves image recognition and/or matching algorithms based on, e.g., CAD-like object models, appearance-based methods, feature-based methods, and/or genetic algorithms. In some embodiments, target identification includes comparing two or more images to determine, extract, and/or match features contained therein.

The above identified modules or programs (i.e., sets of instructions) need not be implemented as separate software programs, procedures or modules, and thus various subsets of these modules may be combined or otherwise re-arranged in various embodiments. In some embodiments, memory 118 may store a subset of the modules and data structures identified above. Furthermore, memory 118 may store additional modules and data structures not described above. In some embodiments, the programs, modules, and data structures stored in memory 118, or a non-transitory computer readable storage medium of memory 118, provide instructions for implementing respective operations in the methods described below. In some embodiments, some or all of these modules may be implemented with specialized hardware circuits that subsume part or all of the module functionality. One or more of the above identified elements may be executed by one or more processors 116 of movable object 102. In some embodiments, one or more of the above identified elements is executed by one or more processors of a device remote from movable object 102, such as control unit 104 and/or computing device 126.

Figure 5:
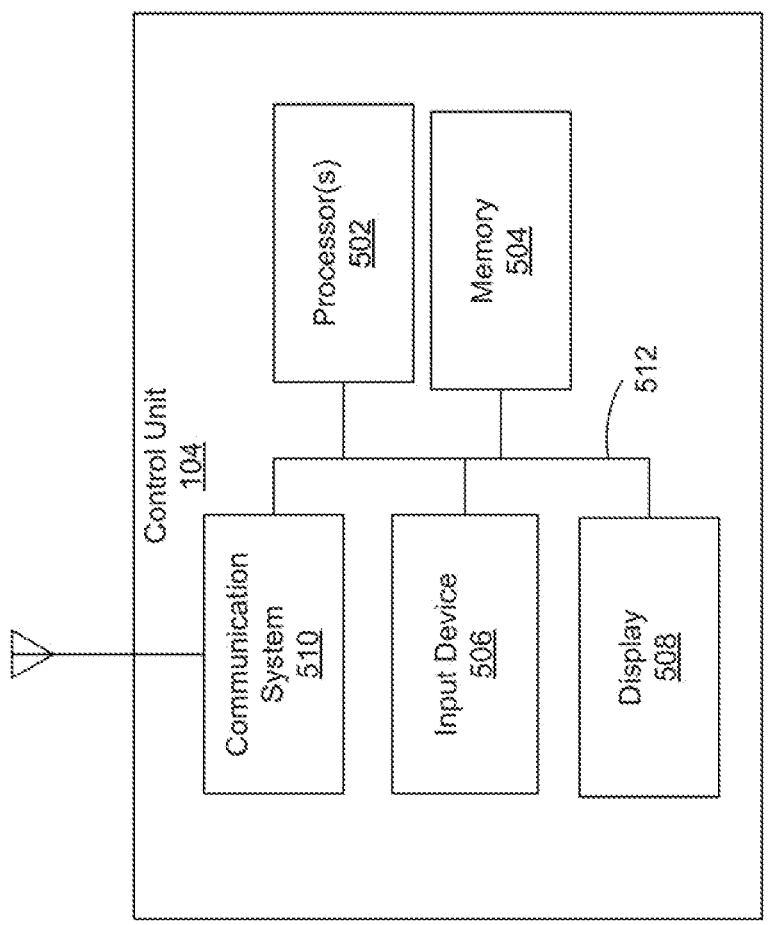
FIG. 5 illustrates an exemplary control unit of a target tracking system, in accordance with some embodiments.

FIG. 5 illustrates an exemplary control unit 104 of target tracking system 100, in accordance with some embodiments. In some embodiments, control unit 104 communicates with movable object 102 via communication system 120, e.g., to provide control instructions to movable object 102. Although control unit 104 is typically a portable (e.g., handheld) device, control unit 104 need not be portable. In some embodiments, control unit 104 is a dedicated control device (e.g., dedicated to operation of movable object 102), a laptop computer, a desktop computer, a tablet computer, a gaming system, a wearable device (e.g., glasses, gloves, and/or helmet), a microphone, and/or a combination thereof.

Control unit 104 typically includes one or more processing units 502, a communication system 510 (e.g., including one or more network or other communications interfaces), memory 504, one or more input/output (I/O) interfaces (e.g., display 506 and/or input device 508) and one or more communication buses 512 for interconnecting these components.

In some embodiments, a touchscreen display includes display 508 and input device 506. A touchscreen display optionally uses LCD (liquid crystal display) technology, LPD (light emitting polymer display) technology, or LED (light emitting diode) technology, although other display technologies are used in other embodiments. A touchscreen display and processor(s) 502 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touchscreen display.

In some embodiments, input device 506 includes, e.g., one or more joysticks, switches, knobs, slide switches, buttons, dials, keypads, keyboard, mouse, audio transducers (e.g., microphone for voice control system), motion sensor, and/or gesture controls. In some embodiments, an I/O interface of control unit 104 includes sensors (e.g., GPS sensors, and/or accelerometers), audio output transducers (e.g., speaker), and/or one or more tactile output generators for generating tactile outputs.

In some embodiments, input device 506 receives user input to control aspects of movable object 102, carrier 108, payload 110, or a component thereof. Such aspects include, e.g., attitude, position, orientation, velocity, acceleration, navigation, and/or tracking. For example, input device 506 is manually set by a user to one or more positions, each of the positions corresponding to a predetermined input for controlling movable object 102. In some embodiments, input device 506 is manipulated by a user to input control instructions for controlling the navigation of movable object 102. In some embodiments, input device 506 is used to input a flight mode for movable object 102, such as auto pilot or navigation according to a predetermined navigation path.

In some embodiments, input device 506 is used to input a target tracking mode for movable object 102, such as a manual tracking mode or an automatic tracking mode. In some embodiments, the user controls movable object 102, e.g., the position, attitude, and/or orientation of movable object 102, by changing a position of control unit 104 (e.g., by tilting or otherwise moving control unit 104). For example, a change in a position of control unit 104 is detected by, e.g., one or more inertial sensors and output of the one or more inertial sensors is used to generate command data. In some embodiments, input device 506 is used to adjust an operational parameter of the payload, such as a parameter of a payload sensing system 212 (e.g., to adjust a zoom parameter of imaging device 214) and/or a position of payload 110 relative to carrier 108 and/or movable object 102.

In some embodiments, input device 506 is used to indicate information about target 106, e.g., to select a target 106 to track and/or to indicate target type information 412. In some embodiments, input device 506 is used for interaction with augmented image data. For example, an image displayed by display 508 includes representations of one or more targets 106. In some embodiments, representations of the one or more targets 106 are augmented to indicate identified objects for potential tracking and/or a target 106 that is currently being tracked. Augmentation includes, for example, a graphical tracking indicator (e.g., a box) adjacent to or surrounding a respective target 106. In some embodiments, input device 506 is used to select a target 106 to track or to change from a target 106 being tracked to a different target for tracking. In some embodiments, a target 106 is selected when an area corresponding to a representation of target 106 is selected by e.g., a finger, stylus, mouse, joystick, or other component of input device 506. In some embodiments, specific target information 412 is generated when a user selects a target 106 to track.

The control unit 112 may also be configured to allow a user to enter target information using any suitable method. In some embodiments, input device 506 receives a selection of a target 106 from one or more images (e.g., video or snapshot) displayed by display 508. For example, input device 506 receives input including a selection performed by a gesture around target 106 and/or a contact at a location corresponding to target 106 in an image. In some embodiments, Computer vision or other techniques are used to determine a boundary of a target 106. In some embodiments, input received at input device 506 defines a boundary of target 106. In some embodiments, multiple targets are simultaneously selected. In some embodiments, a selected target is displayed with a selection indicator to indicate that the target is selected for tracking. In some other embodiments, input device 506 receives input indicating information such as color, texture, shape, dimension, and/or other characteristics associated with a target 106. For example, input device 506 includes a keyboard to receive typed input indicating target information 408.

In some embodiments, a control unit 104 provides an interface that enables a user to select (e.g., using input device 506) between a manual tracking mode and an automatic tracking mode. When the manual tracking mode is selected, the interface enables the user to select a target 106 to track. For example, a user is enabled to manually select a representation of a target 106 from an image displayed by display 508 of control unit 104. Specific target information 412 associated with the selected target 106 is transmitted to movable object 102, e.g., as initial expected target information.

In some embodiments, when the automatic tracking mode is selected, the user does not provide input selecting a target 106 to track. In some embodiments, input device 506 receives target type information 410 from user input. In some embodiments, movable object 102 uses the target type information 410, e.g., to automatically identify the target 106 to be tracked and/or to track the identified target 106.

Typically, manual tracking requires more user control of the tracking of the target and less automated processing or computation (e.g., image or target recognition) by processor(s) 116 of movable object 102, while automatic tracking requires less user control of the tracking process but more computation performed by processor(s) 116 of movable object 102 (e.g., by image analysis module 406). In some embodiments, allocation of control over the tracking process between the user and the onboard processing system is adjusted, e.g., depending on factors such as the surroundings of movable object 102, motion of movable object 102, altitude of movable object 102, system configuration 400 (e.g., user preferences), and/or available computing resources (e.g., CPU or memory) of movable object 102, control unit 104, and/or computing device 126. For example, relatively more control is allocated to the user when movable object is navigating in a relatively complex environment (e.g., with numerous buildings or obstacles or indoor) than when movable object is navigating in a relatively simple environment (e.g., wide open space or outdoor). As another example, more control is allocated to the user when movable object 102 is at a lower altitude than when movable object 102 is at a higher altitude. As a further example, more control is allocated to movable object 102 if movable object is equipped with a high-speed processor adapted to perform complex computations relatively quickly. In some embodiments, the allocation of control over the tracking process between user and movable object 102 is dynamically adjusted based on one or more of the factors described herein.

In some embodiments, control unit 104 includes an electronic device (e.g., a portable electronic device) and an input device 506 that is a peripheral device that is communicatively coupled (e.g., via a wireless and/or wired connection) and/or mechanically coupled to the electronic device. For example, control unit 104 includes a portable electronic device (e.g., a smartphone) and a remote control device (e.g., a standard remote control with a joystick) coupled to the portable electronic device. In this example, an application executed by the smartphone generates control instructions based on input received at the remote control device.

In some embodiments, the display device 508 displays information about movable object 102, carrier 108, and/or payload 110, such as position, attitude, orientation, movement characteristics of movable object 102, and/or distance between movable object 102 and another object (e.g., target 106 and/or an obstacle). In some embodiments, information displayed by display device 508 includes images captured by imaging device 214, tracking data (e.g., a graphical tracking indicator applied to a representation of target 106, such as a box or other shape around target 106 shown to indicate that target 106 is currently being tracked), and/or indications of control data transmitted to movable object 102. In some embodiments, the images including the representation of target 106 and the graphical tracking indicator are displayed in substantially real-time as the image data and tracking information are received from movable object 102 and/or as the image data is acquired.

The communication system 510 enables communication with communication system 120 of movable object 102, communication system 610 of computing device 126, and/or a base station (e.g., computing device 126) via a wired or wireless communication connection. In some embodiments, the communication system 510 transmits control instructions (e.g., navigation control instructions, target information, and/or tracking instructions). In some embodiments, the communication system 510 receives data (e.g., tracking data from payload imaging device 214, and/or data from movable object sensing system 122). In some embodiments, control unit 104 receives tracking data (e.g., via wireless communications 124) from movable object 102. Tracking data is used by control unit 104 to, e.g., display target 106 as the target is being tracked. In some embodiments, data received by control unit 104 includes raw data (e.g., raw sensing data as acquired by one or more sensors) and/or processed data (e.g., raw data as processed by, e.g., tracking module 404).

In some embodiments, memory 504 stores instructions for generating control instructions automatically and/or based on input received via input device 506. The control instructions include, e.g., control instructions for operating movement mechanisms 114 of movable object 102 (e.g., to adjust the position, attitude, orientation, and/or movement characteristics of movable object 102, such as by providing control instructions to actuators 132). In some embodiments, the control instructions adjust movement of movable object 102 with up to six degrees of freedom. In some embodiments, the control instructions are generated to maintain tracking of a target 106 (e.g., to correct a detected deviation of target 106 from expected target information, as described further with regard to FIG. 7). In some embodiments, control instructions include instructions for adjusting carrier 108 (e.g., instructions for adjusting damping element 208, actuator 204, and/or one or more sensors of carrier sensing system 206 of carrier 108). In some embodiments, control instructions include instructions for adjusting payload 110 (e.g., instructions for adjusting one or more sensors of payload sensing system 212). In some embodiments, control instructions include control instructions for adjusting the operations of one or more sensors of movable object sensing system 122.

In some embodiments, input device 506 receives user input to control one aspect of movable object 102 (e.g., the zoom of the imaging device 214) while a control application generates the control instructions for adjusting another aspect of movable object 102 (e.g., to control one or more movement characteristics of movable object 102). The control application includes, e.g., control module 402, tracking module 404 and/or a control application of control unit 104 and/or computing device 126. For example, input device 506 receives user input to control one or more movement characteristics of movable object 102 while the control application generates the control instructions for adjusting a parameter of imaging device 214. In this manner, a user is enabled to focus on controlling the navigation of movable object without having to provide input for tracking the target (e.g., tracking is performed automatically by the control application).

In some embodiments, allocation of tracking control between user input received at input device 506 and the control application varies depending on factors such as, e.g., surroundings of movable object 102, motion of movable object 102, altitude of movable object 102, system configuration (e.g., user preferences), and/or available computing resources (e.g., CPU or memory) of movable object 102, control unit 104, and/or computing device 126. For example, relatively more control is allocated to the user when movable object is navigating in a relatively complex environment (e.g., with numerous buildings or obstacles or indoor) than when movable object is navigating in a relatively simple environment (e.g., wide open space or outdoor). As another example, more control is allocated to the user when movable object 102 is at a lower altitude than when movable object 102 is at a higher altitude. As a further example, more control is allocated to movable object 102 if movable object 102 is equipped with a high-speed processor adapted to perform complex computations relatively quickly. In some embodiments, the allocation of control over the tracking process between user and movable object is dynamically adjusted based on one or more of the factors described herein.

Figure 6:
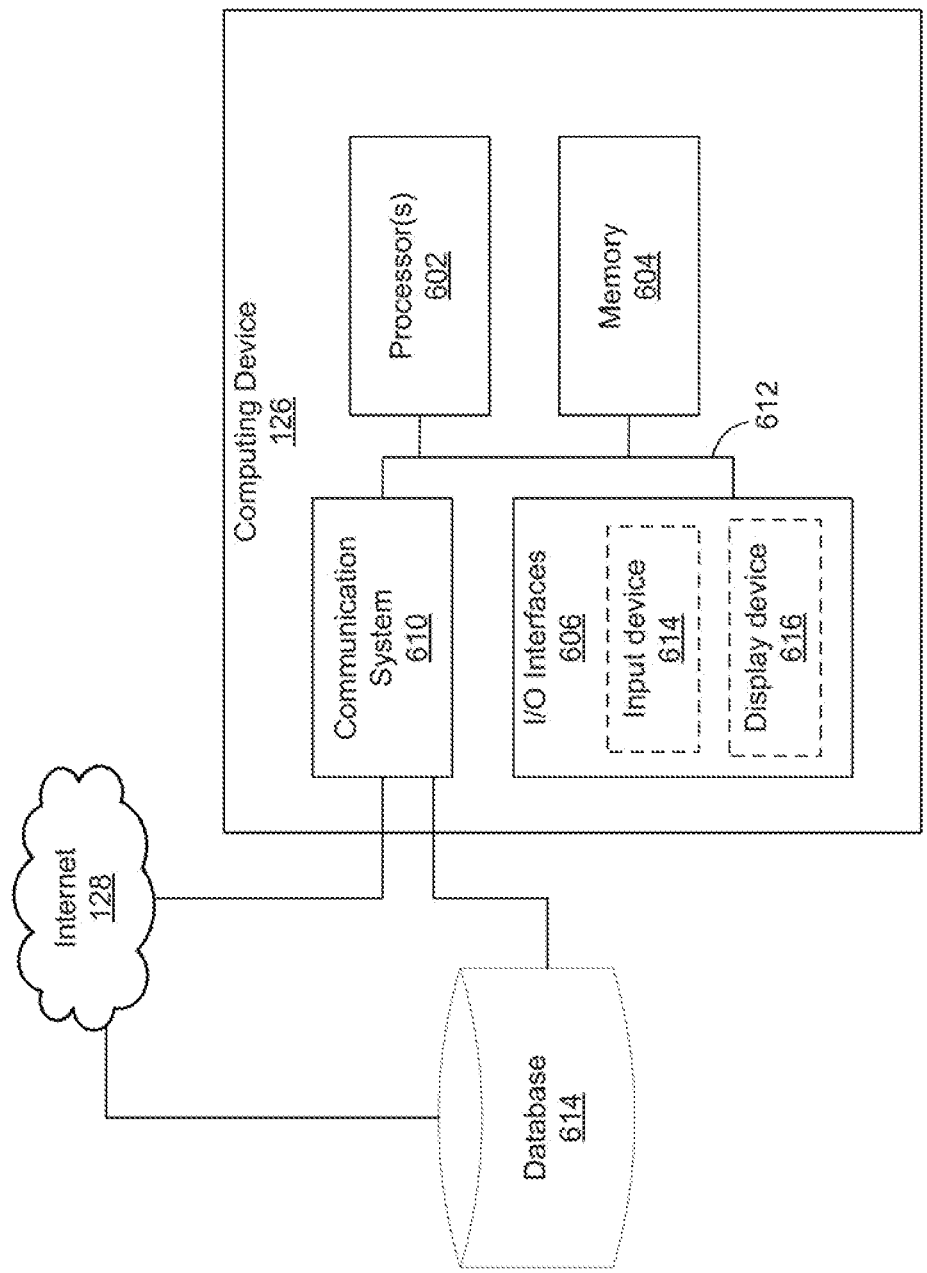
FIG. 6 illustrates an exemplary computing device for controlling a movable object, in accordance with some embodiments.

FIG. 6 illustrates an exemplary computing device 126 for controlling movable object 102, in accordance with embodiments. Computing device 126 is, e.g., a server computer, laptop computer, desktop computer, tablet, or phone. Computing device 126 typically includes one or more processing units 602, memory 604, communication system 610 and one or more communication buses 612 for interconnecting these components. In some embodiments, computing device 126 includes input/output (I/O) interfaces 606, e.g., display 614 and/or input device 616.

In some embodiments, computing device 126 is a base station that communicates (e.g., wirelessly) with movable object 102 and/or control unit 104.

In some embodiments, computing device 126 provides data storage, data retrieval, and/or data processing operations, e.g., to reduce the processing power and/or data storage requirements of movable object 102 and/or control unit 104. For example, computing device 126 is communicatively connected to a database 614 (e.g., via communication 610) and/or computing device 126 includes database 614 (e.g., database 614 is connected to communication bus 612).

Communication system 610 includes one or more network or other communications interfaces. In some embodiments, computing device 126 receives data from movable object 102 (e.g., from one or more sensors of movable object sensing system 122) and/or control unit 104. In some embodiments, computing device 126 transmits data to movable object 102 and/or control unit 104. For example, computing device provides control instructions to movable object 102.

Figure 7:
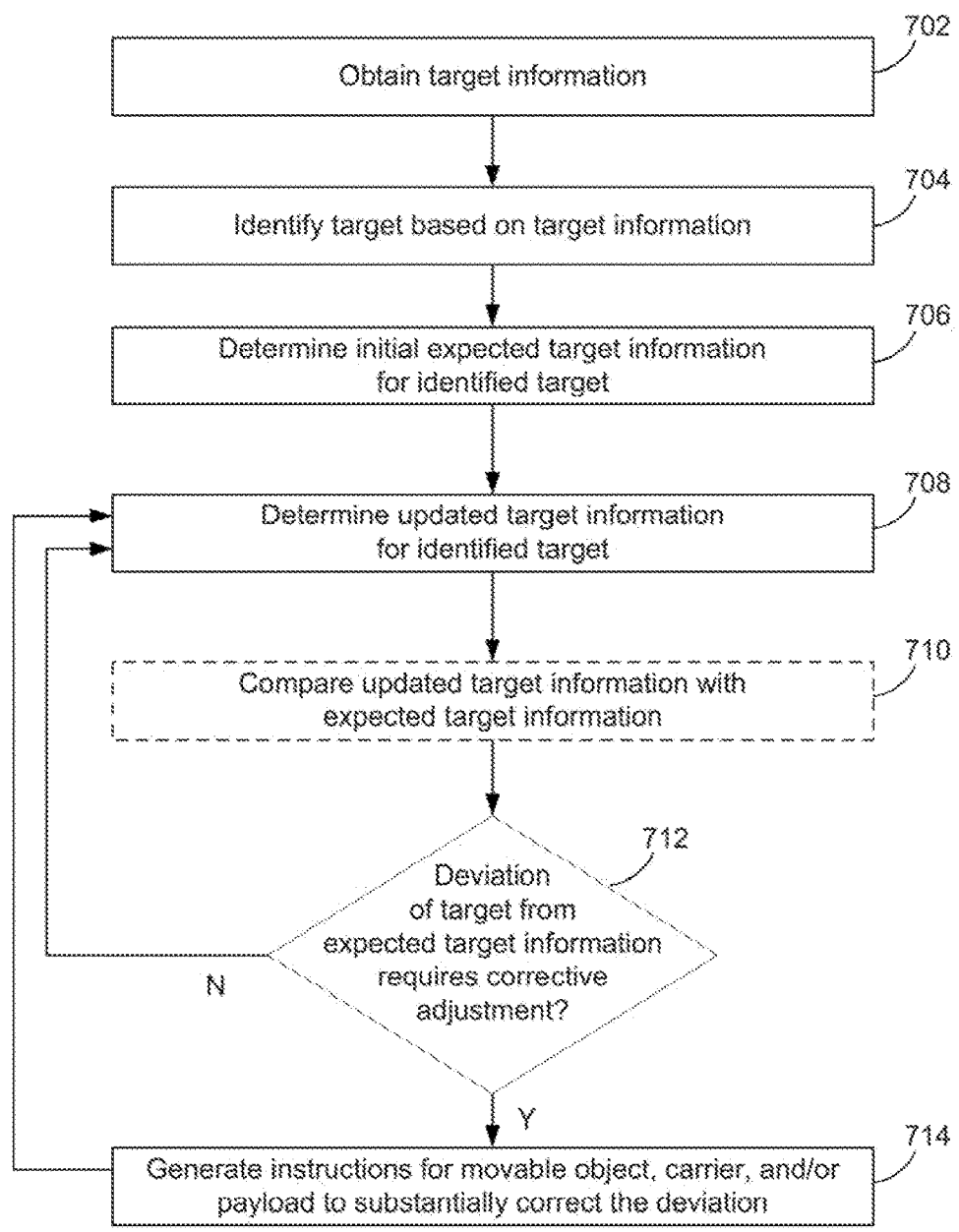
FIG. 7 is a flow diagram illustrating a method for implementing target tracking, in accordance with some embodiments.

FIG. 7 is a flow diagram illustrating a method 700 for implementing target tracking, in accordance with some embodiments. The method 700 is performed at a device, such as moving object 102, control unit 104 and/or computing device 126. For example, instructions for performing the method 700 are stored in tracking module 404 of memory 118 and executed by processor(s) 116.

The device obtains (702) target information 408 for one or more targets 106. For example, target information 408 is obtained from memory 118 of movable object 102, memory 504 of control unit 104, and/or memory 604 of computing device 126. In some embodiments, target information 408 obtained by the device is expected target information 414.

The device identifies (704) a target 106 based on the target information 408. For example, the device uses an image captured by imaging device 214 and/or one or more sensors of movable object sensing system 122 to identify target 106. In some embodiments, target 106 is identified using image recognition or identification techniques (e.g., by image analysis module 406).

The device determines (706) initial expected target information of the identified target 106. For example, the device determines an initial position of identified target 106 within an initial image captured by imaging device 214 and/or one or more sensors of movable object sensing system 122 and stores the initial position as expected target information 414.

The device determines (708) updated target information of the identified target 106. For example, the device determines an updated position of target 106, e.g., as identified within one or more subsequent images captured after the initial image. In some embodiments, the updated target information of the identified target 106 is stored as expected target information 414 (e.g., replacing previous expected target information 414 for target 106).

In some embodiments, the device compares (710) the updated target information determined at operation 708 with expected target information 414 (e.g., to determine an extent to which target 106 has deviated from expected target information 414). For example, the device determines a deviation of a position of a representation of target 106, e.g., as identified within the one or more subsequent images captured after the initial image, from the position of target 106 within the initial image.

In some embodiments, a deviation of target 106 from the expected target information 414 includes a change in the position of target 106. A change in the position of target 106 is detected by, e.g., comparing coordinates of a representation of target 106 (e.g., the coordinates of a center point of target 106) within an image (e.g., within the one or more subsequent images captured after the initial image) to expected target information 414 (e.g., coordinates of an expected target position).

In some embodiments, a deviation of target 106 from the expected target information 414 includes a change in the size of target 106. A change in the size of target 106 is determined by comparing a size parameter, such as an area (e.g., in pixels) of a representation of target 106 within an image (e.g., within the one or more subsequent images captured after the initial image) to expected target information 414 (e.g., the expected area of target 106).

The device determines (712) whether deviation of target 106 from the expected target information 414, e.g., as determined at operation 710, requires corrective adjustment. In some embodiments, tolerance criteria are applied to determine whether the deviation of the target from the expected target information 414 requires corrective adjustment. In some embodiments, tolerance criteria are met when updated target information, such as a position of a representation of target 106 within an image, is within a predetermined minimum number of pixels of expected target information 414, such as a position of a representation of target 106 in a prior image. For example, tolerance criteria are met when a position of a representation of target 106 within an image deviates from a position of target 106 in accordance with expected target information 414 by less than a predefined number of pixels. In some embodiments, the tolerance criteria are met when a size parameter of a representation of target 106 is above a minimum and/or below a maximum size parameter. In some embodiments, the tolerance criteria are met when a size parameter of a representation of target 106 deviates from expected target information by less than a predefined amount (e.g., by less than a predefined number of pixels). In some embodiments, tolerance criteria are defined by, e.g., system parameters (e.g., system configuration 400), e.g., preset and/or adjustable parameters (e.g. adjustable by a device and/or by a user).

When a deviation of target 106 from the expected target information 414 requires corrective adjustment (e.g., the tolerance criteria are not met), flow proceeds to operation 714. When deviation of target 106 from the expected target information 414 does not require corrective adjustment (e.g., the tolerance criteria are met), flow proceeds to operation 708.

The device generates instructions (714) to substantially correct the deviation. In this manner, the device, e.g., substantially corrects the deviation and/or substantially maintains a representation of target 106 in accordance with expected target information 414, for example, to facilitate ongoing tracking of the target 106. In some embodiments, substantially correcting the deviation includes an adjustment to an orientation, position, attitude, and/or one or more movement characteristics of movable object 102, carrier 108, and/or payload 110. In some embodiments, instructions to substantially correct the deviation changing a parameter of imaging device 214 and/or one or more sensors of movable object sensing system 122, e.g., changing zoom, focus, or other characteristics associated with imaging device 214.

In some embodiments, an adjustment to substantially correct a deviation includes adjusting a zoom level of imaging device 214 (e.g., if the imaging device supports the zoom level required), by adjustment to one or more movement characteristics of movable object 102, or by a combination of adjusting a zoom level of imaging device 214 and adjustment to one or more movement characteristics of movable object 102. In some embodiments, a control application (e.g., control module 402, tracking module 404 and/or a control application of control unit 104 and/or computing device 126) determines one or more adjustments. For example, if the imaging device 214 does not support a zoom level required to substantially correct a deviation, one or more movement characteristics of movable object 102 are adjusted instead of or in addition to adjusting the zoom level of imaging device 214.

In some embodiments, the adjustment to the orientation, position, attitude, one or more movement characteristics, and/or another operation parameter of movable object 102, carrier 108, and/or payload 110 is limited by one or more constraints imposed by system configuration 400 (e.g., as configured by a manufacturer, administrator, or user), by control unit 104 (e.g., user control input received at control unit 104), and/or by computing device 126. Examples of constraints include limits (e.g., maximum and/or minimum limits) for a rotation angle, angular velocity, and/or linear velocity along one or more axes. For example, the angular velocity of movable object 102, carrier 108, and/or payload 110 around an axis is constrained by, e.g., a maximum angular velocity that is allowed for movable object 102, carrier 108, and/or payload 110. In some embodiments, the linear velocity of movable object 102, carrier 108, and/or payload 110 is constrained by, e.g., a maximum linear velocity that is allowed for movable object 102, carrier 108, and/or payload 110. In some embodiments, adjustment to the focal length of imaging device 214 is constrained by a maximum and/or minimum focal length for imaging device 214.

In some embodiments, in cases where a navigation path of movable object 102 is predetermined, to the orientation, position, attitude, and/or one or more movement characteristics is implemented by carrier 108 and/or payload 110 without affecting the movement of movable object 102. The navigation path of movable object 102 may be predetermined, for example, if a remote user is actively controlling the navigation of movable object via a control unit or if movable object is navigating (e.g., autonomously or semi-autonomously) according to a pre-stored navigation path.

In some embodiments, a warning indicator is provided when an adjustment to the orientation, position, attitude, and/or one or more movement characteristics is limited by a constraint as described above. In some embodiments, a warning indicator includes text, audio (e.g., siren or beeping sound), images or other visual indicators (e.g., changed user interface background color and/or flashing light), and/or haptic feedback. A warning indicator is provided at, e.g., movable object 102, control unit 104, and/or computing device 126.

In some embodiments, the adjustment to the orientation, position, attitude, and/or one or more movement characteristics is performed in substantially real time as movable object 102 is executing user-provided navigation control instructions or a predetermined flight path.

In some embodiments, the instructions to substantially correct the deviation are generated using information, such as sensing data acquired by one or more sensors of movable object sensing system 122 (e.g., proximity sensor and/or GPS sensor) and/or position information transmitted by target 106 (e.g., GPS location).

In some embodiments, determining updated target information for the identified target (708) is performed periodically (e.g., every 0.01 second, 0.1 second, 0.2 second, 0.5 second, or 1 second) and/or in response to a received instruction from movable object 102, carrier 108, and/or payload 110.

Figure 8:
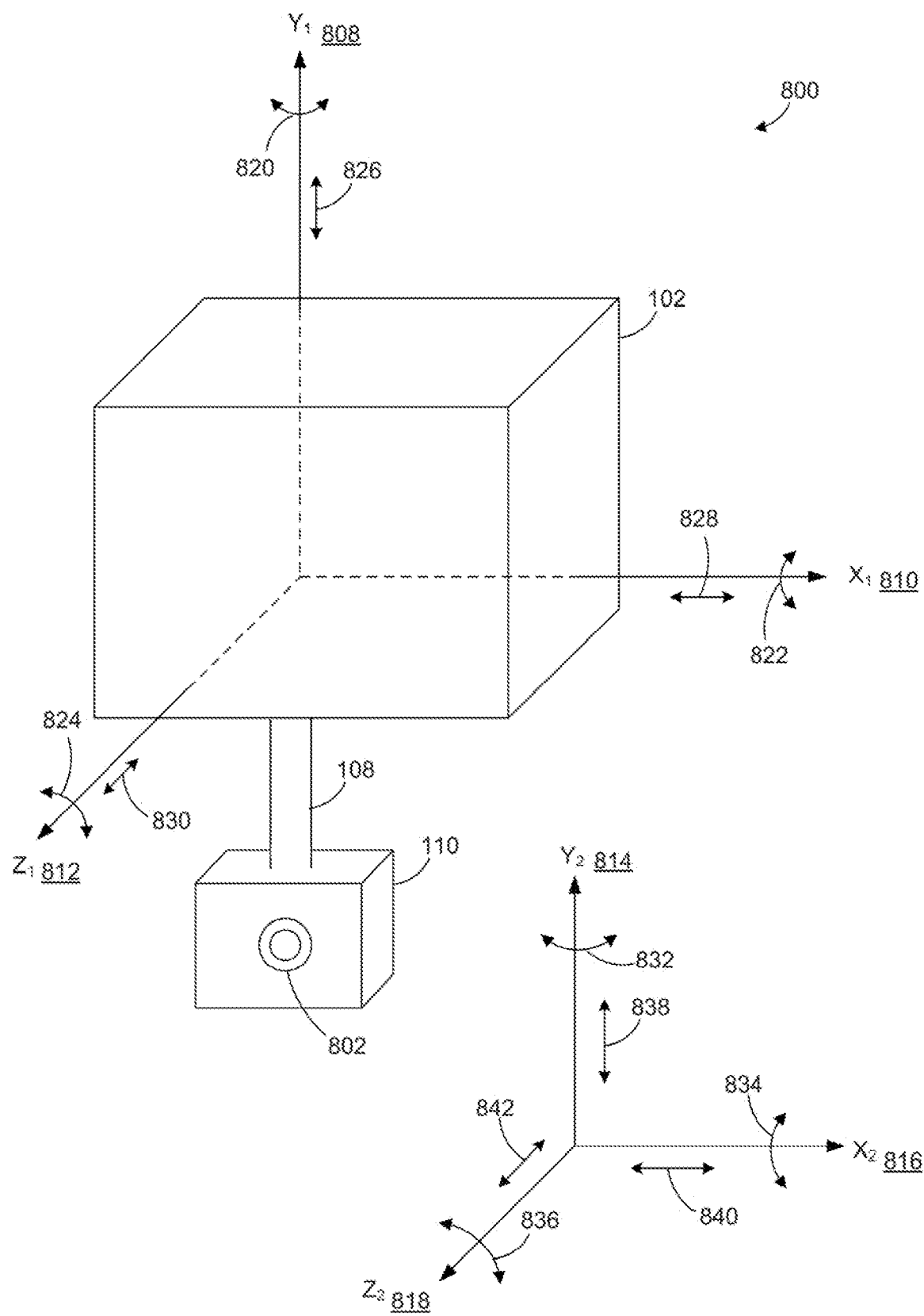
FIG. 8 illustrates an exemplary configuration of a movable object, carrier, and payload, in accordance with some embodiments.

FIG. 8 illustrates an exemplary configuration 800 of a movable object 102, carrier 108, and payload 110, in accordance with embodiments. The configuration 800 is used to illustrate exemplary adjustments to an orientation, position, attitude, and/or one or more movement characteristics of movable object 102, carrier 108, and/or payload 110, e.g., as used to track target 106.

In some embodiments, movable object 102 rotates around up to three orthogonal axes, such as $X_1$ (pitch) 810, $Y_1$ (yaw) 808 and $Z_1$ (roll) 812 axes. Rotations around the three axes are referred to herein as pitch rotation 822, yaw rotation 820, and roll rotation 824, respectively. Angular velocities of movable object 102 around the $X_1$, $Y_1$, and $Z_1$ axes are referred to herein as $\omega_{X1}$, $\omega_{Y1}$, and $\omega_{Z1}$, respectively. In some embodiments, movable object 102 engages in translational movements 828, 826, and 830 along the $X_1$, $Y_1$, and $Z_1$ axes, respectively. Linear velocities of movable object 102 along the $X_1$, $Y_1$, and $Z_1$ axes are referred to herein as $V_{X1}$, $V_{Y1}$, and $V_{Z1}$, respectively.

In some embodiments, payload 110 is coupled to movable object 102 via carrier 108. In some embodiments, payload 110 moves relative to movable object 102 (e.g., payload 110 is caused by actuator 204 of carrier 108 to move relative to movable object 102).

In some embodiments, payload 110 moves around and/or along up to three orthogonal axes, $X_2$ (pitch) 816, $Y_2$ (yaw) 814 and $Z_2$ (roll) 818. The $X_2$, $Y_2$, and $Z_2$ axes are respectively parallel to the $X_1$, $Y_1$, and $Z_1$ axes. In some embodiments, where payload 110 includes imaging device 214 (e.g., including an optical module 802), the roll axis $Z_2$ 818 is substantially parallel to an optical path or optical axis for optical module 802. In some embodiments, optical module 802 is optically coupled to image sensor 216 (and/or one or more sensors of movable object sensing system 122). In some embodiments, carrier 108 causes payload 110 to rotate around up to three orthogonal axes, $X_2$ (pitch) 816, $Y_2$ (yaw) 814 and $Z_2$ (roll) 818, e.g., based on control instructions provided to actuator 204 of carrier 108. The rotations around the three axes are referred to herein as the pitch rotation 834, yaw rotation 832, and roll rotation 836, respectively. The angular velocities of payload 110 around the $X_2$, $Y_2$, and $Z_2$ axes are referred to herein as $\omega_{X2}$, $\omega_{Y2}$, and $\omega_{Z2}$, respectively. In some embodiments, carrier 108 causes payload 110 to engage in translational movements 840, 838, and 842, along the X2, Y2, and Z2 axes, respectively, relative to movable object 102. The linear velocity of payload 110 along the X2, Y2, and Z2 axes is referred to herein as $V_{X2}$, $V_{Y2}$, and $V_{Z2}$, respectively.

In some embodiments, the movement of payload 110 may be restricted (e.g., carrier 108 restricts movement of payload 110, e.g., by constricting movement of actuator 204 and/or by lacking an actuator capable of causing a particular movement).

In some embodiments, the movement of payload 110 may be restricted to movement around and/or along a subset of the three axes $X_2$, $Y_2$, and $Z_2$ relative to movable object 102. For example, payload 110 is rotatable around $X_2$, $Y_2$, $Z_2$ (movements 832, 834, 836) or any combination thereof, payload 110 is not movable along any of the axes (e.g., carrier 108 does not permit payload 110 to engage in movements 838, 840, 842). In some embodiments, payload 110 is restricted to rotation around one of the $X_2$, $Y_2$, and $Z_2$ axes. For example, payload 110 is only rotatable about the $Y_2$ axis (e.g., rotation 832). In some embodiments, payload 110 is restricted to rotation around only two of the $X_2$, $Y_2$, and $Z_2$ axes. In some embodiments, payload 110 is rotatable around all three of the $X_2$, $Y_2$, and $Z_2$ axes.

In some embodiments, payload 110 is restricted to movement along $X_2$, $Y_2$, or $Z_2$ axis (movements 838, 840, 842), or any combination thereof, and payload 110 is not rotatable around any of the axes (e.g., carrier 108 does not permit payload 110 to engage in movements 832, 834, 836). In some embodiments, payload 110 is restricted to movement along only one of the $X_2$, $Y_2$, and $Z_2$ axes. For example, movement of payload 110 is restricted to movement 840 along the $X_2$ axis). In some embodiments, payload 110 is restricted to movement along only two of the $X_2$, $Y_2$, and $Z_2$ axes. In some embodiments, payload 110 is movable along all three of the $X_2$, $Y_2$, and $Z_2$ axes.

In some embodiments, payload 110 is able to perform both rotational and translational movement relative to movable object 102. For example, payload 110 is able to move along and/or rotate around one, two, or three of the $X_2$, $Y_2$, and $Z_2$ axes.

In some embodiments, payload 110 is coupled to movable object 102 directly without a carrier 108 or carrier 108 does not permit payload 110 to move relative to movable object 102. In some embodiments, the attitude, position and/or orientation of payload 110 is fixed relative to movable object 102 in such cases.

In some embodiments, adjustment to attitude, orientation, and/or position of payload 110 is performed by adjustment to movable object 102, carrier 108, and/or payload 110, such as an adjustment to a combination of two or more of movable object 102, carrier 108, and/or payload 110. For example, a rotation of 60 degrees around a given axis (e.g., yaw axis) for the payload is achieved by a 60-degree rotation by movable object alone, a 60-degree rotation by the payload relative to movable object as effectuated by the carrier, or a combination of 40-degree rotation by movable object and a 20-degree rotation by the payload relative to movable object.

In some embodiments, a translational movement for the payload is achieved via adjustment to movable object 102, carrier 108, and/or payload 110 such as an adjustment to a combination of two or more of movable object 102, carrier 108, and/or payload 110. In some embodiments, a desired adjustment is achieved by adjustment to an operational parameter of the payload, such as an adjustment to a zoom level or a focal length of imaging device 214.

Figure 9:
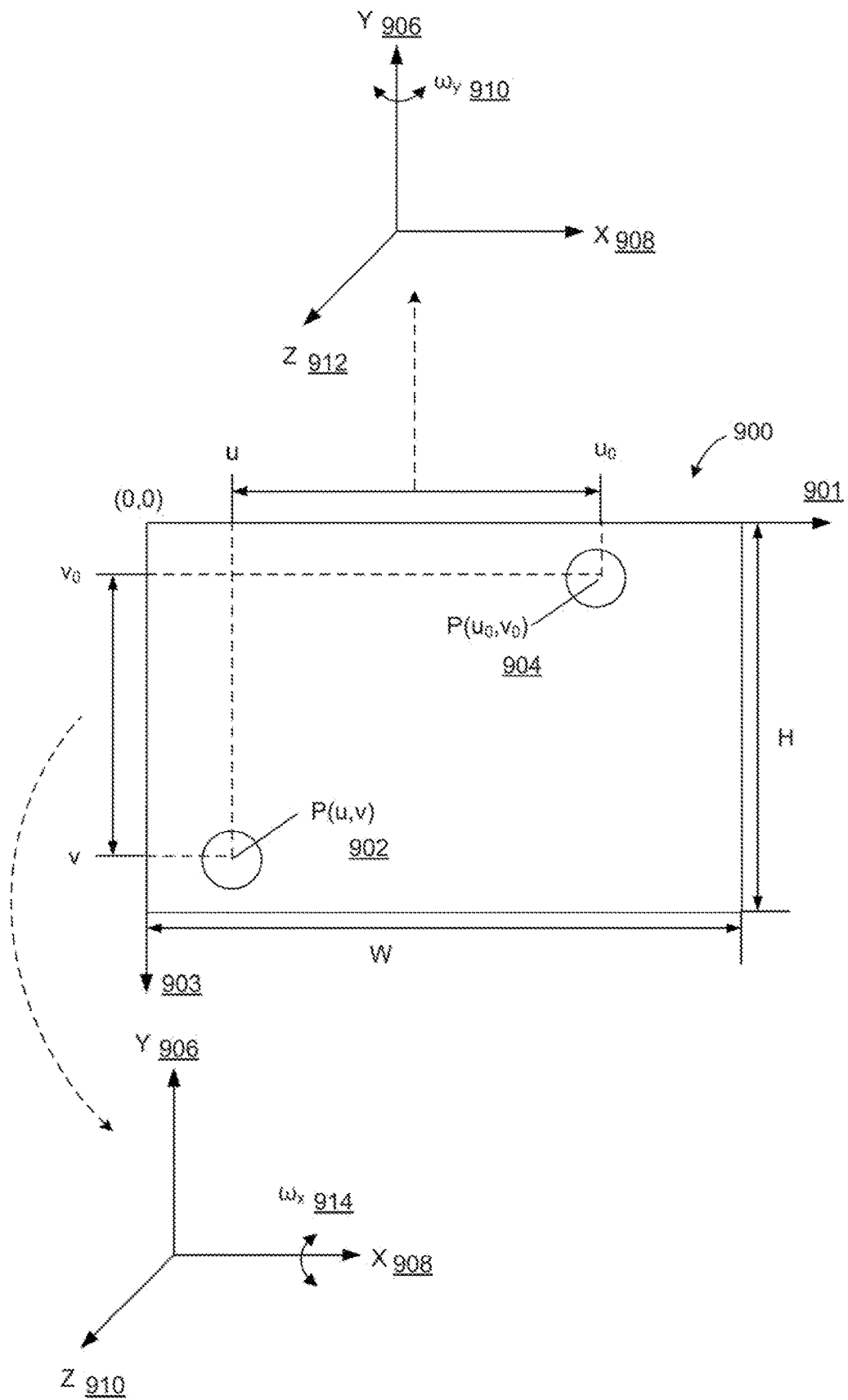
FIG. 9 illustrates an exemplary tracking method for maintaining an expected position of a target, in accordance with some embodiments.

FIG. 9 illustrates an exemplary tracking method for maintaining an expected position of a target 106, in accordance with embodiments. An exemplary image 900 is e.g. an image captured by imaging device 214. Assume that the image has a width of W pixels and a height of H pixels (where W and H are positive integers). A position within the image is defined by a pair of coordinates along an axis 901 (along the width of the image) and an axis 903 (along the height of the image), where the upper left corner of image has coordinates (0, 0) and the lower right corner of the image has coordinates (W, H).

Assume that a representation of target 106, as captured in the image 900, is located at position P (u, v) 902, and the expected position of the target (e.g., as indicated by expected target information 414) is $P_0(u_0, v_0)$ 904 that is different from P 902. In some embodiments, the expected position of the target $P_0(u_0, v_0)$ may be near the center of the image, such that $u_0 = W/2$, and/or $v_0 = H/2$. In some embodiments, the expected position of the target is located at other locations within the image (e.g., off-center). In some embodiments, an expected position of the target may or may not be the same as an initial position of the target (e.g., as determined at 706). Assuming that the deviation of current position P from the expected target information 414 (e.g., the expected position $P_0$) requires corrective adjustment (e.g., as determined at 710-712), instructions are generated (e.g., as generated at operation 714) for an adjustment to bring the target position from P to close to the expected position P0. In some embodiments, a deviation is expressed as a $\Delta x$ from $u_0$, and a $\Delta y$ from $v_0$.

In some embodiments, the deviation from the expected target position is used to derive one or more angular velocities for rotating the field of view of the imaging device around one or more axes. For example, deviation along the axis 901 of the image (e.g., between u and $u_0$) is used to determine an angular velocity $\omega_Y$ 910 for rotating the field of view of the imaging device 214 around the Y (yaw) axis 906, as follows:

$$\omega_Y = \alpha^*(u - u_0), \text{ where } \alpha \in \mathbb{R} \text{ (real numbers)} \qquad (1)$$

In some embodiments, the rotation around the Y axis for the field of view of imaging device 214 is achieved by a rotation of movable object 102, a rotation of payload 110 (e.g., via carrier 108) relative to movable object 102, or a combination of both. In some embodiments, payload 110 is adjusted when adjustment of movable object 102 is infeasible or otherwise undesirable, for example, when the navigation path of movable object is predetermined. In the equation (1), $\alpha$ is a constant that may be predefined and/or calibrated based on the configuration of the movable object (e.g., when the rotation is achieved by the movable object), the configuration of the carrier (e.g., when the rotation is achieved by the carrier), or both (e.g., when the rotation is achieved by a combination of the movable object and the carrier). In some embodiments, $\alpha$ is greater than zero ($\alpha > 0$). In other embodiments, $\alpha$ may be no greater than zero ($\alpha \leq 0$). In some embodiments, $\alpha$ can be used to map a calculated pixel value to a corresponding control lever amount or sensitivity for controlling the angular velocity around a certain axis (e.g., yaw axis). In general, the control lever may be used to control the angular or linear movement of a controllable object (e.g., movable object 102 or carrier 108). A greater control lever amount corresponds to greater sensitivity and greater speed (for angular or linear movement). In some embodiments, the control lever amount or a range thereof is determined by configuration parameters of the flight control system (e.g. stored by system configuration 400 and/or motion control module 402) for a movable object 102 or configuration parameters of a control system for a carrier 108. The upper and lower bounds of the range of the control lever amount may include any arbitrary numbers. For example, the range of the control lever amount may be (1000, −1000) for one flight control system and (−1000, 1000) for another flight control system.

For instance, assume that the images have a width of W=1024 pixels and a height of H=768 pixels. Thus, the size of the images is 1024*768. Further assume that the expected position of the target has a $u_0 = 512$. Thus, $(u - u_0) \in (-512, 512)$. Assume that the range of the control lever amount around the yaw axis is (−1000, 1000), then the maximum control lever amount or maximum sensitivity is 1000 and $\alpha = 1000/512$. Thus, the value of $\alpha$ can be affected by image resolution or size provided by the imaging device, range of the control lever amount (e.g., around a certain rotation axis), the maximum control lever amount or maximum sensitivity, and/or other factors.

For instance, when the rotation is achieved by rotation of movable object 102, the Y axis 906 of FIG. 9 corresponds to the $Y_1$ axis 808 for the movable object as illustrated in FIG. 8 and the overall angular velocity of the field of view $\omega_Y$ is expressed as the angular velocity $\omega_{Y1}$ for the movable object:

$$\omega_Y = \omega_{Y1} = \alpha_1 *(u - u_0), \text{ where } \alpha_1 \in \mathbb{R} \quad (2)$$

In the equation (2), $\alpha_1$ is a constant that is defined based on the configuration of the movable object. In some embodiments, $\alpha_1$ is greater than zero ($\alpha_1 > 0$). The $\alpha_1$ can be defined similar to the $\alpha$ discussed above. For example, the value of $\alpha_1$ may be defined based on image resolution or size and/or range of control lever amount for the movable object (e.g., around the yaw axis).

Similarly, when the rotation is achieved by the rotation of payload 110 relative to movable object 102 (e.g., via carrier 108), the Y axis 906 of FIG. 9 corresponds to the $Y_2$ axis 814 for the payload as illustrated in FIG. 8 and the overall angular velocity of the field of view $\omega_Y$ is expressed as the angular velocity $\omega_{Y2}$ for the payload relative to the movable object:

$$\omega_Y = \omega_{Y2} = \alpha_2 *(u - u_0), \text{ where } \alpha_2 \in \mathbb{R} \quad (3)$$

In the equation (3), $\alpha_2$ is a constant that is defined based on the configuration of the carrier and/or payload. In some embodiments, $\alpha_2$ is greater than zero ($\alpha_2 > 0$). The $\alpha_2$ can be defined similar to the $\alpha$ discussed above. For example, the value of $\alpha_2$ may be defined based on image resolution or size and/or range of control lever amount for the carrier 108 (e.g., around the yaw axis).

In general, the angular velocity of the field of view around the Y (yaw) axis 906 can be expressed as a combination of the angular velocity $\omega_{Y1}$ for the movable object and the angular velocity $\omega_{Y2}$ for the payload relative to the movable object, such as the following:

$$\omega_Y = \omega_{Y1} + \omega_{Y2} \quad (4)$$

In the equation (4), either $\omega_{Y1}$ or $\omega_{Y2}$ may be zero.

As illustrated herein, the direction of the rotation around the Y (yaw) axis may depend on the sign of $u-u_0$. For instance, if the expected position is located to the right of the actual position (as illustrated in FIG. 9), then $u-u_0 < 0$, and the field of view needs to rotate in a counter-clockwise fashion around the yaw axis 906 (e.g., pan left) in order to bring the target to the expected position. On the other hand, if the expected position is located to the left of the actual position, then $u-u_0 > 0$, and the field of view needs to rotate in a clockwise fashion around the yaw axis 906 (e.g., pan right) in order to bring the target to the expected position.

As illustrated herein, the velocity of rotation (e.g., absolute value of the angular velocity) around a given axis (e.g., the Y (yaw) axis) may depend on the distance between the expected and the actual position of the target along the axis (i.e., $|u-u_0|$). The further the distance is, the greater the velocity of rotation. Likewise, the closer the distance is, the slower the velocity of rotation. When the expected position coincides with the position of the target along the axis (e.g., $u=u_0$), then the velocity of rotation around the axis is zero and the rotation stops.

The method for adjusting the deviation from the expected target position and the actual target position along the axis 901, as discussed above, can be applied in a similar fashion to correct the deviation of the target along a different axis 903. For example, deviation along the axis 903 of the image (e.g., between v and $v_0$) may be used to derive an angular velocity $\omega_X$ 914 for the field of view of the imaging device around the X (pitch) axis 908, as follows:

$$\omega_X = \beta *(v - v_0), \text{ where } \beta \in \mathbb{R} \quad (5)$$

The rotation around the X axis for the field of view of an imaging device may be achieved by a rotation of the movable object, a rotation of the payload 110 (e.g. via carrier 108) relative to the movable object 102, or a combination of both. Hence, in the equation (5), β is a constant that may be predefined and/or calibrated based on the configuration of the movable object (e.g., when the rotation is achieved by the movable object), the configuration of the carrier (e.g., when the rotation is achieved by the carrier), or both (e.g., when the rotation is achieved by a combination of the movable object and the carrier). In some embodiments, β is greater than zero (β>0). In other embodiments, β may be no greater than zero (β≤0). In some embodiments, β can be used to map a calculated pixel value to a corresponding control lever amount for controlling the angular velocity around a certain axis (e.g., pitch axis). In general, the control lever may be used to control the angular or linear movement of a controllable object (e.g., movable object 102 or carrier 108). Greater control lever amount corresponds to greater sensitivity and greater speed (for angular or linear movement). In some embodiments, the control lever amount or a range thereof may be determined by configuration parameters of the flight control system for a movable object 102 or configuration parameters of a carrier control system for a carrier 108. The upper and lower bounds of the range of the control lever amount may include any arbitrary numbers. For example, the range of the control lever amount may be (1000, -1000) for one control system (e.g., flight control system or carrier control system) and (-1000, 1000) for another control system.

For instance, assume that the images have a width of W=1024 pixels and a height of H=768 pixels. Thus, the size of the images is 1024*768. Further assume that the expected position of the target has a $v_0=384$. Thus, $(v-v_0) \in (-384, 384)$. Assume that the range of the control lever amount around the pitch axis is (-1000, 1000), then the maximum control lever amount or maximum sensitivity is 1000 and β=1000/384. Thus, the value of β can be affected by image resolution or size provided by the imaging device, range of the control lever amount (e.g., around a certain rotation axis), the maximum control lever amount or maximum sensitivity, and/or other factors.

For instance, when the rotation is achieved by rotation of the movable object, the X axis 908 of FIG. 9 corresponds to the $X_1$ axis 810 for the movable object as illustrated in FIG. 8 and the angular velocity of the field of view $\omega_X$ is expressed as the angular velocity $\omega_{X1}$ for the movable object:

$$\omega_X = \omega_{X1} = \beta_1 *(v - v_0), \text{ where } \beta_1 \in \mathbb{R} \quad (6)$$

In the equation (6), $\beta_1$ is a constant that is defined based on the configuration of the movable object. In some embodiments, $\beta_1$ is greater than zero ($\beta_1 > 0$). The $\beta_1$ can be defined similar to the β discussed above. For example, the value of $\beta_1$ may be defined based on image resolution or size and/or range of control lever amount for the movable object (e.g., around the pitch axis).

Similarly, when the rotation is achieved by the rotation of the payload relative to the movable object (e.g., via the carrier), the X axis 908 of FIG. 9 corresponds to the $X_2$ axis 816 for the payload as illustrated in FIG. 8 and the angular velocity of the field of view $\omega_X$ is expressed as the angular velocity $\omega_{X2}$ for the payload relative to the movable object:

$$\omega_X = \omega_{X2} = \beta_2 *(v - v_0), \text{ where } \beta_2 \in \mathbb{R} \quad (6)$$

In the equation (6), $\beta_2$ is a constant that is defined based on the configuration of the carrier and/or payload. In some embodiments, $\beta_2$ is greater than zero ($\beta_2>0$). The $\beta_2$ can be defined similar to the $\beta$ discussed above. For example, the value of $\beta_2$ may be defined based on image resolution or size and/or range of control lever amount for the movable object (e.g., around the pitch axis).

In general, the angular velocity of the field of view around the X (pitch) axis 608 can be expressed as a combination of the angular velocity $\omega_{X1}$ for the movable object and the angular velocity $\omega_{X2}$ for the payload relative to the movable object, such as the following:

$$\omega_X = \omega_{X1} + \omega_{X2} \qquad (7)$$

In the equation (7), either $\omega_{X1}$ or $\omega_{X2}$ may be zero.

As illustrated herein, the direction of the rotation around the X (yaw) axis may depend on the sign of $v-v_0$. For instance, if the expected position is located above of the actual position (as illustrated in FIG. 9), then $v-v_0>0$, and the field of view needs to rotate in a clockwise fashion around the pitch axis 908 (e.g., pitch down) in order to bring the target to the expected position. On the other hand, if the expected position is located to below the actual position, then $v-v_0<0$, and the field of view needs to rotate in a counter-clockwise fashion around the pitch axis 608 (e.g., pitch up) in order to bring the target to the expected position.

As illustrated herein, the speed of rotation (e.g., absolute value of the angular velocity) depends on the distance between the expected and the actual position of the target (i.e., $|v-v_0|$) along a give axis (e.g., the X (pitch) axis). The further the distance is, the greater the speed of rotation. The closer the distance is, the slower the speed of rotation. When the expected position coincides with the position of the target (e.g., $v=v_0$), then the speed of rotation is zero and the rotation stops.

In some embodiments, the values of the angular velocities as calculated above may be constrained or otherwise modified by various constraints of the system. Such constraints may include the maximum and/or minimum speed that may be achieved by the movable object and/or the imaging device, the range of control lever amount or the maximum control lever amount or maximum sensitivity of the control system for the movable object and/or the carrier, and the like. For example, the rotation speed may be the minimum of the calculated rotation speed and the maximum speed allowed.

In some embodiments, warning indicators are provided (e.g., displayed by display 508 or otherwise output by control unit 104 when the calculated angular velocities need to be modified according to the constraints described herein. Examples of such warning indicators may include textual, audio (e.g., siren or beeping sound), visual (e.g., certain color of light or flashing light), mechanical, any other suitable types of signals. Such warning indicators are provided, e.g., directly by the movable object 102, carrier 108, payload 110, or a component thereof. In some embodiments, warning indicators are provided by the control unit 104 (e.g., via the display 508). In some embodiments, control unit 104 provides warning indicators based on instructions received from movable object 102.

FIG. 10 illustrates an exemplary tracking method for maintaining an expected size of a target 106, in accordance with embodiments. An exemplary image 1000 is, e.g., an image captured by an imaging device 214 carried by movable object 102. Image 1000 includes a representation 1002 of target 106. In some embodiments, the current size s of a representation 1002 of target 106 within the image 1000 is indicated in pixels (such as calculated as the product of the width of representation 1002 and the height of representation 1002). In some embodiments, the expected target size (e.g., as indicated by expected target information 414) is smaller (e.g., the expected target may be represented by 1004 and S=$s_0$) or larger (e.g., the expected target may be represented by 1005 and S=$s_1$) than the current size s. In some embodiments, the expected target size is a range extending from $s_0$ to $s_1$. The expected target size may or may not be the same as an initial size of the target (e.g., as indicated in specific target information 412, such as specific target information 412 provided by control unit 104 to movable object 102). In some embodiments, when a deviation of a current target size s (e.g., an area of a representation of target 106 within image 1000) from the expected target size $s_0$ or $s_1$ (or an expected target size that ranges from $s_0$ to $s_1$) requires corrective adjustment (e.g., as determined at operation 710-712), instructions are generated (e.g., as generated at operation 714) for an adjustment, e.g., to reduce the deviation of the target size from the expected size.

Although display area of the image 1000 and representation 1002 of target 106 are shown as rectangles, this is for illustrative purposes only and is not intended to be limiting. In some embodiments, an expected size of the target (e.g. stored as expected target information 414) is indicated using representations such as a line (e.g., a radius or other dimension), circle, oval, polygon, sphere, rectangular prism, and/or polyhedron. Likewise, although the expected target size is expressed in pixels, this is for illustrative purposes only and not intended to be limiting. In some embodiments, the expected size of the target (e.g. stored as expected target information 414) is expressed as, e.g., a length (e.g., mm or other length unit), an area (e.g., $mm^2$ or other area unit), a ratio of a length of a representation of the target in an image relative to a total image length (e.g., a percentage), a ratio of an area of a representation of the target in an image relative to a total image area (e.g., a percentage), a number of pixels in a line (e.g., corresponding to a diameter, length, and/or width of target 106), and/or a number of pixels in an area.

In some embodiments, the deviation of target 106 from expected target information 414 (e.g., the expected target size) is used to derive one or more linear velocities for movable object 102 and/or payload 110 along one or more axes. For example, deviation in the target size between a current target size s and the expected target size S (e.g., S=$s_0$ or $s_1$) can be used to determine a linear velocity V for moving movable object along a Z (roll) axis 1010, as follows:

$$V = \delta*(1-s/S), \text{ where } \delta \in \mathbb{R} \qquad (8)$$

In the equation (8), $\delta$ is a constant that is defined based on the configuration of movable object or any suitable controllable object (e.g., carrier) that may cause the field of view to move toward and/or away from the target. In some embodiments, $\delta$ is greater than zero ($\delta>0$). In other embodiments, $\delta$ may be no greater than zero ($\delta\leq0$). In some embodiments, $\delta$ can be used to map a calculated pixel value to a corresponding control lever amount or sensitivity for controlling the linear velocity.

In general, V represents the velocity of movable object 102 toward or away from the target 106. The velocity vector points from the movable object 102 to the target 106. If the current size s of the representation 1002 of target 106 is smaller than the expected size S, then V>0 and movable object moves towards the target so as to increase the size of the target as captured in the images. On the other hand, if the current size s of the target is larger than the expected size S, then V<0 and movable object moves away from the target so as to reduce the size of the target as captured in the images.

For instance, assume that the images have a width of W=1024 pixels and a height of H=768 pixels. Thus, the size of the images is 1024*768. Assume that the range of the control lever amount for controlling the linear velocity is (−1000, 1000). In an exemplary embodiment, δ=−1000 when s/S=3 and δ=1000 when s/S=1/3.

In some embodiments, the values of the velocities as calculated above are constrained or otherwise modified by various constraints of the system. Such constraints include, e.g., the maximum and/or minimum speed that may be achieved by movable object and/or the imaging device, the maximum sensitivity of the control system for movable object and/or the carrier, and the like. For example, the speed for movable object may be the minimum of the calculated speed and the maximum speed allowed.

Alternatively or additionally, the deviation between the actual target size and the expected target size can be used to derive adjustment to the operational parameters of the imaging device such as a zoom level or focal length in order to correct the deviation. Such adjustment to the imaging device may be necessary when adjustment to movable object is infeasible or otherwise undesirable, for example, when the navigation path of movable object is predetermined. An exemplary focal length adjustment F can be expressed as:

$$F=\gamma*(1-s/S), \text{ where } \gamma \in \mathbb{R} \quad (9)$$

Where γ is a constant that is defined based on the configuration of the imaging device. In some embodiments, γ is greater than zero (γ>0). In other embodiments, γ is no greater than zero (γ≤0). The value of γ may be defined based on the types of lenses and/or imaging devices.

If the current size s of the representation 1002 of target 106 is smaller than the expected size S, then F>0 and the focal length increases by |F| so as to increase the size of the target as captured in the images. On the other hand, if the actual size s of the target is larger than the expected size S, then F<0 and the focal length decreases by |F| so as to reduce the current size s of the target 106 as captured in the images. For example, in an embodiment, γ=10. This means that, for example, when the actual size of the target is double the size of the expected size S, the focal length should be decreased by 10 mm accordingly (i.e., F=10*(1−2/1)=−10) and vice versa.

In some embodiments, the adjustment to the operational parameters of the imaging device such as focal length may be constrained or otherwise modified by various constraints of the system. Such constraints may include, for example, the maximum and/or minimum focal lengths that may be achieved by the imaging device 214. As an example, assume the focal length range is (20 mm, 58 mm). Further assume that the initial focal length is 40 mm. Then when s>S, the focal length should be decreased according to equation (9); and when s<S, the focal length should be increased according to equation (9). However, such adjustment is limited by the lower and upper bounds of the focal length range (e.g., 20 mm to 58 mm). In other words, the post-adjustment focal length should be no less than the minimum focal length (e.g., 20 mm) and no more than the maximum focal length (e.g., 58 mm).

As discussed above in FIG. 9, in some embodiments, warning indicators are provided (e.g., at control unit 104) when the calculated adjustment (e.g., linear velocity of movable object or focal length) is modified according to the constraints described herein.

Figure 11:
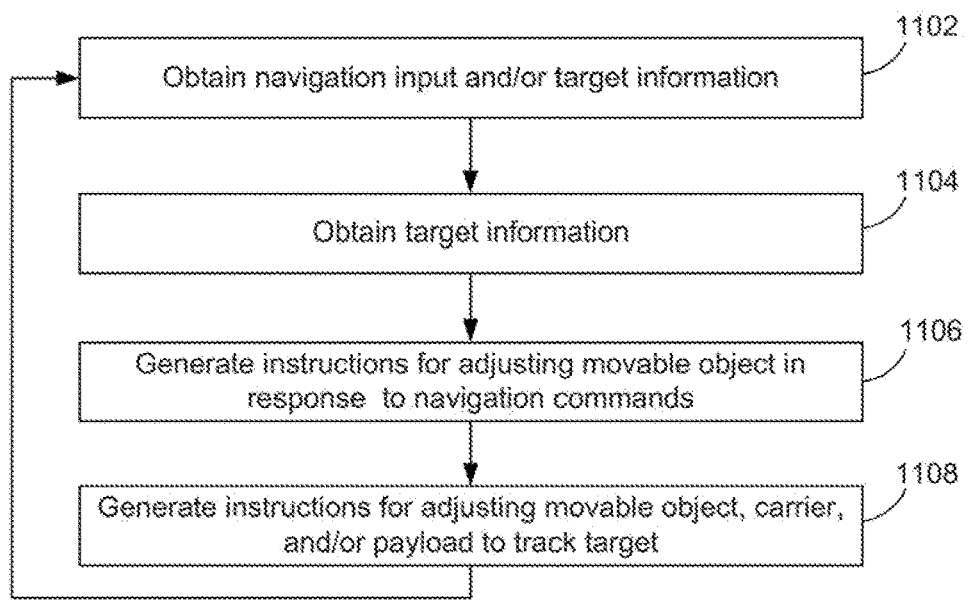
FIG. 11 illustrates an exemplary process for implementing target tracking, in accordance with some embodiments.

FIG. 11 illustrates an exemplary process 1100 for implementing target tracking, in accordance with some embodiments. The method 1100 is performed at a device, such as moving object 102, control unit 104 and/or computing device 126. For example, instructions for performing the method 1100 are stored in tracking module 404 of memory 118 and executed by processor(s) 116 of movable object 102.

The device obtains (1102) user control instructions such as navigation control instructions, for example, from control unit 104 and/or computing device 126. In some embodiments, the navigation control instructions are used for controlling navigational parameters of movable object 102 such as the position, speed, orientation, attitude, or one or more movement characteristics of movable object 102. In some cases, the navigation control instructions include instructions for movable object 102 to execute pre-stored navigation control instructions (e.g., stored by motion control module 402) such as control instructions corresponding to a predetermined navigation path. The navigation control instructions are used, e.g., to control movable object to navigate according to a user-specified or pre-stored navigation path.

The device obtains (1104) target information 408, for example, from control unit 104 and/or computing device 126. In some embodiments, some or all of target information 408 is obtained from memory 118 (e.g., in lieu of receiving targeting information from control unit 104 and/or computing device 126). In some embodiments, some or all of target information 408 is obtained from memory 504, memory 604, and/or database 614. The target information 408 includes, e.g., specific target information 412, target type information 410, and/or expected target information 414.

In some embodiments, target information 408 is generated at least in part based on input received at input device 506 of control unit 104. In some embodiments, target information 408 is generated at least in part using data from memory 118, memory 504, memory 604, and/or database 614. For example, target type information 410 is derived based on e.g., stored images (e.g., images previously captured by imaging device 214).

In some embodiments, the device generates instructions (1106) for adjusting an orientation, position, attitude, and/or one or more movement characteristics of movable object 102, in response to the navigation control instructions obtained at operation 1102. In some embodiments, the generated instructions are used for navigation of movable object 102 according to a user-specified and/or pre-stored navigation path.

In some embodiments, the device generates instructions (1108) for adjusting an orientation, position, attitude, and/or one or more movement characteristics of movable object 102, carrier 108, and/or payload 110 to track target 106 according to the target information 408 (e.g., using operations discussed with regard to FIG. 7).

Figure 12:
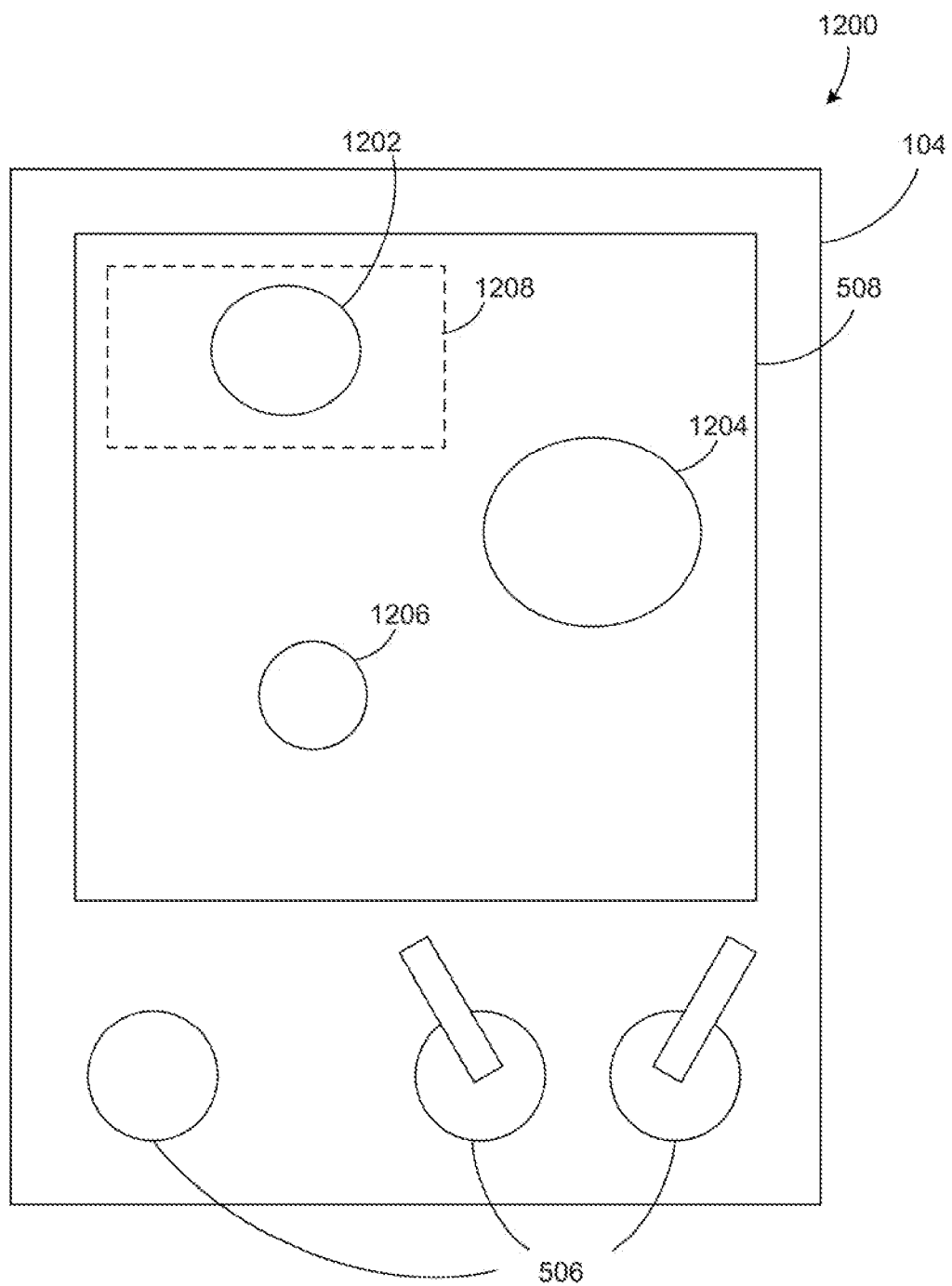
FIG. 12 illustrates an exemplary user interface for selecting and/or tracking a target, in accordance with some embodiments.

FIG. 12 illustrates an exemplary user interface 1200 for selecting and/or tracking a target 106, in accordance with some embodiments. In some embodiments, user interface 1200 is displayed by a control unit 104 and/or a computing device 126. In some embodiments, the user interface is displayed by display 508 of control terminal 104. The user interface includes one or more objects, such as objects 1202, 1204, and 1206. In some embodiments, one or more of objects 1202, 1204, 1206 is a representation of a target 106. In some embodiments, user interface 1200 displays an image captured by imaging device 214 and the image includes the one or more objects 1202, 1204, 1206. In some embodiments, graphical tracking indicator 1208 is displayed in user interface 1200, e.g., adjacent to or surrounding a tracked target 106 (e.g., object 1202). In some embodiments, the position of graphical tracking indicator 1208 changes as the position of object 1202 changes, e.g., such that graphical tracking indicator 1208 remains associated with (e.g., adjacent to or surrounding) object 1202 while object 1202 is a tracked target 106.

In some embodiments, control unit 104 includes one or more input devices 506 for receiving user input. In some embodiments, input received by input devices 506 is used to provide input indicating an object 1202, 1204, 1206 with which graphical tracking indicator 1208 is to be associated. In this way, a user indicates a target 106 to be tracked, in accordance with some embodiments. In some embodiments, target information 408 is generated based on received input associating graphical tracking indicator 1208 with the object 1202 (e.g., to designate object 1202 as target 106). In some embodiments, user input received at input device 506 to associate a graphical tracking indicator 1208 with an object 1202 includes an input gesture received at a point that corresponds to an object (e.g., 1202). In some embodiments, an input gesture is provided by a contact (e.g., by a finger and/or stylus) at display 508 (e.g., a touchscreen display). In some embodiments, a selection of an object 1202 is provided by user-manipulated input device 506 (such as a mouse, button, joystick, keyboard, etc.).

Figure 13:
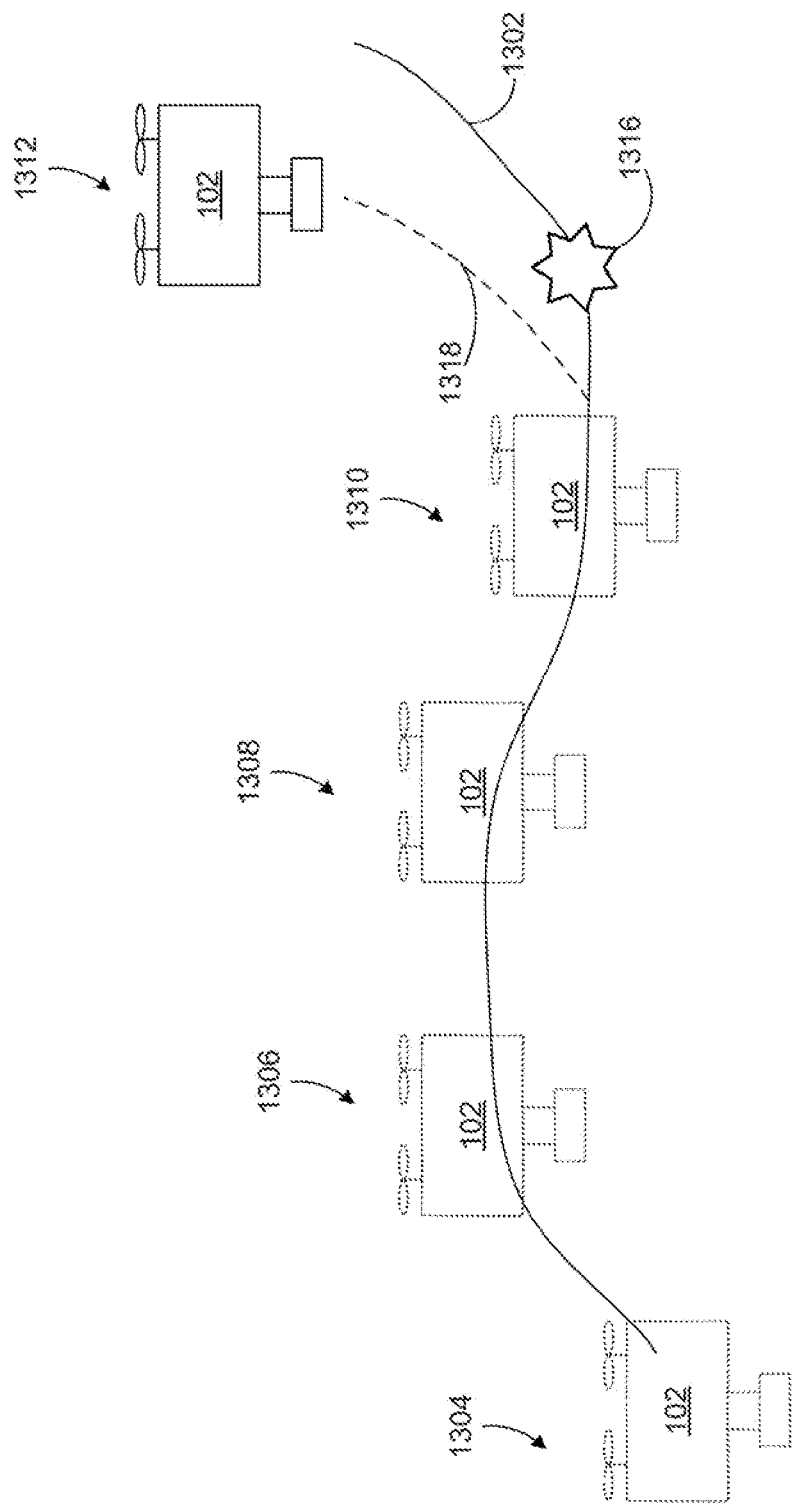
FIG. 13 illustrates controlling a movable object to avoid an obstacle, in accordance with some embodiments.

FIG. 13 illustrates controlling a movable object 102 to avoid an obstacle, in accordance with some embodiments.

Movable object 102 moves along a path 1302. In some embodiments, path 1302 is a predetermined navigation path and/or a path along which movable object 102 moves in response to navigation control instructions (e.g., navigation control instructions received from control unit 104 and/or computing device 126). In some embodiments, the path 1302 is determined at least in part in response to instructions generated for tracking target 106 (e.g., instructions generated as described with respect to FIG. 7).

Movable object 102 moves along path 1302 from a first position 1304 at an initial time $t_0$, to a subsequent position 1306 at a second time $t_1$ that is later than $t_0$, and so on to positions 1308, 1310 at times $t_2$, $t_3$, respectively. Movable object 102 is depicted with broken lines herein to indicate a prior location of movable object 102 at a time prior to a current time (at which movable object 102 is shown with solid lines) or a later location of movable object 102 at a time after a current time.

An obstacle 1316 is located on path 1302, such that movable object 102 would eventually collide with obstacle 1316 if the movable object 102 continued along path 1302 after time $t_3$. In some embodiments, obstacle 1316 is a substantially static object, such as a manmade and/or natural structure, e.g., a traffic sign, radio tower, building, bridge, or geological feature. In some embodiments, obstacle 1316 is a dynamic object, such as a vehicle, tree, human, animal, or another movable object (e.g., a UAV).

In some embodiments, movable object 102 is diverted from path 1302 to an alternate path 1318, e.g., such that movable object does avoids collision with obstacle 1316. For example, at time $t_5$, movable object 102 has moved along alternate path 1318, e.g., to avoid collision with obstacle 1316 and/or to maintain a predetermined distance from obstacle 1316.

In some embodiments, different approaches (e.g., a "reactive" approach or a "proactive approach") are taken to controlling movable object 102 to avoid collision depending on a distance between movable object 102 and obstacle 1316. In some embodiments, a threshold distance used to determine whether a reactive approach or a proactive approach will be used is referred to as a "reactive region."

A reactive region is typically defined relative to movable object 102. In some embodiments, when obstacle 1316 is beyond a reactive region of movable object 102 (e.g., obstacle 1316 is located at a relatively large distance from movable object 102, such as a distance exceeding 10 meters), one or more movement characteristics of movable object 102 are adjusted in a proactive manner, as described further below with reference to FIGS. 14 and 19-22.

Figure 14:
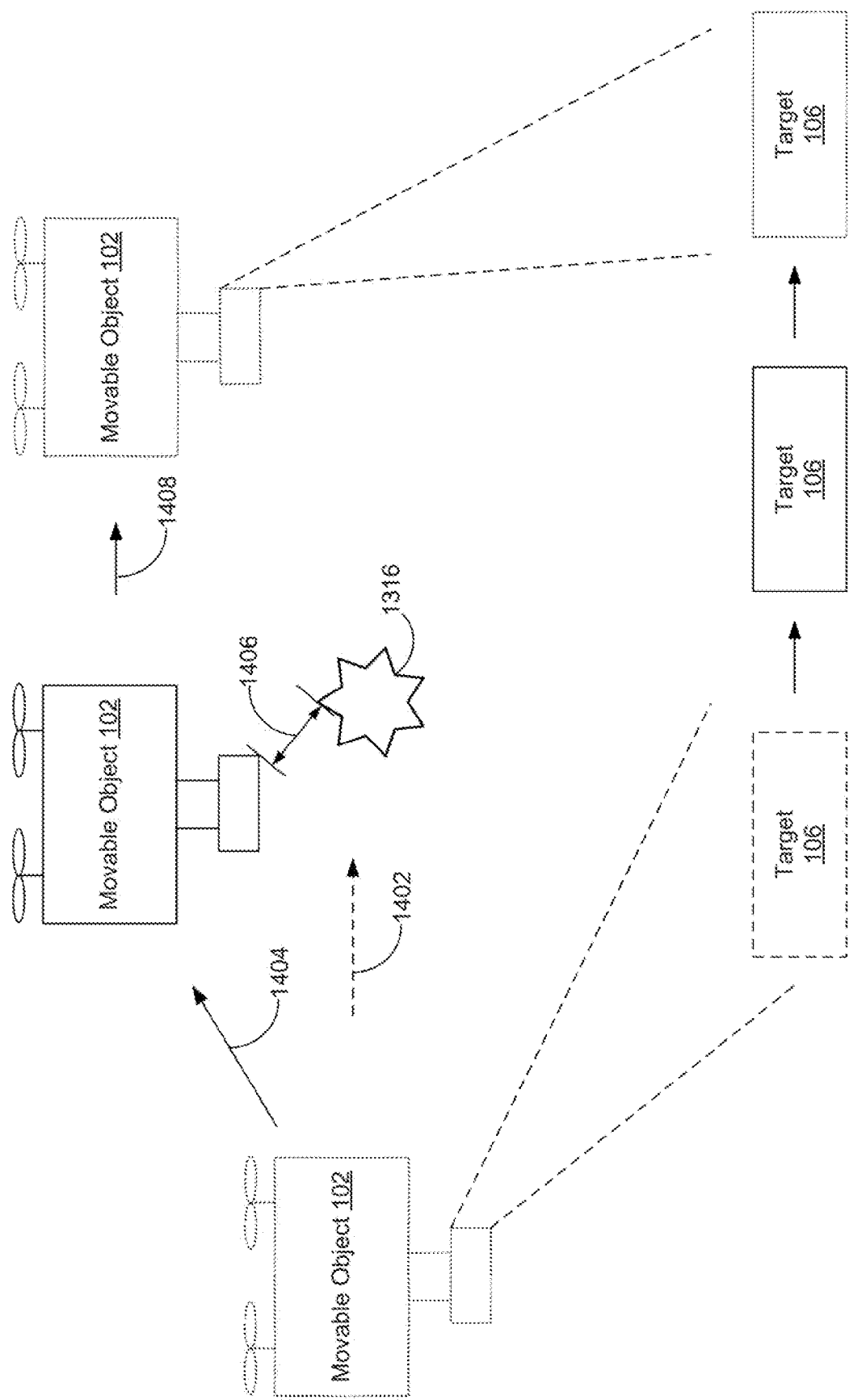
FIG. 14 illustrates adjusting a movement characteristic of a movable object in a proactive manner, in accordance with some embodiments.

FIG. 14 illustrates adjusting a movement characteristic of movable object 102 in a proactive manner, in accordance with some embodiments. As movable object 102 tracks target 106, a navigation path 1402 is determined for movable object 102 (e.g., instructions are generated for movable object 102, such as by target tracking process 700). In some embodiments, in response to detecting obstacle 1316, one or more movement characteristics of movable object 102 are adjusted, e.g., such that movable object moves along alternate path 1404. For example, one or more movement characteristics of movable object 102 are adjusted in a proactive manner. In some embodiments, adjusting one or more movement characteristics of movable object 102 in a proactive manner includes adjusting one or more movement characteristics of movable object 102 such that a distance between movable object 102 and the obstacle exceeds a predefined distance 1406 (e.g., the distance between movable object 102 and obstacle 1316 is maintained at and/or or beyond a predefined distance 1406 as movable object 102 moves relative to obstacle 1316. Predefined distance 1406 is e.g., a distance between 5 and 20 meters, such as 10 meters.

In some embodiments, after movable object 102 moves along alternate path 1404, movable object 102 resumes movement along a navigation path 1408 for tracking target 106. In some embodiments, movable object 102 tracks target 106 continuously as one or more movement characteristics of movable object 102 are adjusted in a proactive manner. In some embodiments, movable object 102 ceases to track target 106 when one or more movement characteristics of movable object 102 are adjusted in a proactive manner and/or when obstacle 1316 is detected. In some embodiments, after ceasing to track target 106, movable object 102 resumes tracking of target 106 when obstacle 1316 is avoided (for example, when, motion of movable object 102 is along a vector that points away from obstacle 1316) and/or when obstacle 1316 is no longer detected.

Figure 15:
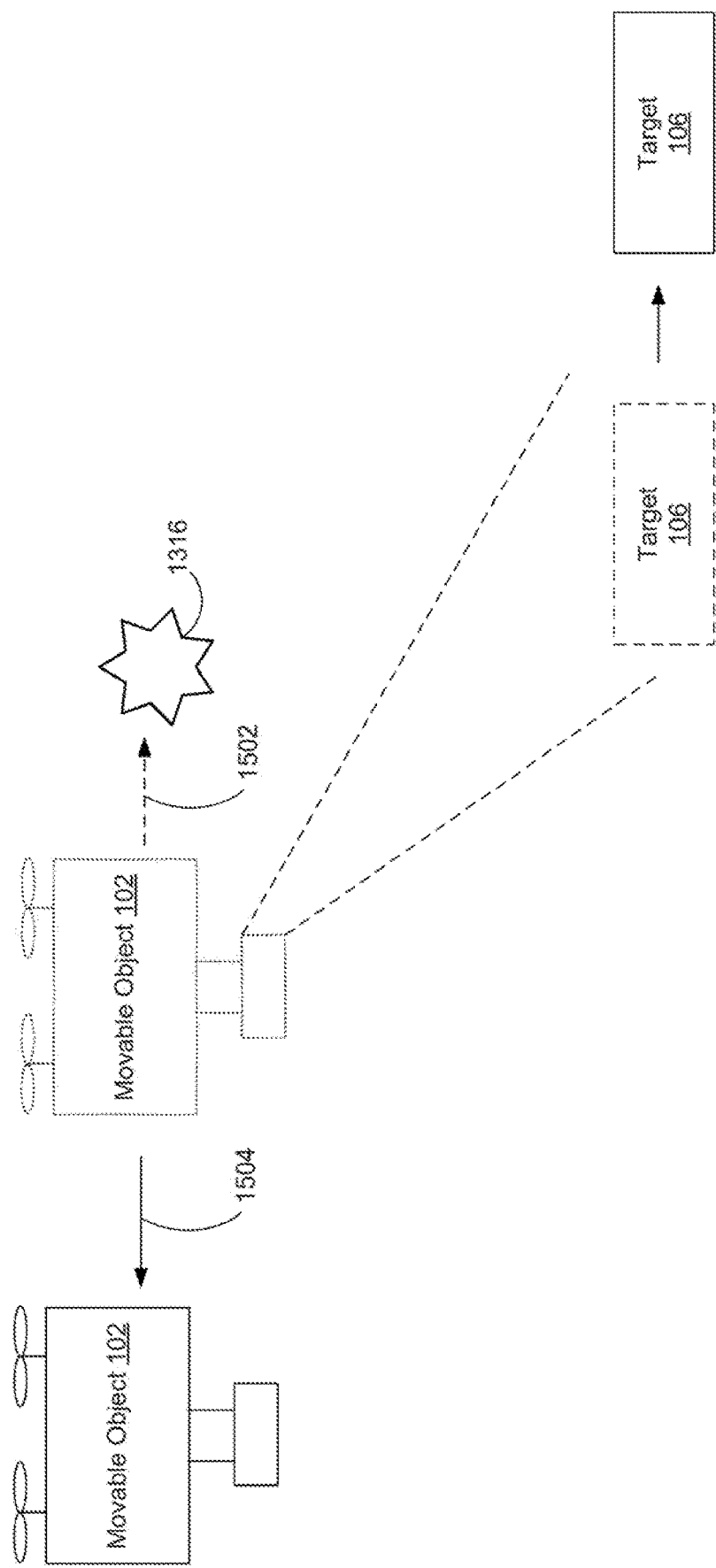
FIG. 15 illustrates adjusting a movement characteristic of a movable object in a reactive manner in accordance with some embodiments.

FIG. 15 illustrates adjusting a movement characteristic of movable object 102 in a reactive manner, in accordance with some embodiments. For example, a movement characteristic of movable object 102 is adjusted in a reactive manner, e.g., such that a collision between obstacle 1316 and movable object 102 is avoided. As movable object 102 tracks target 106, a navigation path 1502 is determined for movable object 102 (e.g., instructions are generated for movable object 102, such as by target tracking process 700). In some embodiments, in response to detecting obstacle 1316, and in response to determining that the location of the obstacle 1316 corresponds to a reactive region (e.g., obstacle 1316 is located within 10 meters of movable object 102), one or more movement characteristics of movable object 102 are adjusted, e.g., such that movable object 102 ceases to move or moves along reverse path 1504. For example, one or more movement characteristics of movable object 102 are adjusted in a reactive manner. Adjusting one or more movement characteristics of movable object 102 in a reactive manner includes adjusting one or more movement characteristics to reduce the acceleration of movable object 102, reduce the velocity of movable object 102, cease the motion of movable object 102, and/or to reverse the motion of movable object 102. For example, one or more movement characteristics of movable object 102 are adjusted such that movable object 102 moves along an alternate path 1504 (e.g., in a direction that increases distance between movable object 102 and obstacle 1316, such as a direction that is opposite to navigation path 1502).

Figure 16:
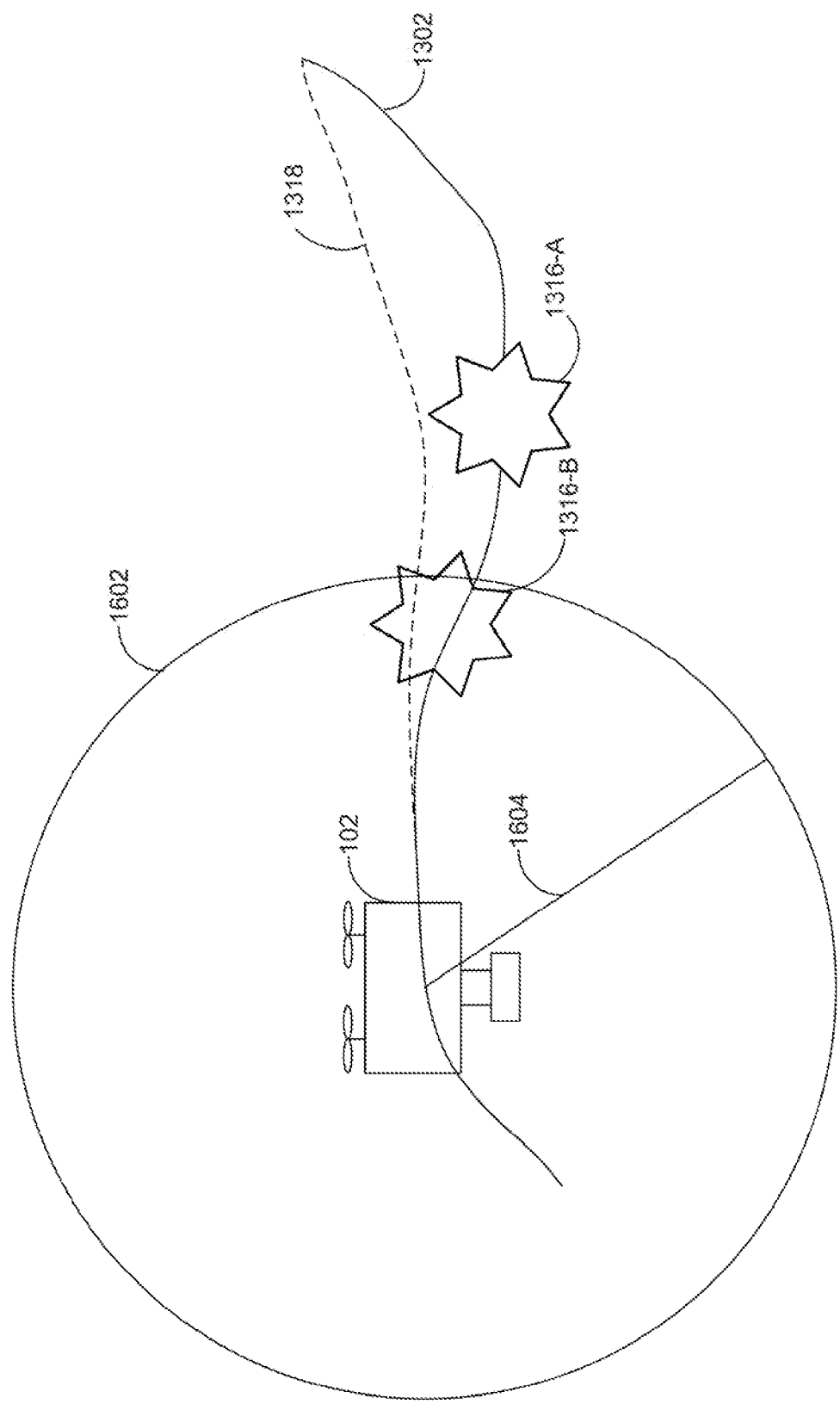
FIG. 16 illustrates a reactive region, in accordance with some embodiments.

FIG. 16 illustrates a reactive region 1602, in accordance with some embodiments. Reactive region 1602 is a region in which one or more movement characteristics of movable object 102 are adjusted in a reactive manner, e.g., to avoid collision of movable object 102 with obstacle 1316. Typically, reactive region 1602 is a region defined relative to movable object 102, such a region centered on movable object 102 and/or surrounding movable object 102. For example, reactive region 1602 is, e.g., a circle or a sphere (e.g., centered on movable object 102 and/or a defined point relative to movable object 102, such as a center of mass of movable object 102). In some embodiments, reactive region 1602 extends from movable object 102 in a direction of movement of a movable object 102. For example, reactive region 1602 is, e.g., a cone or triangle (e.g., with a vertex on movable object 102 and/or a defined point relative to movable object 102, such as a center of mass of movable object 102). In some embodiments, reactive region 1602 is defined by a radius 1604. In some embodiments, the length of radius 1604, is, e.g., a distance between 5 and 20 meters, such as 10 meters. In some embodiments, reactive region 1602 is a distance from movable object 102 along an axis that is a line defined by movable object 102 (and/or a defined point relative to movable object 102) and obstacle 1316 (e.g. a point determined from and/or indicated by current location information for obstacle 1316). In some embodiments, reactive region 1602 is a predefined distance from movable object 102 along path 1302.

Obstacle 1316 is discovered, e.g., in response to a periodic scan, in response to a user- or device-initiated scan, based on navigation information, or in response to a determination that obstacle intersects a path 1302 of movable object 102. In some embodiments, obstacle 1316 is discovered using a stored depth map and/or a depth map generated in real time (using one or more sensors of movable object sensing system 122). Obstacle 1316 is discovered by movable object 102, control unit 104, computing device 126, and/or based on received user input indicating the presence of an obstacle. In some embodiments, movable object 102, control unit 104, and/or computing device 126 determines, based on current location information for obstacle 1316, whether a location of obstacle 1316 corresponds to a reactive region 1602. In some embodiments, detecting an obstacle includes obtaining current location information of an obstacle 1316. In some embodiments, current location information is obtained for an obstacle 1316 in response to detection of the obstacle.

Obstacle 1316-A is presented as an example of an obstacle 1316 that does not correspond to reactive region 1602 (e.g., because obstacle 1316-A is outside of reactive region 1602). For example, a point, dimension, outline, area, and/or volume of obstacle 1316-A (e.g., as determined by image analysis module 406) or a point defined with respect to obstacle 1316-A (e.g., a centroid of obstacle 1316-A) is partially (e.g., at least 90%) or fully outside of and/or beyond reactive region 1602. In some embodiments, in response to a determination that the location of obstacle 1316-A does not correspond to the reactive region 1602, one or more movement characteristics of movable object 102 are adjusted in a proactive manner (e.g., such that a distance between the movable object 102 and the obstacle 1316-A exceeds a first predefined distance 1406). In some embodiments, first predefined distance 1406 is greater than or equal to the length of radius 1604.

Obstacle 1316-B is presented as an example of an obstacle 1316 that corresponds to reactive region 1602. Obstacle 1316-B is shown within (e.g., at least partially within and/or overlapping) reactive region 1602. For example, a point, dimension, outline, area, and/or volume of obstacle 1316-B (e.g., as determined by image analysis module 406) or a point defined with respect to obstacle 1316-B (e.g., a centroid of obstacle 1316-B) is within (e.g., at least partially within, such as at least 10% within, and/or overlapping) reactive region 1602. In some embodiments, in response to a determination that the location of obstacle 1316-B corresponds to the reactive region 1602, one or more movement characteristics of movable object 102 are adjusted in a reactive manner (e.g., such that a collision between movable object 102 and the obstacle 1316-B is avoided).

Figure 17:
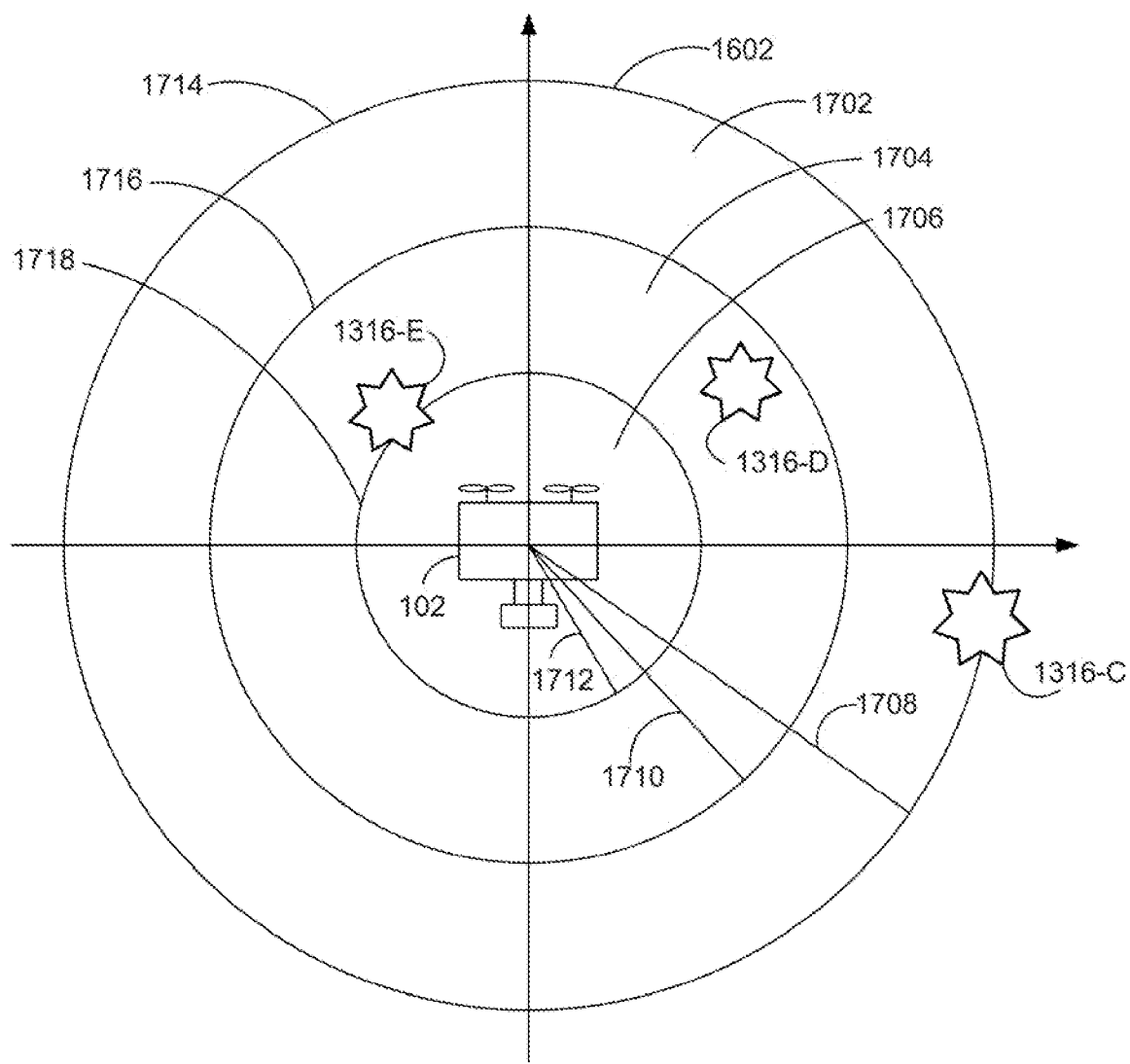
FIG. 17 illustrates sub-regions of a reactive region, in accordance with some embodiments.

FIG. 17 illustrates sub-regions of reactive region 1602, in accordance with some embodiments. In some embodiments, reactive region 1602 includes two or more sub-regions. For example, reactive region 1602 as shown in FIG. 17 includes a first sub-region 1702, a second sub-region 1704, and a third sub-region 1706.

First sub-region 1702 of reactive region 1602 is, e.g., a region defined by first boundary 1714 (e.g., a sphere with a radius as indicated at 1708) and second boundary 1708 (e.g., a sphere with a radius as indicated at 1710), such as a volume between first boundary 1714 and second boundary 1716.

Second sub-region 1704 of reactive region 1602 is, e.g., a region defined by second boundary 1716 (e.g., a sphere with a radius as indicated at 1710), and third boundary 1718 (e.g., a sphere with a radius as indicated at 1712), such as a volume between second boundary 1716 and third boundary 1718.

Third sub-region 1706 of reactive region 1602 is, e.g., a region defined by third boundary 1718, such as a spherical volume inside boundary 1718.

In some embodiments, the lengths of radii 1712, 1710, and 1708 are, e.g., 2 meters, 5 meters, and 10 meters, respectively.

In some embodiments, one or more of first sub-region 1702, second sub-region 1704, and third sub-region 1706 is defined by a distance from movable object 102 along an axis that is a line from movable object 102 to obstacle 1316. In some embodiments, one or more of first sub-region 1702, second sub-region 1704, and third sub-region 1706 is defined by one or more circles within a particular plane, and/or other geometric shapes, volumetric shapes, and or irregular shapes.

In some embodiments, when a determined location of an obstacle 1316 corresponds to first sub-region 1702, one or more movement characteristics of the movable object 102 are adjusted to, e.g., reduce an acceleration of the movable object 102 (such as acceleration in the direction of obstacle 1316-C). In FIG. 17, obstacle 1316-C corresponds to first sub-region 1702 because obstacle 1316-C is located within (e.g., at least partially within) first sub-region 1702. For example, a location of obstacle 1316-C corresponds to first sub-region 1702 when a point, dimension, outline, area, and/or volume of obstacle 1316-C (e.g., as determined by image analysis module 406) or a point defined with respect to obstacle 1316-C (e.g., a centroid of obstacle 1316-C) is partially (e.g., at least 10%) within first sub-region 1702.

In some embodiments, when a determined location of an obstacle 1316 corresponds to second sub-region 1704, one or more movement characteristics of the movable object 102 are adjusted to, e.g., reduce a velocity of the movable object 102 (such as velocity in the direction of obstacle 1316-D). In FIG. 17, obstacle 1316-D corresponds to second sub-region 1704 (e.g., obstacle 1316-D is located within (e.g., at least partially within) second sub-region 1702). For example, a location of obstacle 1316-D corresponds to second sub-region 1704 when a point, dimension, outline, area, and/or volume of obstacle 1316-D (e.g., as determined by image analysis module 406) or a point defined with respect to obstacle 1316-D (e.g., a centroid of obstacle 1316-D) is partially (e.g., at least 10%) within second sub-region 1704.

In some embodiments, when a determined location of an obstacle 1316 corresponds to a third sub-region 1706, one or more movement characteristics of the movable object 102 are adjusted to, e.g., reverse movement direction of the movable object 102 and/or cease movement of the movable object 102. For example movement of movable object 102 toward obstacle 1316-E is reversed such that movable object 102 ceases to move toward obstacle 1316-E and begins to move away from obstacle 1316-E. In FIG. 17, obstacle 1316-E corresponds to third sub-region 1706 because obstacle 1316-E is located within (e.g., at least partially within) third sub-region 1706. For example, a location of obstacle 1316-E corresponds to third sub-region 1706 when a point, dimension, outline, area, and/or volume of obstacle 1316-E (e.g., as determined by image analysis module 406) or a point defined with respect to obstacle 1316-E (e.g., a centroid of obstacle 1316-E) is partially (e.g., at least 10%) within third sub-region 1706.

Figure 18B:
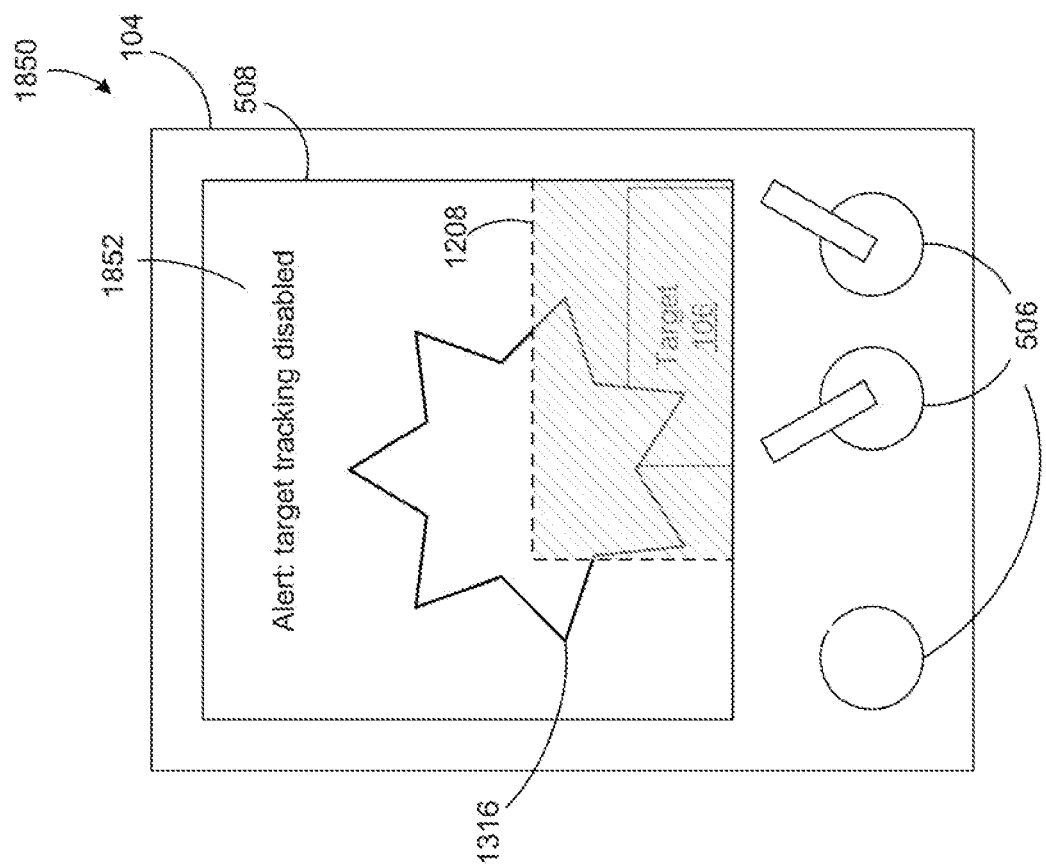
FIGS. 18A-18B illustrate exemplary adjustments made to a user interface in response to received adjusted target tracking information, in accordance with some embodiments.
Figure 18A:
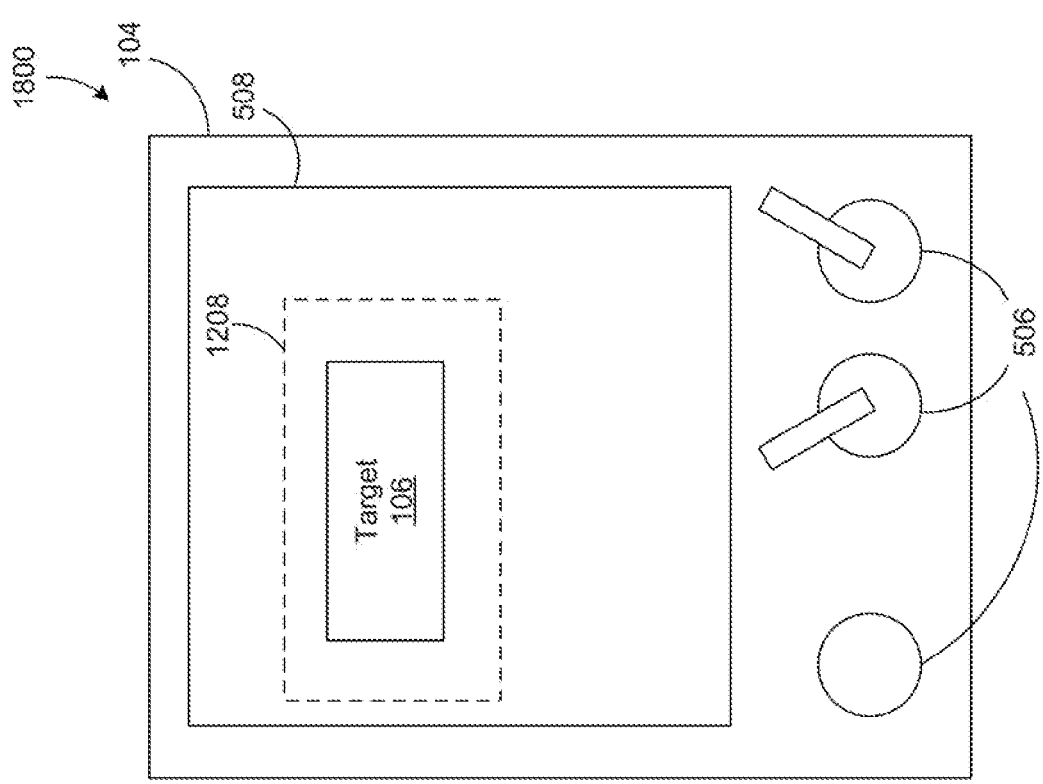

FIGS. 18A-18B illustrate exemplary adjustments made to user interface 1200 in response to received adjusted target tracking information, in accordance with some embodiments.

In FIG. 18A, display 508 displays a first state 1800 of a user interface 1200 for selecting and/or tracking a target 106, e.g., as described with reference to FIG. 12. For example, in the first state 1800, selection and/or ongoing tracking of target 106 is indicated by graphical tracking indicator 1208.

In FIG. 18B, display 508 displays a second state 1850 of user interface 1200, e.g., a second state 1850 of the user interface 1200 presented in response to received adjusted target tracking information. In some embodiments, adjusted target tracking information is received by control unit 104 from computing device 126 and/or movable object 102. For example, updated target tracking is generated in response to determining that the location of obstacle 1316 corresponds to the reactive region 1602, first sub-region 1702, second sub-region 1704 and/or third sub-region 1706. In some embodiments, adjusted target tracking information is generated in response to adjusting one or more movement characteristics of the movable object 102 in a reactive manner.

In some embodiments, in response to receiving adjusted target tracking information (e.g., when one or more movement characteristics of the movable object 102 are updated in a reactive manner) at least one aspect of the appearance of graphical tracking indicator 1208 is changed. For example, a color of an outline of graphical tracking indicator 1208 is changed, part or all of the area of graphical tracking indicator 1208 becomes shaded, a color of shading of part or all of graphical tracking indicator 1208 is changed, and/or a size of graphical tracking indicator 1208 is changed. In some embodiments, graphical tracking indicator overlaps (e.g., partially overlaps) obstacle 1316 and/or target 106. In some embodiments a shading of at least part of graphical tracking indicator 1208 is transparent (e.g., partially transparent) such that obstacle 1316 and/or target 106 is visible through the shading of graphical tracking indicator 1208. In some embodiments, in response to receiving adjusted target tracking information, graphical tracking indicator 1208 ceases to be displayed. Changing at least one aspect of the appearance of graphical tracking indicator 1208 and/or ceasing to display graphical tracking indicator 1208 occurs, e.g., to indicate that tracking of target 106 has been disabled (e.g., temporarily disabled).

In some embodiments, in response to receiving adjusted target tracking information (e.g., when one or more movement characteristics of the movable object 102 are adjusted in a reactive manner) a user is prevented from selecting a target 106.

In some embodiments, in response to receiving adjusted target tracking information (e.g., when one or more movement characteristics of the movable object 102 are adjusted in a reactive manner), warning indicator 1852 is presented. In some embodiments, warning indicator 1852 includes text, images or other visual indicators (e.g., changed user interface background color and/or flashing light) displayed by display 508, audio (e.g., siren or beeping sound) output by control unit 104, and/or haptic feedback output by control unit 104.

Figure 19:
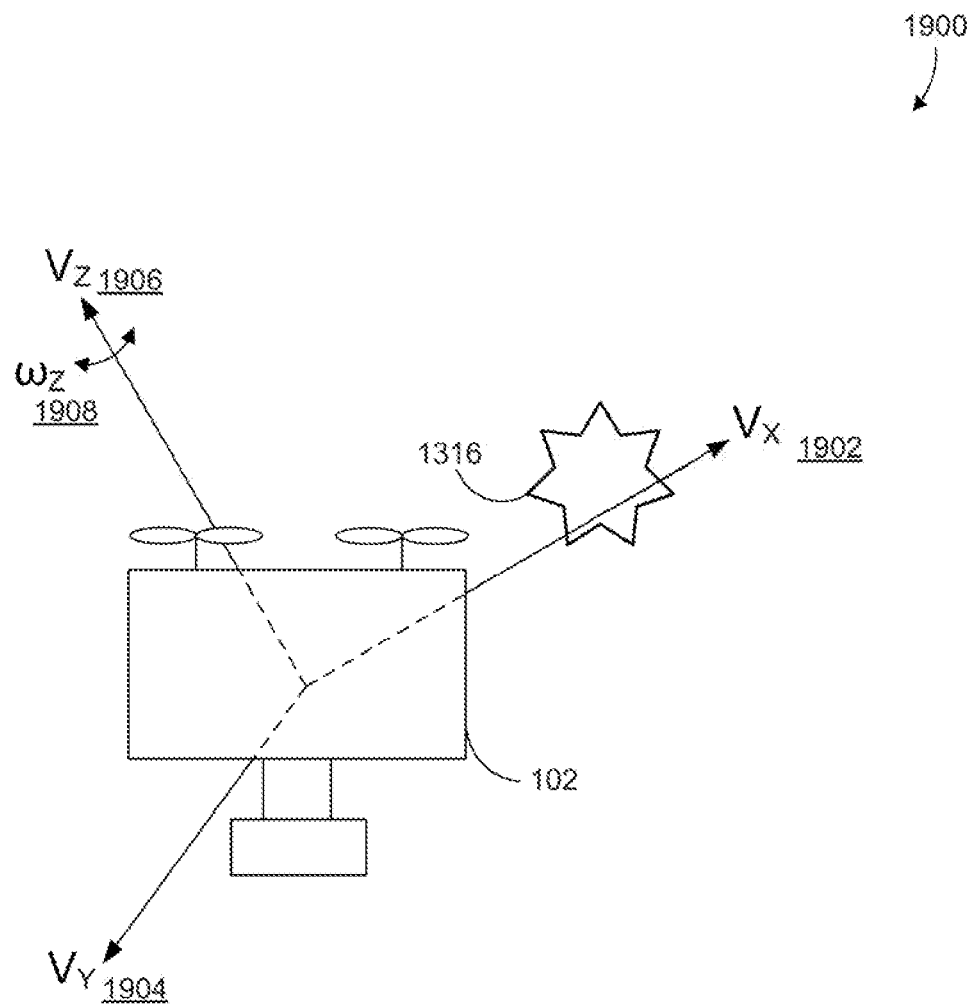
FIG. 19 illustrates a frame of reference used for adjusting one or more movement characteristics of a movable object in a proactive manner, in accordance with some embodiments.

FIG. 19 illustrates a frame of reference used for adjusting one or more movement characteristics of the movable object 102 in a proactive manner, in accordance with some embodiments. In some embodiments, a frame of reference 1900 is defined relative to a point corresponding to movable object 102, such as a center of gravity or central point of a dimension (e.g., length, width, or height) an area, or a volume movable object 102. In some embodiments, movable object 102 as shown in FIG. 19 is moving along a path 1302 as shown in FIG. 13. Frame of reference 1900 includes velocity vector components $V_X$, $V_Y$, $V_Z$ along an x-axis, y-axis, and z-axis respectively. In some embodiments, $V_X$ 1902 is oriented along a vector of movement of movable object 102 (e.g., a vector pointing along path 1302, such as a vector along an axis that is a line defined by a point corresponding to movable object 102 and a point corresponding to target 106). In some embodiments, In some embodiments, $V_Y$ 1904 and $V_Z$ 1906 are orthogonal to $V_X$ 1902. Angular velocity $\omega_Z$ 1908 (yaw) indicates a velocity of rotation about a z-axis. In some embodiments, adjusting one or more movement characteristics of the movable object in a proactive manner includes adjusting movement characteristics along axes $V_Y$ 1904 and axis $V_Z$ 1906 (e.g., preferentially adjusting movement characteristics along axes $V_Y$ 1904 and axis $V_Z$ 1906), for example, to allow movable object 102 to maintain a predetermined distance from obstacle 1316 while maintaining and/or minimally adjusting angular velocity $\omega_Z$ 1908 and/or movement along $V_X$ 1902.

Figure 20:
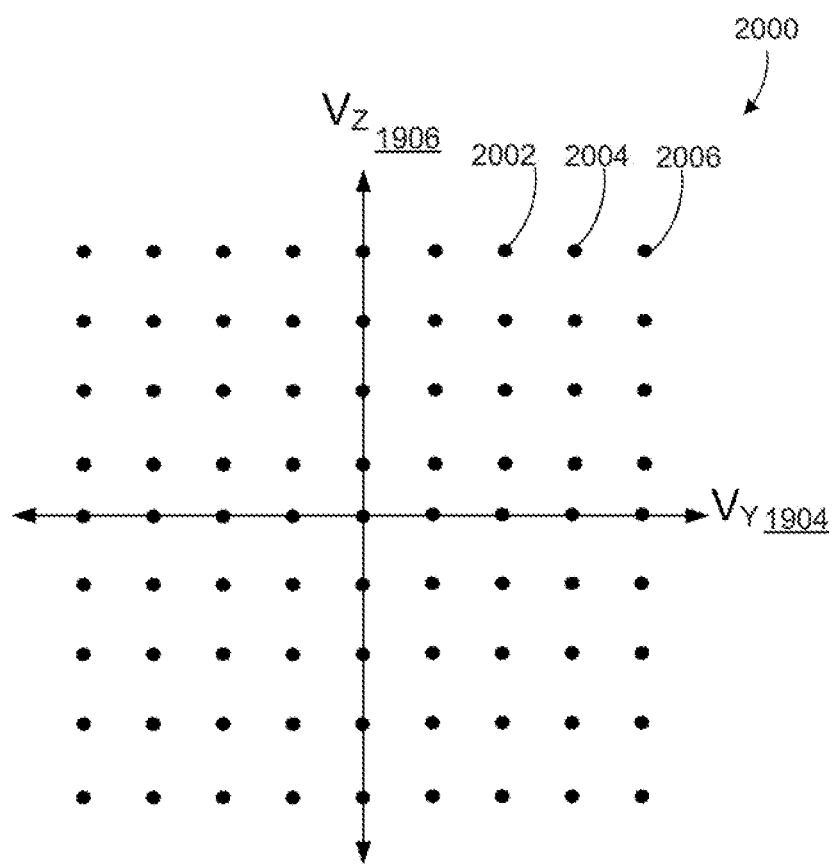
FIG. 20 illustrates sets of candidate movement characteristics for determining a $(V_Y, V_Z)$ motion adjustment, in accordance with some embodiments.

FIG. 20 illustrates sets of candidate movement characteristics for determining a ($V_Y$, $V_Z$) motion adjustment, in accordance with some embodiments. In some embodiments, in response to determining that the location of the obstacle does not correspond to reactive region 1602, one or more movement characteristics of the movable object 102 are adjusted in a proactive manner (e.g., such that a distance between the movable object 102 and the obstacle 1316 exceeds a first predefined distance). In some embodiments, adjusting one or more movement characteristics of the movable object 102 in a proactive manner includes determining route optimization scores for multiple sets of candidate movement characteristics. A set of candidate movement characteristics is, e.g., a set of $(V_Y, V_Z)$ coordinates (e.g., set 2002) in frame of reference 1900. Plot 2000 includes multiple sets (e.g., sets 2002, 2004, 2006, and so on) of candidate movement characteristics. In some embodiments, a route optimization score is determined for each set of $(V_Y, V_Z)$ coordinates. In some embodiments, the route optimization score is an indication of factors such as predicted amount of time before movable object 102 will collide with obstacle 1316, differences between the set of candidate movement characteristics and the set of current movement characteristics of movable object 102, and/or a distance between movable object 102 and target 106 (e.g., a target being tracked) at a predetermined future time. In some embodiments, a set of $(V_Y, V_Z)$ coordinates that has a highest route optimization score is selected and one or more movement characteristics of movable object 102 are adjusted based on the selected set.

For example, sets 2002, 2004, 2006, correspond to $(V_Y, V_Z)$ coordinates (24, 21), (26, 21), (28, 21) respectively, where each value indicates a component of a velocity vector along respective axes $V_Y, V_Z$ (e.g., in meters per second). One or more rules are applied to determine route optimization scores for each set. For example, route optimization scores of 0.4, 0.62, and 0.51 are determined for sets 2002, 2004, and 2006, respectively. In this example (in which only three sets are evaluated for ease of description), set 2004 is selected because set 2004 has the highest route optimization score. Movement of movable object 102 is adjusted, e.g., to adjust its $(V_Y, V_Z)$ motion to (26, 21) meters per second.

Figure 21:
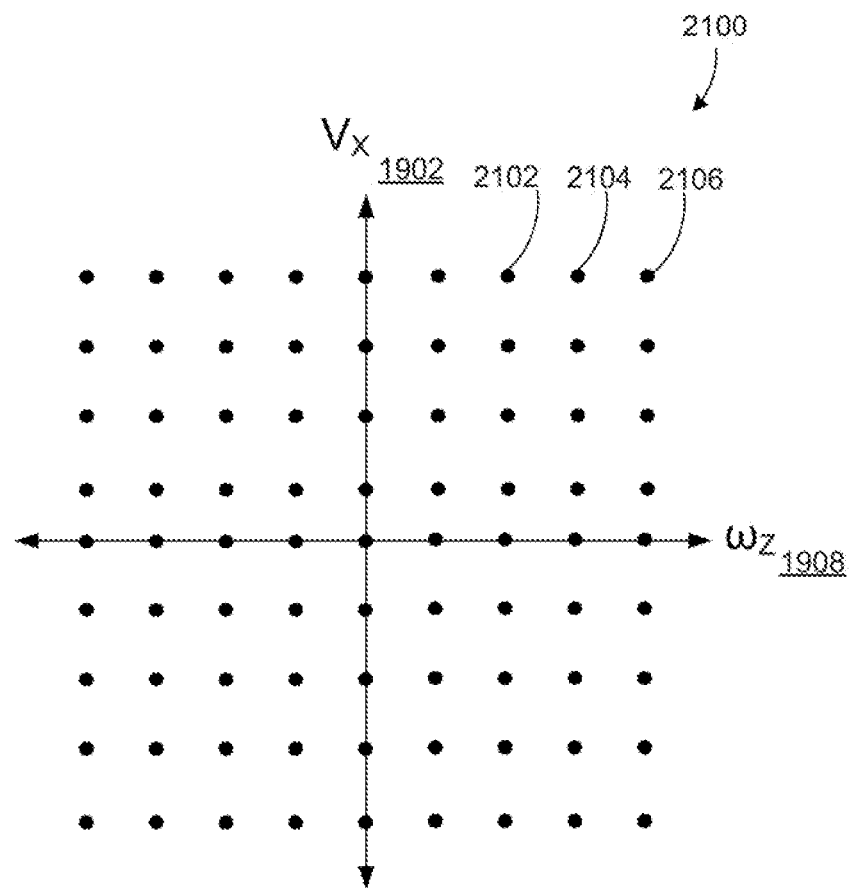
FIG. 21 illustrates sets of candidate movement characteristics for determining a $(V_X, \omega_Z)$ motion adjustment, in accordance with some embodiments.

FIG. 21 illustrates sets of candidate movement characteristics for determining a $(V_X, \omega_Z)$ motion adjustment, in accordance with some embodiments. In some embodiments, in response to determining that the location of the obstacle does not correspond to reactive region 1602, one or more movement characteristics of the movable object 102 are adjusted in a proactive manner (e.g., such that a distance between the movable object 102 and the obstacle 1316 exceeds a first predefined distance). In some embodiments, $(V_X, \omega_Z)$ adjustment criteria are applied to determine whether a $(V_Y, V_Z)$ adjustment or a $(V_X, \omega_Z)$ motion adjustment is to be used. For example, in some embodiments, when a $(V_Y, V_Z)$ adjustment will be insufficient to adjust movement characteristics of the movable object 102 such that a distance between the movable object 102 and the obstacle 1316 exceeds a first predefined distance, a $(V_X, \omega_Z)$ motion adjustment is used. In some embodiments, $(V_X, \omega_Z)$ adjustment criteria include a determination of whether a size of obstacle 1316 exceeds a threshold size (e.g., a threshold size that varies depending on motion of movable object 102 and/or obstacle 1316), such that a $(V_X, \omega_Z)$ motion adjustment is used when the size of obstacle 1316 exceeds the threshold size. In some embodiments, adjusting one or more movement characteristics of the movable object 102 in a proactive manner includes a $(V_Y, V_Z)$ adjustment and a $(V_X, \omega_Z)$ motion adjustment.

In some embodiments, adjusting one or more movement characteristics of the movable object 102 in a proactive manner includes determining route optimization scores for multiple sets of candidate $(V_X, \omega_Z)$ movement characteristics. A set of candidate movement characteristics is, e.g., a set of $(V_X, \omega_Z)$ coordinates (e.g., set 2102) in frame of reference 1900. Plot 2100 includes multiple sets (e.g., sets 2102, 2104, 2106, and so on) of candidate movement characteristics. In some embodiments, a route optimization score is determined for each set of $(V_X, \omega_Z)$ coordinates. In some embodiments, the route optimization score is an indication of factors such as predicted amount of time before movable object 102 will collide with obstacle 1316, differences between the set of candidate movement characteristics and the set of current movement characteristics of movable object 102, and/or a distance between movable object 102 and target 106 (e.g., a target being tracked) at a predetermined future time. In some embodiments, a set of $(V_X, \omega_Z)$ coordinates that has a highest route optimization score is selected and one or more movement characteristics of movable object 102 are adjusted based on the selected set.

Figure 22A:
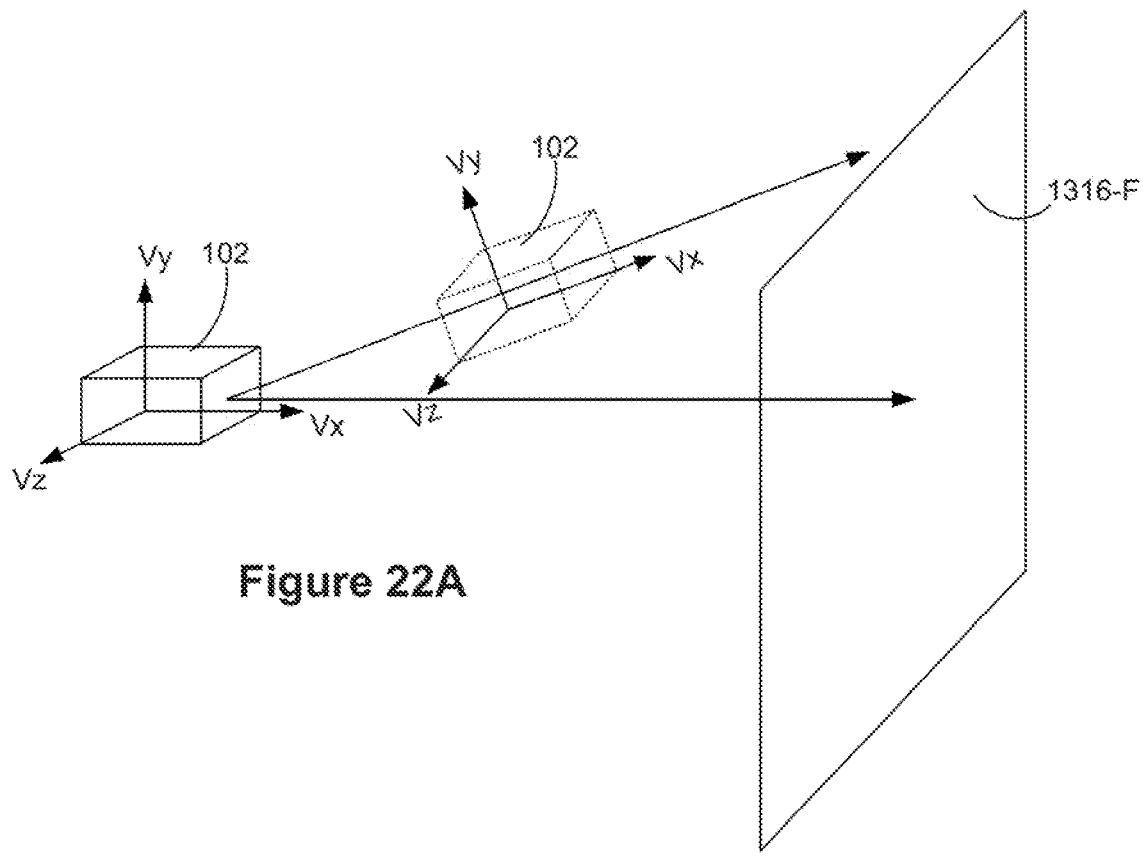
FIGS. 22A-22B illustrate obstacle size criteria applied to determine whether a $(V_Y, V_Z)$ motion adjustment or a $(V_X, \omega_Z)$ motion adjustment is to be used, in accordance with some embodiments.
Figure 22B:
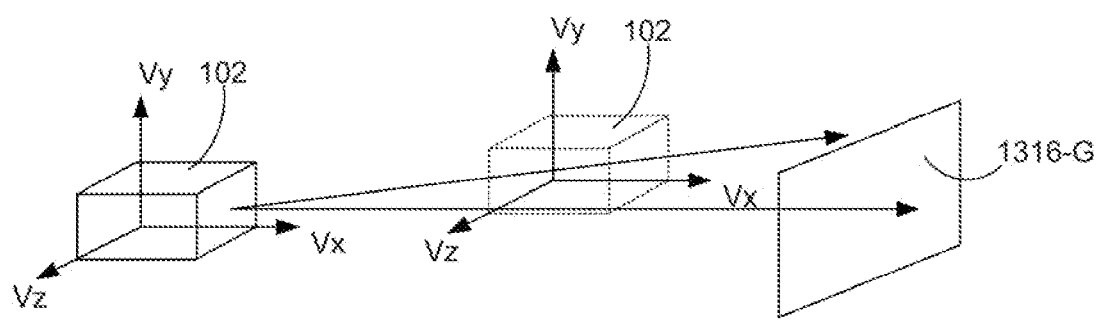
Figure 24E:
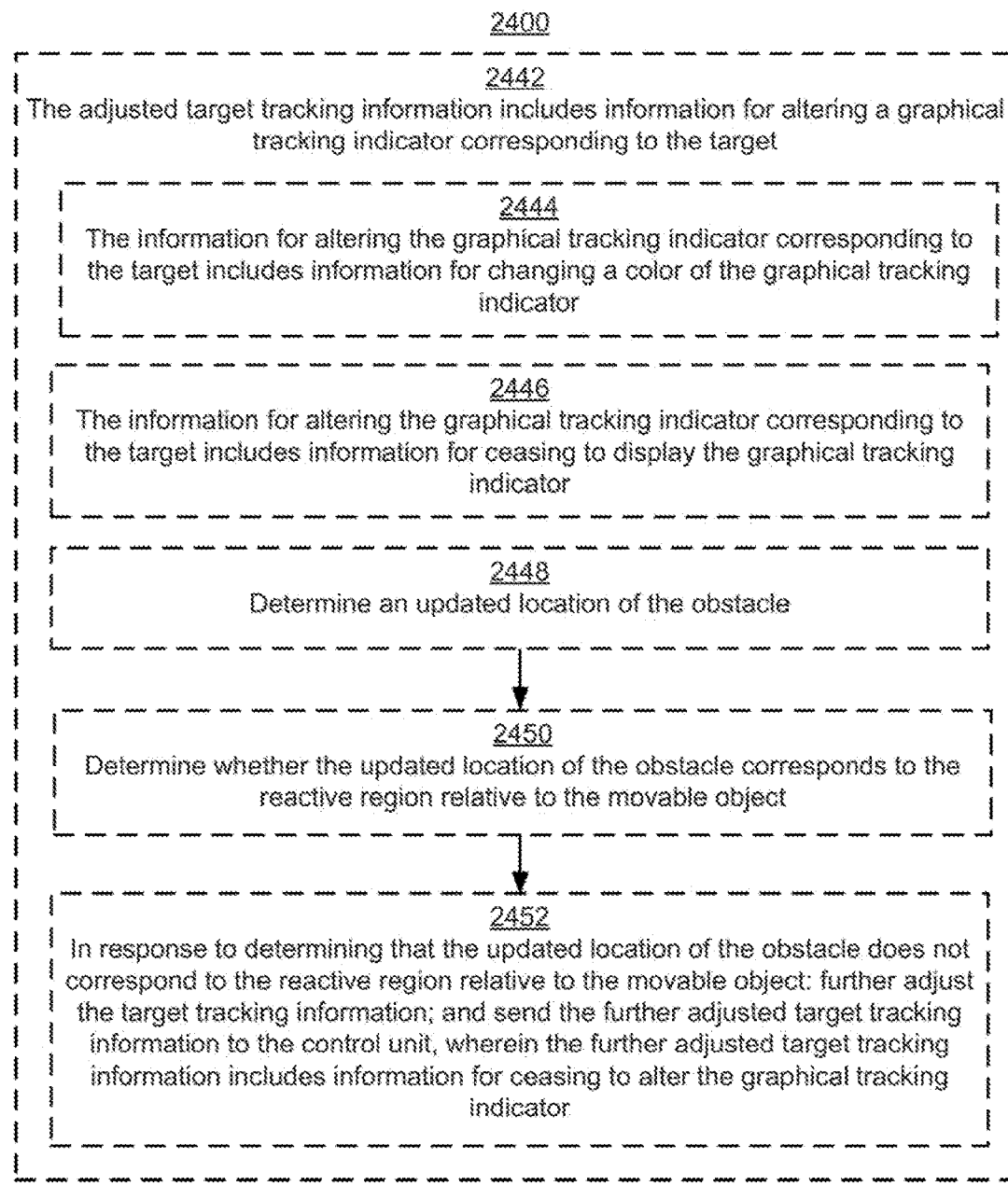
Figure 24F:
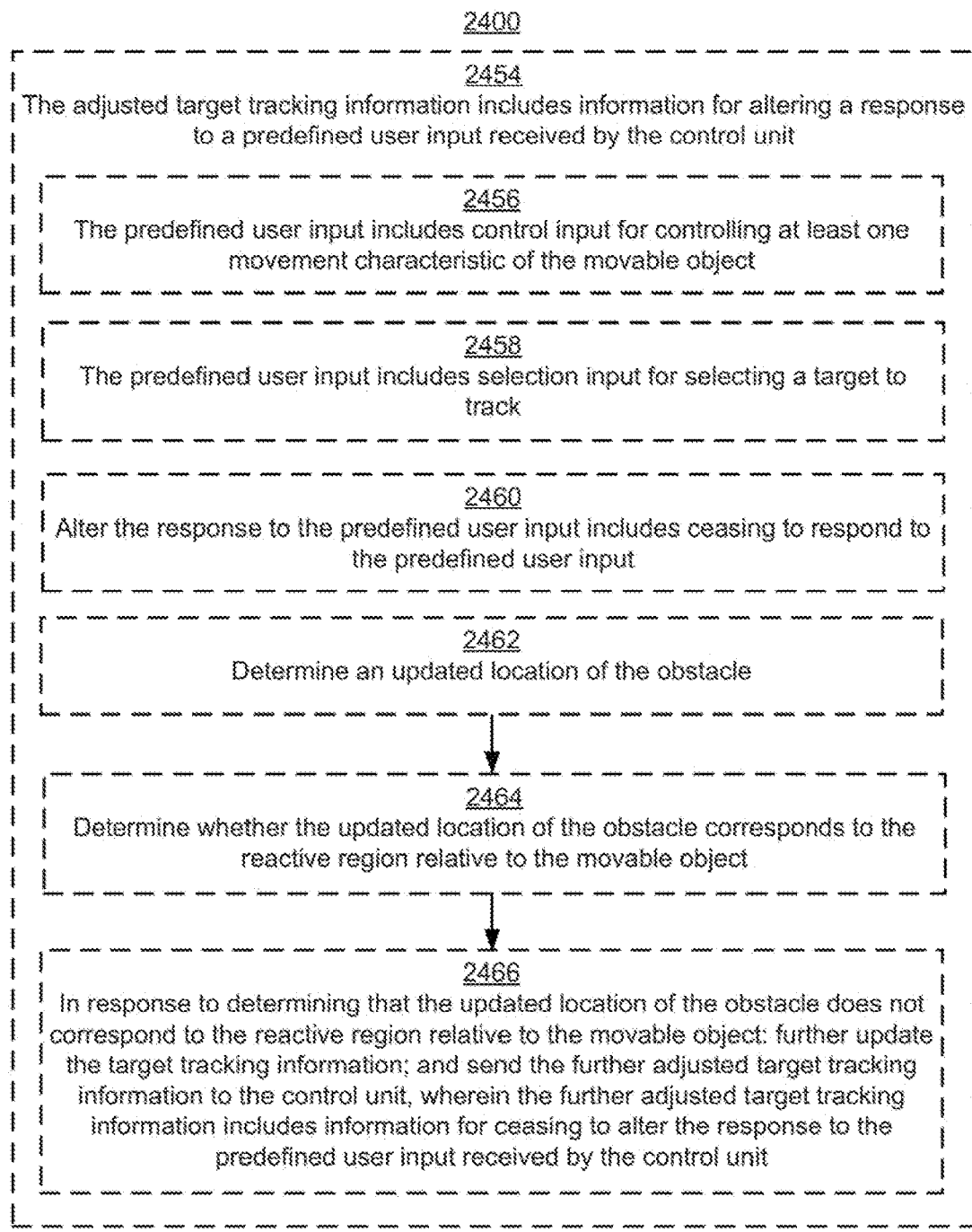

FIGS. 22A-22B illustrate $(V_X, \omega_Z)$ adjustment criteria (e.g. obstacle size criteria) applied to determine whether a $(V_Y, V_Z)$ adjustment or a $(V_X, \omega_Z)$ motion adjustment is to be used, in accordance with some embodiments. In some embodiments obstacle size criteria are met when a size of obstacle 1316 exceeds a threshold size. In FIG. 22A, obstacle 1316-F exceeds a threshold size. For example, the size of 1316-F is sufficiently large that a $(V_Y, V_Z)$ adjustment will be insufficient, so a $(V_X, \omega_Z)$ adjustment is needed. In some embodiments, because obstacle 1316-F exceeds the threshold size, obstacle size criteria are met, and a $(V_X, \omega_Z)$ set is selected from plot 2100 for adjusting one or more movement characteristics of movable object 102.

In FIG. 22B, obstacle 1316-G does not exceed a threshold size. For example, the size of 1316-G is sufficiently small that a $(V_Y, V_Z)$ adjustment will be sufficient. In some embodiments, because obstacle 1316-G does not exceed the threshold size, $(V_X, \omega_Z)$ obstacle size criteria are not met, and a $(V_Y, V_Z)$ set is selected from plot 2000 for adjusting one or more movement characteristics of movable object 102.

FIGS. 23A-23F are a flow diagram illustrating a method 2300 for controlling a movable object, in accordance with some embodiments. The method 2300 is performed at a device, such as moving object 102, control unit 104 and/or computing device 126. For example, instructions for performing the method 2300 are stored in motion control module 402 of memory 118 and executed by processor(s) 116.

The device obtains (2212) current location information of an obstacle 1316 while movable object 102 tracks a target 106. Current location information for the obstacle 1316 includes, e.g., an absolute position of the obstacle 1316 (such as GPS coordinates of obstacle 1316), a relative position of the obstacle (e.g., a vector from movable object 102 to the obstacle 1316), a scalar distance from movable object 102 to the obstacle 1316, and/or one or more motion attributes of the obstacle, such as a velocity, acceleration and/or direction of movement of the obstacle 1316.

The device determines (2214), based on the current location information of the obstacle 1316, whether a location of the obstacle 1316 corresponds to (e.g., is within) a reactive region 1602 (e.g., reactive obstacle avoidance region) relative to movable object 102.

In response to determining that the location of the obstacle 1316 corresponds to (e.g., is within) the reactive region 1602, the device adjusts (2216) one or more movement characteristics of movable object 102 in a reactive manner (e.g., reducing an acceleration of movable object 102 along one or more axes, reducing a velocity of movable object 102 along one or more axes, and/or reversing a direction of movement of movable object 102) such that collision of movable object 102 with the obstacle 1316 is avoided.

In response to determining that the location of the obstacle 1316 does not correspond to (e.g., is not within) the reactive region 1602, the device adjusts (2308) one or more movement characteristics of movable object 102 in a proactive manner such that a distance between movable object 102 and the obstacle 1316 exceeds a first predefined distance.

In some embodiments, the current location information of the obstacle 1316 includes information obtained (2310) using one or more depth maps. In some embodiments, multiple depth maps are used, e.g., to determine motion attributes of obstacle 1316, such as velocity of obstacle 1316, acceleration of obstacle 1316 and/or direction of movement of obstacle 1316 along one or more axes.

In some embodiments, a depth map is a set of points including an indication of a distance to a surface from a viewpoint (e.g., a distance to a surface that is closest to the viewpoint) corresponding to each point. For example, a depth map is an image in which each pixel includes an indication of a distance to a surface (e.g., the surface nearest to the viewpoint) from a viewpoint. In some embodiments, the viewpoint is movable object 102 and/or a part thereof.

In some embodiments, a respective depth map is obtained (2312) using one or more sensors of movable object sensing system 122. In some embodiments, the at least one sensor is a light sensor (e.g., left stereographic image sensor 308, right stereographic image sensor 310, left infrared sensor 316, and/or right infrared sensor 318). In some embodiments, the at least one sensor is a pressure sensor (such as a sound pressure level sensor, e.g., one or more audio transducers 314). In some embodiments, a depth map is obtained suing a sonar system including audio output transducer 312 and audio input transducer 314.

In some embodiments, the at least one sensor of movable object 102 includes (2314) a pair of sensors (left stereographic image sensor 308, right stereographic image sensor 310) for depth mapping.

In some embodiments, the current location information of the obstacle 1316 includes (2316) information obtained using at least one sensor of movable object 102 (e.g., one or more sensors of movable object sensing system 122). In some embodiments, the at least one sensor is used to determine a distance to an obstacle 1316 (e.g., in lieu of or in addition to using depth map to determine current location information of the obstacle 1316).

In some embodiments, the current location information of the obstacle 1316 includes a position (2318) of the obstacle 1316, such as GPS coordinates of the obstacle 1316.

In some embodiments, the current location information includes (2320) one or more movement characteristics (e.g. velocity (e.g., velocity along one or more axes), acceleration (e.g., acceleration along one or more axes) and/or a vector indicating a direction of movement of the obstacle 1316.

In some embodiments, the current location information of the obstacle 1316 is transmitted (2322) from a computing device 126 to movable object 102 (e.g., communicated via a wireless communication channel and received by a communication system of movable object).

In some embodiments, the current location information of the obstacle 1316 is received (2324) by movable object 102 from a computing device 126.

In some embodiments, the reactive region 1602 is defined (2326) at least in part based on a determined distance from movable object 102 (e.g., the reactive region 1602 is a circular area and/or spherical volume corresponding to movable object 102 (e.g., centered on movable object 102), and the circular area and/or spherical volume has a radius 1604 equal to a predetermined distance from movable object 102. In some embodiments, the determined distance is based on one or more current movement characteristics of movable object 102. For example, as the velocity of movable object 102 increases, the determined distance between movable object 102 and the obstacle 1316 increases, e.g., because movable object 102 requires more time for adjustment to avoid obstacle 1316.

In some embodiments, the determined distance is further based (2328) on one or more current movement characteristics of the obstacle 1316. For example, if obstacle 1316 is moving toward movable object 102, the determined distance between movable object 102 and the obstacle 1316 increases, e.g., because movable object 102 requires more time for adjustment to avoid obstacle 1316.

In some embodiments, in response to determining that the location of the obstacle 1316 does not correspond to the reactive region, the device (2330): selects multiple sets of candidate movement characteristics (e.g., plot 2000, plot 2100) based on the one or more movement characteristics of movable object 102; obtains a route optimization score for each set of candidate movement characteristics of the multiple sets of candidate movement characteristics in accordance with a first set of rules; selects the candidate movement characteristics that have a highest route optimization score; and adjusts the one or more movement characteristics of movable object 102 based on the selected candidate movement characteristics.

In some embodiments, the device predicts (2332), for a set of candidate movement characteristics, a time at which movable object 102 will collide with the obstacle 1316; and determines a route optimization score for the set of candidate movement characteristics based on a difference between a current time and the predicted time at which movable object 102 will collide with the obstacle 1316. For example, a route optimization score assigned to the set of candidate movement characteristics increases as the difference between the current time and the predicted time increases.

In some embodiments, the predicted amount of time before movable object 102 will collide with the obstacle 1316 is determined (2334) using one or more movement characteristics of the obstacle 1316.

In some embodiments, the route optimization score for a set of candidate movement characteristics depends (2336), at least in part, upon one or more differences between the set of candidate movement characteristics and the set of current movement characteristics of movable object 102. For example, as the differences between a set of candidate movement characteristics ($V_Y$, $V_Z$) and/or ($V_X$, $\omega_Z$) and a current ($V_Y$, $V_Z$) and/or ($V_X$, $\omega_Z$) increases (e.g., increases with a higher $\Delta V_Y$, $\Delta V_Z$, $\Delta V_X$ and/or $\Delta \omega_Z$).

In some embodiments, the device predicts (2338), for a set of candidate movement characteristics, a distance between movable object 102 and target 106 at a predetermined future time. A predetermined time is, e.g., a time that is a predetermined amount of time from a current time (e.g., a time between 0.1 and 10 seconds, such as 3 seconds). The predetermined time varies based on, e.g., one or more movement characteristics of movable object 102 and/or target 106. In some embodiments, the route optimization score for a set of candidate movement characteristics depends, at least in part, upon the predicted distance between movable object 102 and the target 106 at the predetermined future time. For example, as the distance between movable object 102 and the target 106 decreases, the route optimization score increases.

In some embodiments, a respective set of candidate movement characteristics includes (2340) a first movement characteristic in a first direction that is perpendicular to movement of the movable object 102 (e.g., along a path 1302 and/or in a direction of movable object 102 as it tracks target 106) and a second movement characteristic in a second direction that is perpendicular to the movement of movable object 102. For example, the first direction is perpendicular to the second direction, and both the first direction and the second direction are perpendicular to an axis aligned along a path of movement of movable object 102.

In some embodiments, a respective set of candidate movement characteristics includes (2342) a y-axis movement characteristic $V_Y$ and a z-axis movement characteristic $V_Z$ (e.g., as described with regard to FIGS. 19 and 20).

In some embodiments, a respective set of candidate movement characteristics includes (2344) a movement characteristic in a direction of movement of movable object 102 (e.g., along path 1302 and/or in a direction of movement of movable object 102 as it tracks target 106) and an angular velocity.

In some embodiments, a respective set of candidate movement characteristics includes (2346) an x-axis movement characteristic $V_X$ and an angular velocity $\omega_X$ (e.g., as described with regard to FIGS. 19 and 21).

In some embodiments, the device determines (2348) a size of the obstacle 1316; determines whether the size of the obstacle 1316 meets first obstacle size criteria, wherein: in response to determining that the size of the obstacle 1316 meets first obstacle size criteria, the multiple sets of candidate movement characteristics include movement of movable object 102 along a y-axis and a z-axis relative to movable object 102 (e.g., ($V_Y$,$V_Z$)), and in response to determining that the size of the obstacle does not meet first obstacle size criteria, a respective set of candidate movement characteristics of the multiple sets of candidate movement characteristics include: movement of movable object 102 along an x-axis relative to movable object 102 and angular velocity of movable object 102 (e.g., ($V_X$, $\omega_X$)).

In some embodiments, in response to determining that the location of the obstacle 1316 corresponds to the reactive region 1602, adjusting the one or more movement characteristics includes (2350): determining, based on the current location information of the obstacle 1316, whether the location of the obstacle 1316 corresponds to the first sub-region 1702 of the reactive region relative to movable object 102; and in response to determining that the location of the obstacle 1316 corresponds to the first sub-region 1702 of the reactive region relative to movable object 102, reducing an acceleration (e.g., along one or more axes) of movable object 102. For example, an acceleration of movable object 102 toward obstacle 1316 is reduced.

In some embodiments, in response to determining that the location of the obstacle 1316 corresponds to the reactive region 1602, adjusting the one or more movement characteristics includes (2352): determining, based on the current location information of the obstacle 1316, whether the location of the obstacle 1316 corresponds to a second sub-region of the reactive region relative to movable object 102; and in response to determining that the location of the obstacle 1316 corresponds to the second sub-region 1704 of the reactive region 1602 relative to movable object 102, reducing a velocity (e.g., along one or more axes) of movable object 102.

In some embodiments, an area (and/or volume) of the second sub-region 1704 of the reactive region relative to movable object 102 is smaller (2354) than an area (and/or volume) of the first sub-region 1702 of the reactive region 1602 relative to movable object 102.

In some embodiments, in response to determining that the location of the obstacle 1316 corresponds to the reactive region 1602, adjusting the one or more movement characteristics includes (2356): determining, based on the current location information of the obstacle 1316, whether the location of the obstacle 1316 corresponds to a third sub-region 1706 of the reactive region 1602 relative to movable object 102; and, in response to determining that the location of the obstacle 1316 corresponds to the third sub-region 1706 of the reactive region relative to movable object 102, reversing a direction of movement (e.g., along one or more axes) of movable object 102.

In some embodiments, an area (and/or volume) of the third sub-region 1706 of the reactive region 1602 relative to movable object 102 is smaller (2358) than the area (and/or volume) of the second sub-region 1706 of the reactive region relative to movable object 102.

In some embodiments, in response to determining that the location of the obstacle 1316 corresponds to the reactive region 1602, the device transmits (2360) updated targeting information (e.g., an indication and/or instruction that tracking of target 106 is to be suspended) to a control unit 104 (e.g., as described with regard to FIGS. 18A-18B).

In some embodiments, the adjusted target tracking information includes (2362) information about the obstacle 1316 (e.g., an image of obstacle 1316, one or more movement characteristics of obstacle 1316, and/or current location information of obstacle 1316).

FIGS. 24A-24G are a flow diagram illustrating a method 2400 for controlling a movable object 102, in accordance with some embodiments. The method 2400 is performed at a device, such as moving object 102, control unit 104 and/or computing device 126. For example, instructions for performing the method 2400 are stored in motion control module 402 of memory 118 and executed by processor(s) 116.

The device obtains (2402) current location information of an obstacle 1316 while the movable object 102 tracks a target 106.

The device determines (2406), based on the current location information of the obstacle 1316, whether a location of the obstacle 1316 corresponds to a reactive region 1602 relative to the movable object 102.

In response to determining that the location of the obstacle 1316 corresponds to the reactive region, the device (2408): adjusts one or more movement characteristics of the movable object 102, adjusts target tracking information based on a distance between the obstacle 1316 and the movable object 102, and sends the adjusted target tracking information to a control unit 104. The control unit 104 is configured to update a displayed user interface 1200 in accordance with the adjusted target tracking information.

In some embodiments, the distance between the obstacle 1316 and the movable object 102 is determined (2410) based on the current location information of the obstacle 1316.

In some embodiments, the distance between the obstacle 1316 and the movable object 102 is determined (2412) based on output of one or more sensors of movable object sensing system 122.

In some embodiments, adjusting the one or more movement characteristics of the movable object 102 includes (2414) adjusting the one or more movement characteristics of the movable object 102 based on: the distance between the obstacle 1316 and the movable object 102; and one or more current movement characteristics of the movable object 102.

In some embodiments, adjusting the one or more movement characteristics of the movable object 102 further includes (2416): determining one or more movement characteristics of the obstacle 1316. The one or more movement characteristics of the movable object 102 are adjusted based on motion of the obstacle 1316.

In some embodiments, the motion of the obstacle 1316 is determined (2418) based on the current location information of the obstacle 1316.

In some embodiments, the motion of the obstacle 1316 is determined (2420) based on output of one or more sensors of movable object sensing system 122.

In some embodiments, adjusting the one or more movement characteristics of the movable object 102 further includes (2422) applying a first movement adjustment to movement of the movable object 102 (e.g., towards the obstacle 1316) when the distance between the obstacle 1316 and the movable object 102 meets first distance criteria (e.g., when the obstacle 1316 is located within a first region 1702 surrounding the movable object 102). In some embodiments, when the distance between the obstacle 1316 and the movable object 102 meets second distance criteria (e.g., the obstacle 1316 is located within a second region 1704 surrounding the movable object 102, the second region 1704 smaller than the first region 1702), the device applies a second movement adjustment to movement of the movable object 102 (e.g., towards the obstacle 1316).

In some embodiments, the first distance criteria are met (2424) when the distance between the obstacle 1316 and the moving object 120 exceeds a first distance (e.g., a distance of radius 1710) and the second distance criteria are met when the distance between the obstacle 1316 and the moving object 102 exceeds a second distance (e.g., a distance of radius 1712) that is smaller than the first distance.

In some embodiments, the first distance criteria are met (2426) when the location of the obstacle 1316 corresponds to a first sub-region 1702 of the reactive region 1602 relative to the movable object 102 and the second distance criteria are met when the location of the obstacle 1316 corresponds to a second sub-region 1704 of the reactive region 1602 relative to the movable object 102. For example, the first distance criteria are met when obstacle 1316 is located within first sub-region 1702 (for example, beyond second sub-region 1704) and the second distance criteria are met when the obstacle 1316 is located within a second sub-region 1704 (e.g., beyond a third sub-region 1706).

In some embodiments, applying the first movement adjustment includes (2428) reducing an acceleration of the movable object. In some embodiments, applying the second movement adjustment includes (2428) reducing a velocity of the movable object.

In some embodiments, adjusting the one or more movement characteristics of the movable object 102 includes (2430), when the distance between the obstacle 1316 and the movable object 102 meets third distance criteria, applying a third movement adjustment to movement of movable object 102. In some embodiments, the third distance criteria are met when the distance between the obstacle 1316 and the moving object 102 is a third distance that is smaller than the second distance (e.g., the distance between the obstacle 1316 and the moving object 102 is a distance less than or equal to the distance of radius 1712).

In some embodiments, applying the third movement adjustment includes reversing motion (2432) of the movable object.

In some embodiments, applying the third movement adjustment includes ceasing motion (2434) of the movable object.

In some embodiments, adjusting the one or more movement characteristics of the movable object 102 includes (2436): when the distance between the obstacle 1316 and the movable object 102 meets third distance criteria, applying a third movement adjustment to movement of movable object 102 (e.g., reversing a direction of movement of movable object 102), wherein the third distance criteria are met when the location of the obstacle 1316 corresponds to a third sub-region 1706 of the reactive region 1602 relative to the movable object 102. For example, the third distance criteria are met when obstacle 1316 is located within third sub-region 1706.

In some embodiments, adjusting the one or more movement characteristics of the movable object 102 includes (2438): when the distance between the obstacle 1316 and the movable object 102 meets third distance criteria, determining whether a velocity of the movable object 102 meets velocity criteria; in response to determining that the velocity of the movable object 102 meets velocity criteria, ceasing motion of the movable object 102; and, in response to determining that the velocity of the movable object 102 does not meet velocity criteria, reversing a direction of movement of the movable object 102.

In some embodiments, the velocity criteria are met (2440) when the velocity of the movable object 102 exceeds a threshold velocity (e.g., a threshold velocity between 5 meters per second and 60 meters per second, such as a threshold velocity of 25 meters per second).

In some embodiments, the adjusted target tracking information includes (2442) information for altering a graphical tracking indicator 1208 corresponding to the target 106.

In some embodiments, the information for altering the graphical tracking indicator 1208 corresponding to the target 106 includes (2444) information for changing a color of the graphical tracking indicator 1208.

In some embodiments, the information for altering the graphical tracking indicator 1208 corresponding to the target 106 includes (2446) information for ceasing to display the graphical tracking indicator 1208.

In some embodiments, the device determines (2448) an updated location of the obstacle 1316. For example, the device determines an updated location of obstacle 1316 after altering graphical tracking indicator 1208 and/or after adjusting one or more movement characteristics of movable object 102. The updated location of obstacle 1316 depends on, e.g., movement of movable object 012 and/or movement of obstacle 1316. In some embodiments, the device determines (2450) whether the updated location of the obstacle 1316 corresponds to the reactive region 1602 relative to the movable object 102 (e.g., the device determines whether the obstacle is at least partially within reactive region 1602). In response to determining that the updated location of the obstacle 1316 does not correspond to the reactive region 1602 relative to the movable object 102, the device further adjusts (2452) the target tracking information. In some embodiments, the device sends the further adjusted target tracking information to the control unit 104. In some embodiments, the further adjusted target tracking information includes information for ceasing to alter the graphical tracking indicator 1208. For example, when the movable object 102 is no longer at risk of (imminent) collision with obstacle 1316, graphical tracking indicator is re-displayed and/or displayed with its previous color.

In some embodiments, the adjusted target tracking information includes (2454) information for altering (e.g., temporarily altering) a response to a predefined user input received by the control unit 104.

In some embodiments, the predefined user input includes (2456) control input for controlling at least one movement characteristic of the movable object 102 (e.g., as described with regard to FIG. 5 and FIG. 12).

In some embodiments, the predefined user input includes (2458) selection input for selecting a target 106 to track (e.g., as described with regard to FIG. 12).

In some embodiments, altering the response to the predefined user input includes (2460) ceasing to respond to the predefined user input.

In some embodiments, the device determines (2462) an updated location of the obstacle 1316. In some embodiments, the device determines (2464) whether the updated location of the obstacle 1316 corresponds to the reactive region 1602 relative to the movable object 102. In some embodiments, in response to determining that the updated location of the obstacle 1316 does not correspond to the reactive region 1602 relative to the movable object 102, the device further adjusts (2466) the target tracking information and sends the further adjusted target tracking information to the control unit 104. In some embodiments, the further adjusted target tracking information includes information for ceasing to alter the response to the predefined user input received by the control unit 104. For example, when the movable object 102 is no longer at risk of (imminent) collision with obstacle 1316, user ability to control movable object 102 using control device 104 resumes.

In some embodiments, the current location information of the obstacle 1316 includes (2468) information obtained using one or more depth maps.

In some embodiments, the current location information of the obstacle 1316 includes (2470) information obtained using one or more sensors of movable object sensing system 122.

In some embodiments, the reactive region 1602 is defined (2472) at least in part based on a determined distance (e.g. 1604) from the movable object 102. In some embodiments, the determined distance is based on one or more current movement characteristics of the movable object 102.

In some embodiments, the determined distance is further based on (2474) one or more current movement characteristics of the obstacle 1316.

FIGS. 25A-25G are a flow diagram illustrating a method 2500 for controlling a movable object 102, in accordance with some embodiments. The method 2500 is performed at a device, such as moving object 102, control unit 104 and/or computing device 126. For example, instructions for performing the method 2500 are stored in motion control module 402 of memory 118 and executed by processor(s) 116.

The device obtains (2502) current location information of an obstacle 1316 while the movable object 102 tracks a target 106.

The device generates (2504) a plurality of sets of candidate movement characteristics (e.g., sets 2002, 2004, 2006 of plot 2000; sets 2102, 2104, 2106 of plot 2001) for the movable object 102 based on the current location information of the obstacle 1316 and a set of current movement characteristics of the movable object 102.

The device selects (2506), from the plurality of sets of candidate movement characteristics for the movable object 102, a set of movement characteristics for the movable object 102.

The device adjusts (2508) one or more movement characteristics of the movable object 102 based on the selected set of movement characteristics for the movable object 102.

In some embodiments, after adjusting (2510) the one or more movement characteristics of the movable object 102 based on the selected set of movement characteristics for the movable object 102 (e.g., after adjusting the one or more movement characteristics for a predefined time period, such as 1 second), the device repeats the obtaining, generating, selecting, and adjusting operations.

In some embodiments, the device assigns (2512) a route optimization score to each set of candidate movement characteristics of the plurality of sets of candidate movement characteristics and determines a set of movement characteristics for the movable object 102 that has a highest route optimization score. In some embodiments, selecting the set of movement characteristics for the movable object 102 includes selecting the set of candidate movement characteristics for the movable object 102 that has the highest route optimization score.

In some embodiments, after adjusting (2514) the one or more movement characteristics of the movable object 102 based on the selected set of movement characteristics for the movable object 102 (e.g., after adjusting the one or more movement characteristics for a predefined time period, such as 1 second), the device repeats the obtaining, generating, assigning, determining, selecting, and adjusting operations.

In some embodiments, the device predicts (2516), for a set of candidate movement characteristics, a time at which the movable object 102 will collide with the obstacle 1316 and determines a route optimization score to assign to the set of candidate movement characteristics based at least in part on a difference between a current time and the predicted time at which the movable object 102 will collide with the obstacle 1316.

In some embodiments, the device determines (2518), for a set of candidate movement characteristics, whether the movable object 102 will collide with the obstacle 1316, in response to determining that the movable object 102 will collide with the obstacle 1316, the device predicts, for the set of candidate movement characteristics, a time at which the movable object 102 will collide with the obstacle 1316, and determines a route optimization score to assign to the set of candidate movement characteristics based at least in part on a difference between a current time and the predicted time at which the movable object 102 will collide with the obstacle 1316. In response to determining that the movable object 102 will not collide with the obstacle 1316, the device determines a route optimization score to assign to the set of candidate movement characteristics based at least in part on a default value corresponding to a determination that the movable object 102 will not collide with the obstacle 1316.

In some embodiments, the predicted amount of time before the movable object 102 will collide with the obstacle 1316 is determined (2520) using one or more current movement characteristics of the obstacle 1316.

In some embodiments, the current location information of the obstacle 1316 includes (2522) the one or more current movement characteristics of the obstacle 1316.

In some embodiments, the one or more current movement characteristics of the obstacle 1316 are determined (2524) using one or more sensors of movable object sensing system 122.

In some embodiments, the device determines (2526) a route optimization score to assign to a respective set of candidate movement characteristics based at least in part on differences between the set of candidate movement characteristics and the set of current movement characteristics of the movable object 102.

In some embodiments, the device predicts (2528), for a set of candidate movement characteristics, a distance between the movable object 102 and the target 106 at a predetermined future time; and the device determines a route optimization score to assign to the set of candidate movement characteristics based at least in part on the predicted distance between the movable object 102 and the target 106 at the predetermined future time.

In some embodiments, predicting the distance between the movable object 102 and the target 106 at a predetermined future time includes (2530) obtaining at least one current movement characteristic of the target 106. The device predicts the distance using the obtained at least one current movement characteristic of the target 106.

In some embodiments, the device assigns a route optimization score to each set of candidate movement characteristics of the plurality of sets of candidate movement characteristics. The device determines a set of movement characteristics for the movable object 102 that has a highest route optimization score. The device determines whether the set of movement characteristics for the movable object 102 that has the highest route optimization score complies with (2532) constraint criteria. In response to determining that the set of candidate movement characteristics complies with the constraint criteria, the device selects the set of movement characteristics for the movable object 102 that has the highest route optimization score. In response to determining that the set of candidate movement characteristics does not comply with the constraint criteria, the device selects an alternative set of movement characteristics for the movable object 102.

For example, in some embodiments, one or more movement characteristics of movable object 102, such as a linear velocity, an angular velocity, a linear acceleration, an angular acceleration, and/or an altitude are constrained. For example, a constraint exists due to, e.g., a mechanical limit (e.g., a mechanical limit of an actuator controlling a movement mechanism 114) and/or a policy limit (e.g., a law limiting allowable velocity, acceleration, and/or elevation). In some embodiments, selection of a set of candidate movement characteristics and/or generation of candidate movement characteristics is constrained based on the constraints.

In some embodiments, the constraint criteria include (2534) a maximum linear velocity of the movable object 102.

In some embodiments, the constraint criteria include a (2536) maximum angular velocity of the movable object 102.

In some embodiments, the plurality of sets of candidate movement characteristics are generated (2538) subject to constraint criteria.

In some embodiments, the constraint criteria include (2540) a maximum linear velocity of the movable object 102.

In some embodiments, the constraint criteria include (2542) a maximum angular velocity of the movable object 102.

In some embodiments, a respective set of candidate movement characteristics includes (2544) a y-axis movement characteristic and a z-axis movement characteristic (e.g., $V_Z$). A movement characteristic is, e.g., an x-axis velocity $V_X$, an x-axis acceleration, a y-axis velocity $V_Y$, a y-axis acceleration, a z-axis velocity $V_Z$, and/or z-axis acceleration.

In some embodiments, the y-axis movement characteristic and the z-axis movement characteristic are determined (2546) in a frame of reference 1900 of the movable object 102 (e.g., as described with regard to FIG. 19).

In some embodiments, the respective set of candidate movement characteristics includes (2548) a y-axis velocity $V_Y$ and a z-axis velocity $V_Z$.

In some embodiments, the plurality of sets of candidate movement characteristics include (2550): a respective set of candidate movement characteristics including a negative y-axis velocity value and a negative z-axis velocity value; a set of candidate movement characteristics including a negative y-axis velocity value and a positive z-axis velocity value; a set of candidate movement characteristics including a positive y-axis velocity value and a negative z-axis velocity value; and a set of candidate movement characteristics including a positive y-axis velocity value and a positive z-axis velocity value. For example, candidate movement characteristics in FIG. 20 are shown in each quadrant of the coordinate plot 2000.

In some embodiments, a respective set of candidate movement characteristics includes (2552) an x-axis movement characteristic and an angular velocity (e.g., $\omega_X$). An x-axis movement characteristic is, e.g., an x-axis velocity $V_X$ and/or an x-axis acceleration.

In some embodiments, the x-axis movement characteristic and the angular velocity are determined (2554) in a frame of reference 1900 of the movable object 102.

In some embodiments, the x-axis movement characteristic (2556) is a velocity $V_X$.

In some embodiments, the plurality of sets of candidate movement characteristics include (2558): a set of candidate movement characteristics including a negative x-axis velocity value and a negative angular velocity value; a set of candidate movement characteristics including a negative x-axis velocity value and a positive angular velocity value; a set of candidate movement characteristics including a positive x-axis velocity value and a negative angular velocity value; and a set of candidate movement characteristics including a positive x-axis velocity value and a positive angular velocity value. For example, candidate movement characteristics in FIG. 22 are shown in each quadrant of the coordinate plot 2100.

In some embodiments, the device determines (2560) a size of the obstacle 1316. The device determines whether the size of the obstacle meets first obstacle size criteria. In response to determining that the size of the obstacle meets first obstacle size criteria, the multiple sets of candidate movement characteristics include movement of the movable object along a y-axis and a z-axis relative to the movable object. In response to determining that the size of the obstacle does not meet first obstacle size criteria, a respective set of candidate movement characteristics of the multiple sets of candidate movement characteristics include movement of the movable object along an x-axis relative to the movable object, and angular velocity of the movable object.

Many features of the present disclosure can be performed in, using, or with the assistance of hardware, software, firmware, or combinations thereof. Consequently, features of the present disclosure may be implemented using a processing system. Exemplary processing systems (e.g., processor(s) 116, controller 210, controller 218, processor(s) 502 and/or processor(s) 602) include, without limitation, one or more general purpose microprocessors (for example, single or multi-core processors), application-specific integrated circuits, application-specific instruction-set processors, field-programmable gate arrays, graphics processing units, physics processing units, digital signal processing units, coprocessors, network processing units, audio processing units, encryption processing units, and the like.

Features of the present disclosure can be implemented in, using, or with the assistance of a computer program product, such as a storage medium (media) or computer readable medium (media) having instructions stored thereon/in which can be used to program a processing system to perform any of the features presented herein. The storage medium (e.g., (e.g. memory 118, 504, 604) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Communication systems as referred to herein (e.g., communication systems 120, 510, 610) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for controlling a movable object, comprising:
   obtaining current location information of an obstacle while the movable object tracks a target;

determining, based on the current location information of the obstacle, whether the obstacle is located in a reactive region relative to the movable object; and in response to determining that the obstacle is not located in the reactive region:

selecting, from multiple sets of candidate movement characteristics, an optimized set of candidate movement characteristics having an optimized route optimization score, wherein each set of candidate movement characteristics among the multiple sets of candidate movement characteristics corresponds to a route optimization score; and adjusting one or more movement characteristics of the movable object based on the optimized set of candidate movement characteristics such that a distance between the movable object and the obstacle is maintained at or beyond a predefined distance.

2. The method of claim 1, in response to determining that the obstacle is not located in the reactive region, the method further comprising:

obtaining the route optimization score for the each set of candidate movement characteristics.

3. The method of claim 2, wherein obtaining the route optimization score for the each set of candidate movement characteristics includes:

predicting, for the each set of candidate movement characteristics, a time at which the movable object will likely collide with the obstacle using one or more movement characteristics of the obstacle; and determining the route optimization score for the each set of candidate movement characteristics based on a difference between a current time and the predicted time at which the movable object will likely collide with the obstacle.

4. The method of claim 1, wherein the optimized route optimization score is a highest route optimization score or a route optimization score that is at least above a predefined threshold.

5. The method of claim 1, wherein the route optimization score for a set of candidate movement characteristics depends, at least in part, upon differences between the set of candidate movement characteristics and a set of current movement characteristics of the movable object.

6. The method of claim 1, in response to determining that the obstacle is not located in the reactive region, the method further comprising:

predicting, for a set of candidate movement characteristics, a distance between the movable object and the target at a predetermined future time, wherein the route optimization score for the set of candidate movement characteristics depends, at least in part, upon the predicted distance between the movable object and the target at the predetermined future time.

7. The method of claim 1, wherein a respective set of candidate movement characteristics of the multiple sets of candidate movement characteristics includes:

a first movement characteristic in a first direction that is perpendicular to a direction of movement of the movable object and a second movement characteristic in a second direction that is perpendicular to the direction of movement of the movable object and distinct from the first direction; or a movement characteristic in the direction of movement of the movable object and an angular velocity.

8. The method of claim 7, wherein the direction of movement of the movable object is along an x-axis perpendicular to a y-axis and a z-axis, and the method further comprises:

determining a size of the obstacle; and determining whether the size of the obstacle meets obstacle size criteria, wherein:

in response to determining that the size of the obstacle meets the obstacle size criteria, the respective set of candidate movement characteristics includes movement characteristics of the movable object along at least one of the y-axis or the z-axis relative to the movable object, and in response to determining that the size of the obstacle does not meet the obstacle size criteria, the respective set of candidate movement characteristics includes:

the movement characteristic of the movable object along the x-axis relative to the movable object, and the angular velocity of the movable object.

9. The method of claim 1, further comprising:

in response to determining that the obstacle is located in the reactive region, adjusting the one or more movement characteristics of the movable object to prevent the movable object from colliding with the obstacle.

10. The method of claim 9, in response to determining that the obstacle is located in the reactive region, the method further comprising:

determining, based on the current location information of the obstacle, whether the obstacle is located in a first sub-region or a second sub-region of the reactive region relative to the movable object, an area of the second sub-region of the reactive region relative to the movable object being smaller than an area of the first sub-region of the reactive region relative to the movable object;

in response to determining that the obstacle is located in the first sub-region, reducing an acceleration of the movable object; and in response to determining that the obstacle is located in the second sub-region, reducing a velocity of the movable object.

11. The method of claim 10, in response to determining that the obstacle is located in the reactive region, the method further comprising:

determining, based on the current location information of the obstacle, whether the obstacle is located in a third sub-region of the reactive region relative to the movable object, an area of the third sub-region of the reactive region relative to the movable object being smaller than the area of the second sub-region of the reactive region relative to the movable object; and in response to determining that the obstacle is located in the third sub-region, reversing a direction of movement of the movable object.

12. The method of claim 9, in response to determining that the obstacle is located in the reactive region, the method further comprising:

transmitting adjusted target tracking information to a control unit, wherein the adjusted target tracking information includes information about the obstacle.

13. The method of claim 1, wherein the current location information of the obstacle includes information obtained using one or more depth maps, each of the one or more depth maps being obtained using at least one sensor of the movable object.

14. The method of claim 13, wherein the at least one sensor of the movable object includes a pair of sensors for stereoscopic depth mapping.

15. The method of claim 1, wherein the current location information of the obstacle includes at least one of a position of the obstacle or one or more movement characteristics of the obstacle.

16. The method of claim 1, wherein the current location information of the obstacle is transmitted from a computing device to the movable object or received by the movable object from the computing device.

17. The method of claim 1, wherein:
the reactive region is defined at least in part based on a determined distance from the movable object; and
the determined distance is based on at least one of one or more current movement characteristics of the movable object or one or more current movement characteristics of the obstacle.

18. A system for controlling a movable object, comprising:
one or more processors; and
a memory storing one or more programs configured to be executed by the one or more processors to:
obtain current location information of an obstacle while the movable object tracks a target;
determine, based on the current location information of the obstacle, whether the obstacle is located in a reactive region relative to the movable object; and
in response to determining that the obstacle is not located in the reactive region:
select, from multiple sets of candidate movement characteristics, an optimized set of candidate movement characteristics having an optimized route optimization score, wherein each set of candidate movement characteristics among the multiple sets of candidate movement characteristics corresponds to a route optimization score; and
adjust one or more movement characteristics of the movable object based on the optimized set of candidate movement characteristics such that a distance between the movable object and the obstacle is maintained at or beyond a predefined distance.

19. An unmanned aerial vehicle (UAV), comprising:
a propulsion system;
one or more sensors; and
one or more processors, individually or collectively, configured to:
obtain current location information of an obstacle while the movable object tracks a target;
determine, based on the current location information of the obstacle, whether the obstacle is located in a reactive region relative to the movable object; and
in response to determining that the obstacle is not located in the reactive region:
select, from multiple sets of candidate movement characteristics, an optimized set of candidate movement characteristics having an optimized route optimization score, wherein each set of candidate movement characteristics among the multiple sets of candidate movement characteristics corresponds to a route optimization score; and
adjust one or more movement characteristics of the movable object based on the optimized set of candidate movement characteristics such that a distance between the movable object and the obstacle is maintained at or beyond a predefined distance.

20. The UAV of claim 19, wherein the one or more processors, individually or collectively, are further configured to:
determine the current location information of the obstacle based on a depth map obtained using the one or more sensors.

* * * * *